United States Patent
Mitkar et al.

(10) Patent No.: US 11,321,383 B2
(45) Date of Patent: *May 3, 2022

(54) DATA STORAGE MANAGEMENT OPERATIONS IN A SECONDARY STORAGE SUBSYSTEM USING IMAGE RECOGNITION AND IMAGE-BASED CRITERIA

(71) Applicant: Commvault Systems, Inc., Tinton Falls, NJ (US)

(72) Inventors: Amit Mitkar, Manalapan, NJ (US); Unmil Vinay Tambe, Somerset, NJ (US); Sumedh Pramod Degaonkar, Surrey (CA); Rajesh Kumar Singh, Ocean, NJ (US); Rahil Mohmed Husein Mansuri, Ocean, NJ (US); Srikanth Hejamadi Tati, Ocean Township, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 87 days.

This patent is subject to a terminal disclaimer.

(21) Appl. No.: 17/068,634

(22) Filed: Oct. 12, 2020

(65) Prior Publication Data

US 2021/0081445 A1    Mar. 18, 2021

Related U.S. Application Data

(63) Continuation of application No. 15/264,476, filed on Sep. 13, 2016, now Pat. No. 10,853,406.

(Continued)

(51) Int. Cl.
*G06F 16/51*    (2019.01)
*G06F 16/583*    (2019.01)
(Continued)

(52) U.S. Cl.
CPC ............ *G06F 16/51* (2019.01); *G06F 16/583* (2019.01); *G06F 16/5838* (2019.01)

(58) Field of Classification Search
CPC ..... G06F 16/51; G06F 16/583; G06F 16/5838
See application file for complete search history.

(56) References Cited

U.S. PATENT DOCUMENTS

| 4,084,231 A | 4/1978 | Capozzi et al. |
| 4,267,568 A | 5/1981 | Dechant et al. |

(Continued)

FOREIGN PATENT DOCUMENTS

| EP | 0259912 | 3/1988 |
| EP | 0405926 | 1/1991 |

(Continued)

OTHER PUBLICATIONS

<http://petapixel.com/2015/06/05/my-new-thoughts-on-google-photos-after-digging-around-for-a-week> Retrieved Aug. 18, 2015, in 8 pages.

(Continued)

*Primary Examiner* — William B Partridge
*Assistant Examiner* — Aryan D Toughiry
(74) *Attorney, Agent, or Firm* — Knobbe, Martens, Olson & Bear, LLP

(57) ABSTRACT

A data storage management system incorporates image recognition and classification features. The illustrative system generates thumbnail images to represent images detected in secondary copies. Subsequent image recognition and classification operations are based on the thumbnail images without need to access the secondary copies from which the thumbnails were derived. The system indexes thumbnail images and respective relationships to each other and to the source secondary copies. Metadata from the source secondary copies is extracted and preserved with the (Continued)

thumbnails. Thumbnail images, metadata, and related index data (collectively "thumbnail data") are stored locally in an illustrative content index server, or in an enhanced storage manager, thus improving performance without interfering with ongoing storage management operations. Features are disclosed for searching within the system and performing storage management operations based on image criteria. Access to/from other systems is also possible, e.g., for importing images and/or thumbnails.

20 Claims, 17 Drawing Sheets

Related U.S. Application Data

(60) Provisional application No. 62/220,748, filed on Sep. 18, 2015.

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,347,653 A | 9/1994 | Flynn et al. |
| 5,410,700 A | 4/1995 | Fecteau et al. |
| 5,420,996 A | 5/1995 | Aoyagi |
| 5,454,099 A | 9/1995 | Myers et al. |
| 5,559,991 A | 9/1996 | Kanfi |
| 5,642,496 A | 6/1997 | Kanfi |
| 6,418,478 B1 | 7/2002 | Ignatius et al. |
| 6,542,972 B2 | 4/2003 | Ignatius et al. |
| 6,658,436 B2 | 12/2003 | Oshinsky et al. |
| 6,721,767 B2 | 4/2004 | De Meno et al. |
| 6,760,723 B2 | 7/2004 | Oshinsky et al. |
| 7,003,641 B2 | 2/2006 | Prahlad et al. |
| 7,035,880 B1 | 4/2006 | Crescenti et al. |
| 7,107,298 B2 | 9/2006 | Prahlad et al. |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,246,207 B2 | 7/2007 | Kottomtharayil et al. |
| 7,315,923 B2 | 1/2008 | Retnamma et al. |
| 7,343,453 B2 | 3/2008 | Prahlad et al. |
| 7,389,311 B1 | 6/2008 | Crescenti et al. |
| 7,395,282 B1 | 7/2008 | Crescenti et al. |
| 7,440,982 B2 | 10/2008 | Lu et al. |
| 7,454,569 B2 | 11/2008 | Kavuri et al. |
| 7,490,207 B2 | 2/2009 | Amarendran et al. |
| 7,500,053 B1 | 3/2009 | Kavuri et al. |
| 7,529,782 B2 | 5/2009 | Prahlad et al. |
| 7,536,291 B1 | 5/2009 | Vijayan Retnamma et al. |
| 7,543,125 B2 | 6/2009 | Gokhale |
| 7,546,324 B2 | 6/2009 | Prahlad et al. |
| 7,603,386 B2 | 10/2009 | Amarendran et al. |
| 7,606,844 B2 | 10/2009 | Kottomtharayil |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,734,669 B2 | 6/2010 | Kottomtharayil et al. |
| 7,747,579 B2 | 6/2010 | Prahlad et al. |
| 7,801,864 B2 | 9/2010 | Prahlad et al. |
| 7,809,914 B2 | 10/2010 | Kottomtharayil et al. |
| 8,156,086 B2 | 4/2012 | Lu et al. |
| 8,170,995 B2 | 5/2012 | Prahlad et al. |
| 8,229,954 B2 | 7/2012 | Kottomtharayil et al. |
| 8,230,195 B2 | 7/2012 | Amarendran et al. |
| 8,285,681 B2 | 10/2012 | Prahlad et al. |
| 8,307,177 B2 | 11/2012 | Prahlad et al. |
| 8,346,731 B1 | 1/2013 | Tsaur et al. |
| 8,364,652 B2 | 1/2013 | Vijayan et al. |
| 8,370,542 B2 | 2/2013 | Lu et al. |
| 8,504,529 B1 | 8/2013 | Zheng |
| 8,578,120 B2 | 11/2013 | Attarde et al. |
| 10,853,406 B2 | 12/2020 | Mitkar et al. |
| 2006/0107297 A1 | 5/2006 | Toyama et al. |
| 2006/0224846 A1 | 10/2006 | Amarendran et al. |
| 2009/0192919 A1 | 7/2009 | Hess et al. |
| 2009/0319534 A1 | 12/2009 | Gokhale |
| 2010/0036818 A1 | 2/2010 | Valencia-Campo et al. |
| 2011/0106798 A1 | 5/2011 | Li et al. |
| 2012/0150818 A1 | 6/2012 | Vijayan Retnamma et al. |
| 2012/0150826 A1 | 6/2012 | Vijayan Retnamma et al. |
| 2013/0011068 A1 | 1/2013 | Albouyeh |
| 2013/0024423 A1 | 1/2013 | Doshi et al. |
| 2013/0191407 A1 | 7/2013 | Endo |
| 2013/0262394 A1 | 10/2013 | Kumarasamy |
| 2014/0181441 A1 | 6/2014 | Kottomtharayil |
| 2015/0074107 A1 | 3/2015 | Johnson |
| 2015/0138394 A1 | 5/2015 | Jeong |
| 2015/0169708 A1 | 6/2015 | Song et al. |
| 2015/0213062 A1 | 7/2015 | Gokturk |
| 2015/0301903 A1 | 10/2015 | Mutha et al. |
| 2016/0078284 A1 | 3/2016 | Sato |
| 2016/0342860 A1 | 11/2016 | Osipov et al. |
| 2017/0083517 A1 | 3/2017 | Mitkar et al. |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |
| WO | WO 2006/052872 | 5/2006 |
| WO | WO2017048723 A1 | 3/2017 |

OTHER PUBLICATIONS

Raphael, Jr. "16 Cool Things To Try With The New Google Photos." Computerworld. Date listed on article is Jun. 2, 2015. <http://www.computerworld.com/article/2929593/android/new-google-photos-app.html> Retrieved Aug. 18, 2015 in 12 pages.

Hawk, Thomas. "My New Thoughts On Google Photos After Digging Around For A Week." Date listed on article is Jun. 5, 2015. <http://petapixel.com/2015/06/05/my-new-thoughts-on-google-photos-after-digging-around-for-a-week> Retrieved Aug. 18, 2015 in 8 pages.

Moynihan, Tim. "Google Photos Is Your New Essential Picture App." Wired. Date listed on article is May 29, 2015. <http://www.wired.com/2015/05/google-photos-new-essential-picture-app/> Retrieved Aug. 18, 2015 in 7 pages.

Arneson, "Mass Storage Archiving in Network Environments" IEEE, Oct. 31-Nov. 1998, pp. 45-50.

(56) References Cited

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Eitel, "Backup and Storage Management in Distributed Heterogeneous Environments," IEEE, 1994, pp. 124-126.
Huff, KL, "Data Set Usage Sequence Number," IBM Technical Disclosure Bulletin, vol. 24, No. 5, Oct. 1981 New York, US, pp. 2404-2406.
Rosenblum et al., "The Design and Implementation of a Log-Structure File System," Operating Systems Review SIGOPS, vol. 25, No. 5, May 1991, New York, US, pp. 1-15.
International Search Report and Written Opinion for PCT/US2016/051538 dated Dec. 28, 2016 in 14 pages.
Extended European Search Report in Application No. 16847143.1 dated Mar. 21, 2019 in 13 pages.
European Office Action dated Aug. 28, 2020, Application No. EP16847143.1, 4 pages.

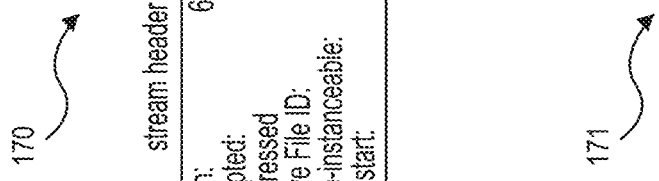

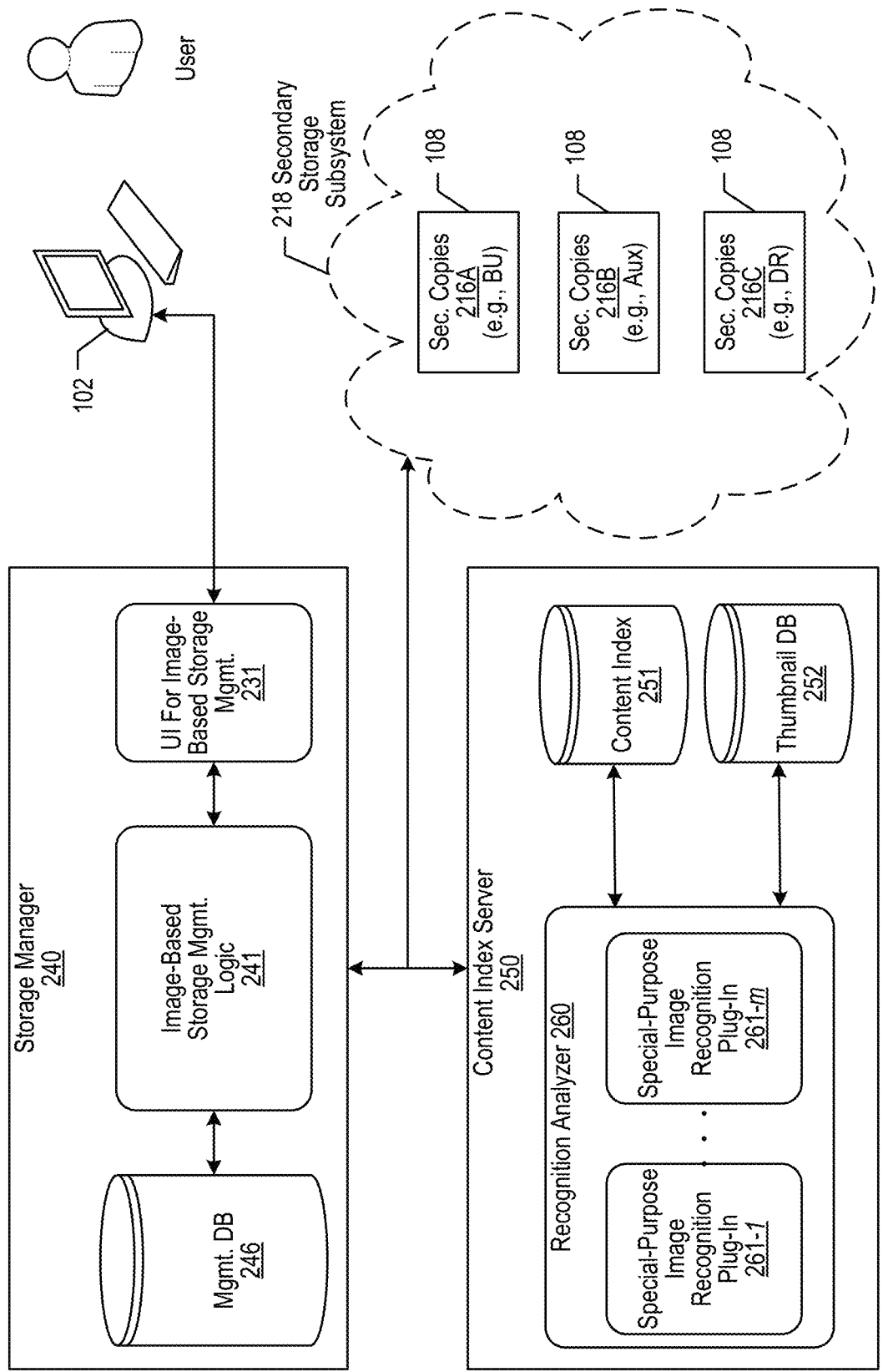
FIG. 2A  Data Storage Management System 200 For Performing Data Storage Management Operations In A Secondary Storage Subsystem Using Image Recognition And Image-Based Criteria

DATA STORAGE MANAGEMENT OPERATIONS IN A SECONDARY STORAGE SUBSYSTEM USING IMAGE RECOGNITION AND IMAGE-BASED CRITERIA

INCORPORATION BY REFERENCE TO ANY PRIORITY APPLICATIONS

This application is a Continuation of U.S. patent application Ser. No. 15/264,476 filed on Sep. 13, 2016, which claims the benefit of priority to U.S. Provisional Patent Application No. 62/220,748 entitled "Data Storage Management Operations In A Secondary Storage Subsystem Using Image Recognition And Image-Based Criteria" and filed on Sep. 18, 2015. Any and all applications for which a foreign or domestic priority claim is identified in the Application Data Sheet of the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Businesses recognize the commercial value of their data and seek reliable, cost-effective ways to protect the information stored on their computer networks while minimizing impact on productivity. A company might back up critical computing systems such as databases, file servers, web servers, virtual machines, and so on as part of a daily, weekly, or monthly maintenance schedule. The company may similarly protect computing systems used by its employees, such as those used by an accounting department, marketing department, engineering department, and so forth. Given the rapidly expanding volume of data under management, companies also continue to seek innovative techniques for managing data growth, for example by migrating data to lower-cost storage over time, reducing redundant data, pruning lower priority data, etc. Enterprises also increasingly view their stored data as a valuable asset and look for solutions that not only protect and manage, but also leverage their data. For instance, data analysis capabilities, information management, improved data presentation and access features, and the like, are in increasing demand. Likewise image handling holds great interest and potential.

SUMMARY

The present inventors devised a streamlined approach for image handling in a data storage management system. The approach includes a flexible and scalable system architecture that incorporates image recognition and classification features for use with "offline" stored data, generally referred to as "secondary copies." The illustrative system applies powerful image recognition and classification techniques to secondary copies residing in a secondary storage subsystem without affecting "live" production data or interfering with production environments, which are often performance-challenged and/or bandwidth-limited. The illustrative architecture optionally employs special-purpose image recognition plug-ins, application programming interfaces ("APIs"), and storage operation plug-ins to achieve flexibility, scalability, and upgradability in the system on a going-forward basis.

The illustrative system generates thumbnail images to represent images detected in the secondary copies. All subsequent image recognition and classification operations are based on the thumbnail images without further need to access the secondary copies from which the thumbnails were derived. This approach advantageously spares secondary storage resources from being repeatedly tapped for ongoing image processing.

The illustrative system indexes the thumbnail images as well as their respective relationships to each other and to the source secondary copies from which they were derived. Indexing greatly facilitates image-based search and locate operations in the illustrative system. Metadata from the source secondary copies is also extracted and preserved with the thumbnails.

The thumbnail images, associated metadata, and related index data (collectively "thumbnail data") are stored locally in an illustrative content index server, or in an enhanced storage manager that is also responsible for overall management of the data storage management system. By storing thumbnail data locally, rather than in secondary storage devices that are involved in secondary copy operations, the illustrative system enables speedy and efficient image processing operations such as training, recognition, classification, user feedback collection, and/or searching as needed. Since the content index server and storage manager are always-on resources, they provide improved image processing performance without interfering with ongoing storage management operations.

The illustrative system defines content policies comprising image criteria as the basis for executing operations relative to the secondary copies in the secondary storage subsystem. The system likewise may enable the administration of image criteria for other kinds of information management policies, such as storage policies, scheduling policies, audit policies, etc. Image criteria may include an individual identifier such as the name of a person. Image criteria may also include classifications such as a type of image (e.g., person, biological organ, landmark, etc.), a count of how many persons are shown in an image (e.g., single, group, 2 people, 3 people, etc.), an organizational identifier associated with recognized person(s), a geographical region (e.g., city, country, etc.), etc. without limitation. Some of the classification and resulting image criteria may be made possible by special-purpose features in certain image recognition plug-ins.

The system optionally supports so-called "action" plug-ins for performing any number of suitable operations in response to image criteria. Examples of suitable operations may include one or more of the following: retention timing and legal-hold; pruning; deduplication, encrypting, and/or compressing of secondary copies; restoring from secondary storage to primary storage; migrating secondary copies from one secondary storage device to another; generating further secondary copies; exporting secondary copies and/or thumbnail data to other systems, such as to another data storage management system, to an external security system, etc.; and any other suitable operations in any combination and without limitation. The system also allows for pre-identified and pre-tagged thumbnails and/or images to be imported and merged into the overall thumbnail indexing scheme disclosed herein.

BRIEF DESCRIPTION OF THE DRAWINGS

FIGS. 1F-1H are block diagrams illustrating suitable data structures that may be employed by the information management system.

FIG. 2A is a block diagram illustrating some salient portions of a data storage management system 200 for performing data storage management operations in a secondary storage subsystem using image recognition and image-based criteria, according to an illustrative embodiment of the present invention.

DETAILED DESCRIPTION

Detailed descriptions and examples of systems and methods according to one or more illustrative embodiments of the present invention may be found in the section entitled DATA STORAGE MANAGEMENT OPERATIONS IN A SECONDARY STORAGE SUBSYSTEM USING IMAGE RECOGNITION AND IMAGE-BASED CRITERIA, as well as in the section entitled Example Embodiments, and also in FIGS. 2A-8 herein. Furthermore, components and functionality for performing data storage management operations in a secondary storage subsystem using image recognition and image-based criteria may be configured and/or incorporated into information management systems such as those described herein in FIGS. 1A-1H. One or more embodiments of the present invention may be used in addition to or in combination with one or more embodiments of U.S. Pat. No. 8,170,995, entitled "Method and System for Offline Indexing of Content and Classifying Stored Data" which is incorporated by reference in its entirety herein.

Various embodiments described herein are intimately tied to, enabled by, and would not exist except for, computer technology. For example, image recognition, image classification and indexing, index-based search and locate, and/or content policies using image criteria described herein in reference to various embodiments cannot reasonably be performed by humans alone, without the computer technology upon which they are implemented.

Information Management System Overview

With the increasing importance of protecting and leveraging data, organizations simply cannot risk losing critical data. Moreover, runaway data growth and other modern realities make protecting and managing data increasingly difficult. There is therefore a need for efficient, powerful, and user-friendly solutions for protecting and managing data. Depending on the size of the organization, there may be many data production sources which are under the purview of tens, hundreds, or even thousands of individuals. In the past, individuals were sometimes responsible for managing and protecting their own data, and a patchwork of hardware and software point solutions may have been used in any given organization. These solutions were often provided by different vendors and had limited or no interoperability. Certain embodiments described herein address these and other shortcomings of prior approaches by implementing scalable, unified, organization-wide information management, including data storage management.

Figure 1A:
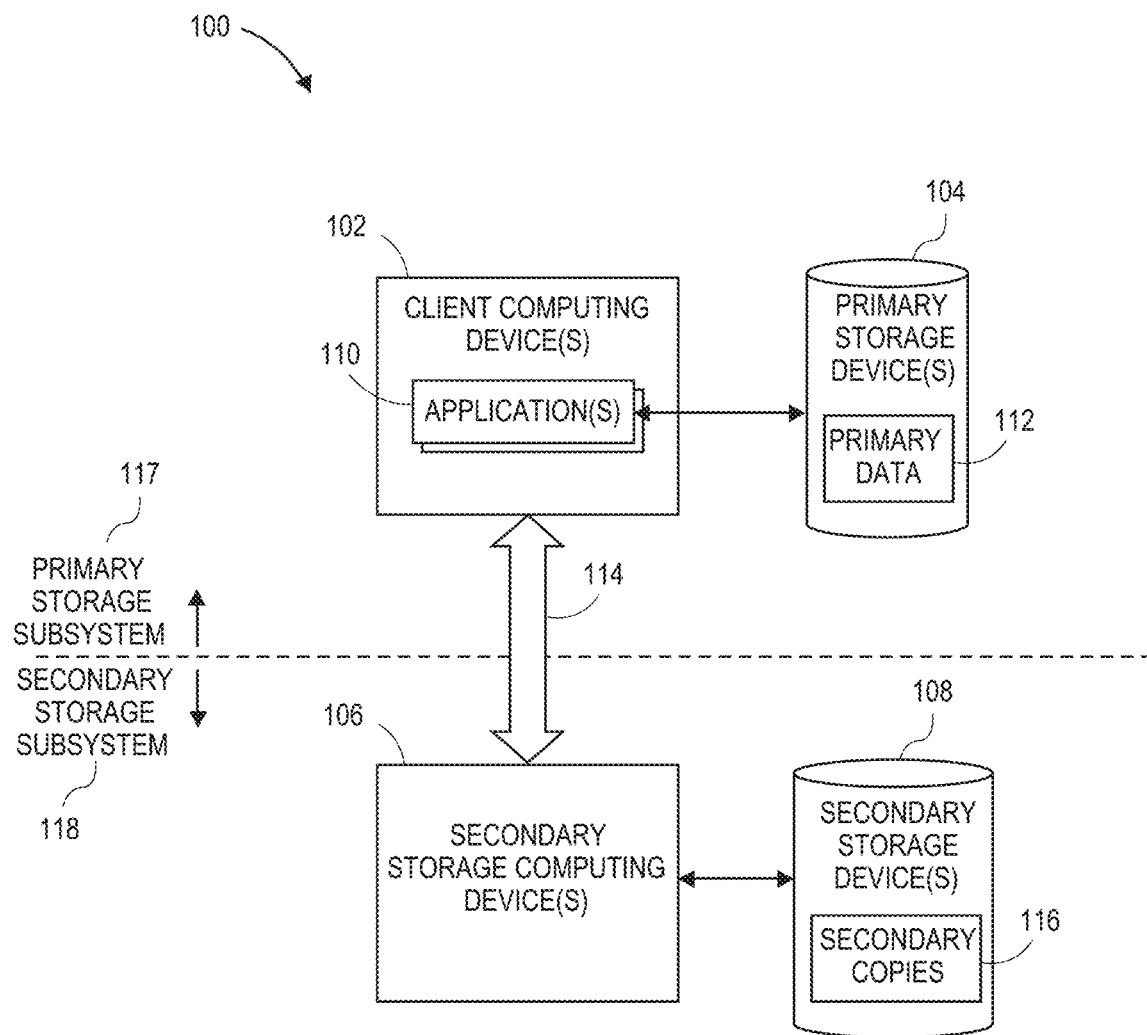
FIG. 1A is a block diagram illustrating an exemplary information management system.

FIG. 1A shows one such information management system 100 (or "system 100"), which generally includes combinations of hardware and software configured to protect and manage data and metadata that are generated and used by computing devices in system 100. System 100 may be referred to in some embodiments as a "storage management system" and the operations it performs may be referred to as "information management operations" or "storage operations" in some circumstances. The organization that employs system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to Commvault Systems, Inc., each of which is hereby incorporated by reference in its entirety herein:

- U.S. Pat. No. 7,035,880, entitled "Modular Backup and Retrieval System Used in Conjunction With a Storage Area Network";
- U.S. Pat. No. 7,107,298, entitled "System And Method For Archiving Objects In An Information Store";
- U.S. Pat. No. 7,246,207, entitled "System and Method for Dynamically Performing Storage Operations in a Computer Network";
- U.S. Pat. No. 7,315,923, entitled "System And Method For Combining Data Streams In Pipelined Storage Operations In A Storage Network";
- U.S. Pat. No. 7,343,453, entitled "Hierarchical Systems and Methods for Providing a Unified View of Storage Information";
- U.S. Pat. No. 7,395,282, entitled "Hierarchical Backup and Retrieval System";
- U.S. Pat. No. 7,529,782, entitled "System and Methods for Performing a Snapshot and for Restoring Data";

U.S. Pat. No. 7,617,262, entitled "System and Methods for Monitoring Application Data in a Data Replication System";

U.S. Pat. No. 7,734,669, entitled "Managing Copies Of Data";

U.S. Pat. No. 7,747,579, entitled "Metabase for Facilitating Data Classification";

U.S. Pat. No. 8,156,086, entitled "Systems And Methods For Stored Data Verification";

U.S. Pat. No. 8,170,995, entitled "Method and System for Offline Indexing of Content and Classifying Stored Data";

U.S. Pat. No. 8,230,195, entitled "System And Method For Performing Auxiliary Storage Operations";

U.S. Pat. No. 8,285,681, entitled "Data Object Store and Server for a Cloud Storage Environment, Including Data Deduplication and Data Management Across Multiple Cloud Storage Sites";

U.S. Pat. No. 8,307,177, entitled "Systems And Methods For Management Of Virtualization Data";

U.S. Pat. No. 8,364,652, entitled "Content-Aligned, Block-Based Deduplication";

U.S. Pat. No. 8,578,120, entitled "Block-Level Single Instancing";

U.S. Pat. Pub. No. 2006/0224846, entitled "System and Method to Support Single Instance Storage Operations";

U.S. Pat. Pub. No. 2009/0319534, entitled "Application-Aware and Remote Single Instance Data Management";

U.S. Pat. Pub. No. 2012/0150818, entitled "Client-Side Repository in a Networked Deduplicated Storage System"; and U.S. Pat. Pub. No. 2012/0150826, entitled "Distributed Deduplicated Storage System".

Information management system 100 can include a variety of computing devices and computing technologies. For instance, system 100 can include one or more client computing devices 102 and secondary storage computing devices 106, as well as storage manager 140 or a host computing device for it. Computing devices can include, without limitation, one or more: workstations, personal computers, desktop computers, or other types of generally fixed computing systems such as mainframe computers, servers, and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Servers can include mail servers, file servers, database servers, and web servers. Computing devices may comprise one or more processors (e.g., CPU and/or single-core or multi-core processors), as well as non-transitory computer-readable memory (e.g., random-access memory (RAM)) for storing computer programs to be executed by the one or more processors. Other computer-readable memory for mass storage of data may be packaged/configured with the computing device (e.g., an internal hard disk) and/or may be external and accessible by the computing device (e.g., network-attached storage).

In some cases, a computing device includes cloud computing resources, which may be virtual machines. For instance, one or more virtual machines may be provided to the organization by a third-party cloud service vendor. In some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine.

A virtual machine includes an operating system and associated virtual resources, and is hosted simultaneously with another operating system on a physical host computer (or host machine). A hypervisor (typically software, and also known in the art as a virtual machine monitor or a virtual machine manager or "VMM") sits between the virtual machine and the hardware of the physical host machine. Examples of hypervisors as virtualization software include ESX Server, by VMware, Inc. of Palo Alto, Calif.; Microsoft Virtual Server and Microsoft Windows Server Hyper-V, both by Microsoft Corporation of Redmond, Wash.; and Sun xVM by Oracle America Inc. of Santa Clara, Calif. In some embodiments, the hypervisor may be firmware or hardware or a combination of software and/or firmware and/or hardware. The hypervisor provides resources to each virtual operating system such as a virtual processor, virtual memory, a virtual network device, and a virtual disk. Each virtual machine has one or more virtual disks. The hypervisor typically stores the data of virtual disks in files on the file system of the physical host machine, called virtual machine disk files (in VMware lingo) or virtual hard disk image files (in Microsoft lingo). For example, VMware's ESX Server provides the Virtual Machine File System (VMFS) for the storage of virtual machine disk files. A virtual machine reads data from and writes data to its virtual disk much the e way that a physical machine reads data from and writes data to a physical disk. Examples of techniques for implementing information management in a cloud computing environment are described in U.S. Pat. No. 8,285,681. Examples of techniques for implementing information management in a virtualized computing environment are described in U.S. Pat. No. 8,307,177.

Information management system 100 can also include a variety of electronic data storage devices, generally used for mass storage of data, including, e.g., primary storage devices 104 and secondary storage devices 108. Storage devices can generally be of any suitable type including, without limitation, disk drives, storage arrays (e.g., storage-area network (SAN) and/or network-attached storage (NAS) technology), semiconductor memory (e.g., solid state storage devices), network attached storage (NAS) devices, tape libraries or other magnetic, non-tape storage devices, optical media storage devices, DNA/RNA-based memory technology, combinations of the same, etc. In some embodiments, storage devices can form part of a distributed file system. In some cases, storage devices are provided in a cloud storage environment (e.g., a private cloud or one operated by a third-party vendor), whether for primary data or secondary copies or both.

Figure 1B:
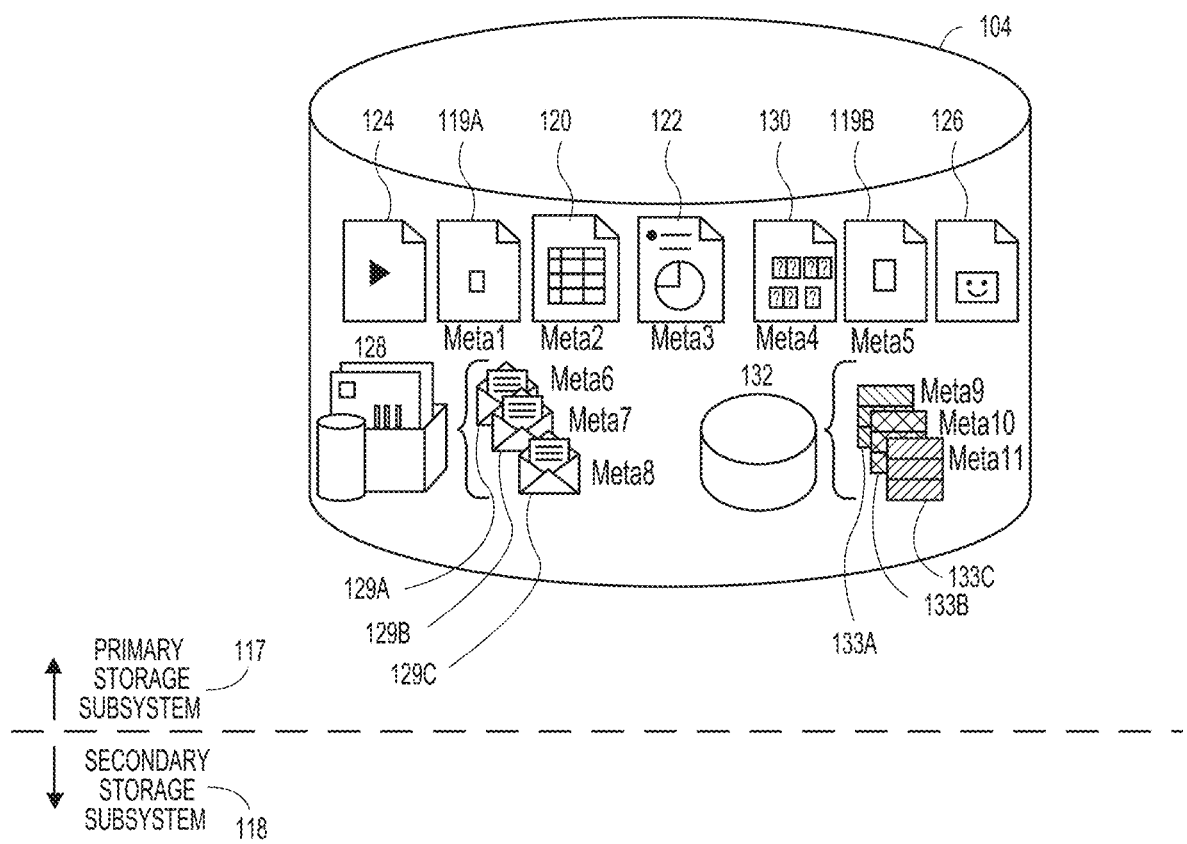
FIG. 1B is a detailed view of a primary storage device, a secondary storage device, and some examples of primary data and secondary copy data.
Figure 1B:
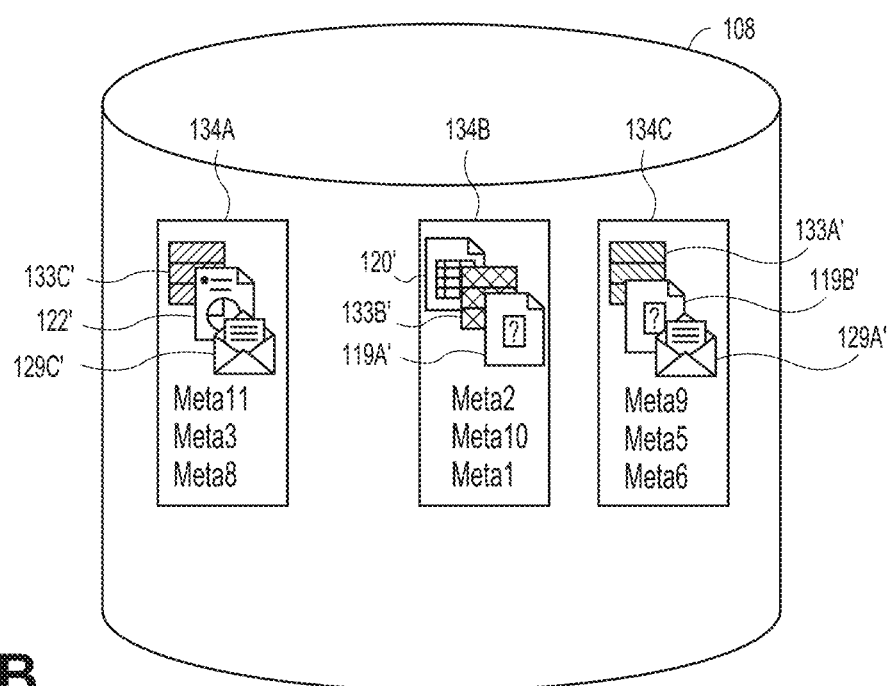
Figure 1C:
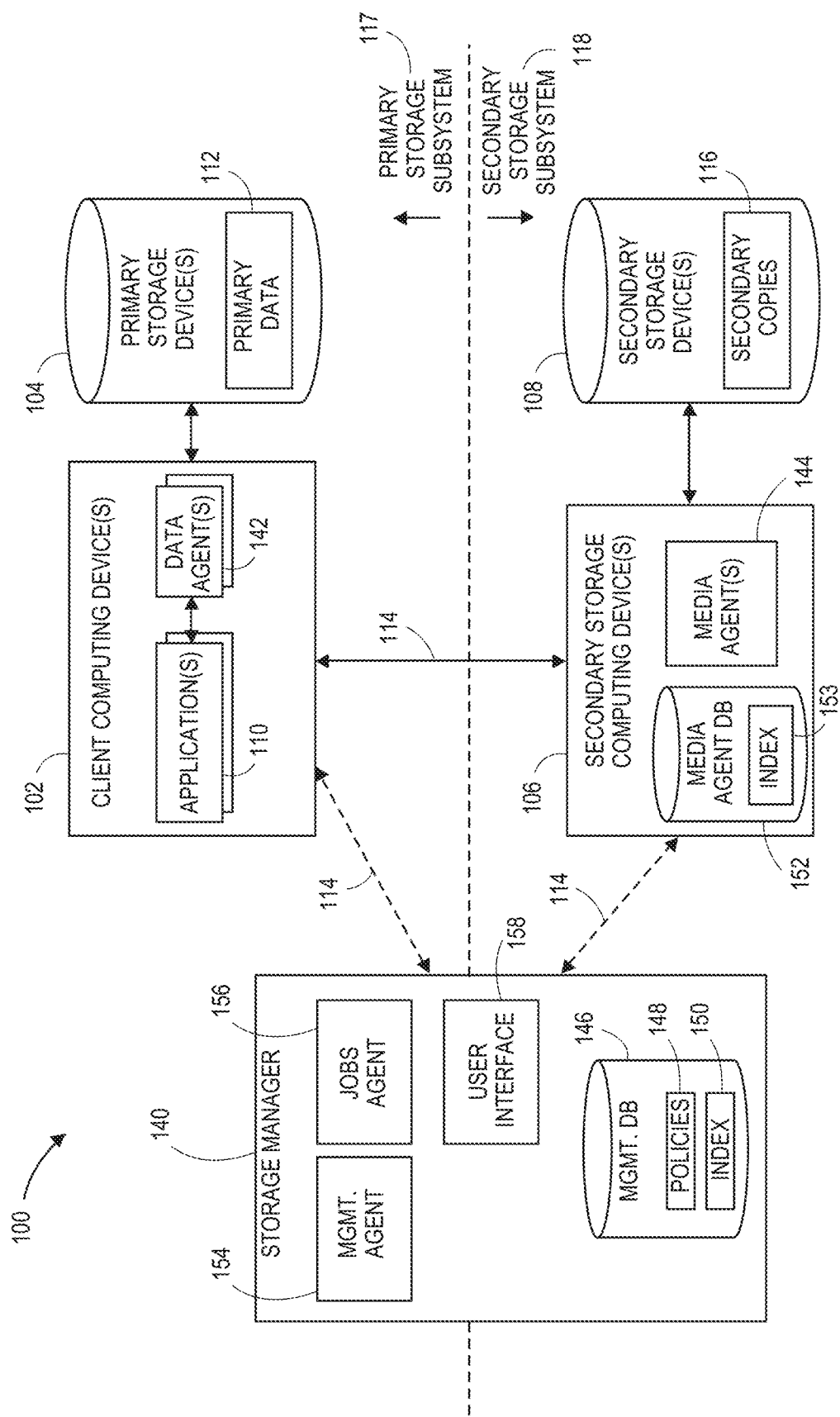
FIG. 1C is a block diagram of an exemplary information management system including a storage manager, one or more data agents, and one or more media agents.

Depending on context, the term "information management system" can refer to generally all of the illustrated hardware and software components in FIG. 1C, or the term may refer to only a subset of the illustrated components. For instance, in some cases, system 100 generally refers to a combination of specialized components used to protect, move, manage, manipulate, analyze, and/or process data and metadata generated by client computing devices 102. However, system 100 in some cases does not include the underlying components that generate and/or store primary data 112, such as the client computing devices 102 themselves, and the primary storage devices 104. Likewise secondary storage devices 108 (e.g., a third-party provided cloud storage environment) may not be part of system 100. As an example, "information management system" may sometimes refer to one or more of the following components, which will be described in further detail below: storage manager, data agent, and media agent.

Information management system 100 includes one or more client computing devices 102 having an operating system and at least one application 110 executing thereon; and one or more primary storage devices 104 storing primary data 112. Client computing device(s) 102 and primary storage devices 104 may generally be referred to in some cases as primary storage subsystem 117.

Client Computing Devices, Clients, and Subclients

Typically, a variety of sources in an organization produce data to be protected and managed. As just one illustrative example, in a corporate environment such data sources can be employee workstations and company servers such as a mail server, a web server, a database server, a transaction server, or the like. In system 100, data generation sources include one or more client computing devices 102. A computing device that has a data agent 142 installed and operating on it is generally referred to as a "client computing device" 102, and may include any type of computing device, without limitation. A client computing device 102 may be associated with one or more users and/or user accounts.

A "client" is a logical component of information management system 100, which may represent a logical grouping of one or more agents installed on a client computing device 102. Storage manager 140 recognizes a client as a component of system 100, and in some embodiments, may automatically create a client component the first time a data agent 142 is installed on a client computing device 102. Because data generated by executable component(s) 110 is tracked by the associated data agent 142 so that it may be properly protected in system 100, a client may be said to generate data and to store the generated data to primary storage, such as primary storage device 104. However, the terms "client" and "client computing device" as used herein do not imply that a client computing device 102 is necessarily configured in the client/server sense relative to another computing device such as a mail server, or that a client computing device 102 cannot be a server in its own right. As just a few examples, a client computing device 102 can be and/or include mail servers, file servers, database servers, and web servers.

Each client computing device 102 may have application(s) 110 executing thereon which generate and manipulate the data that is to be protected from loss and managed in system 100. Applications 110 generally facilitate the operations of an organization, and can include, without limitation, mail server applications (e.g., Microsoft Exchange Server), file server applications, mail client applications (e.g., Microsoft Exchange Client), database applications or database management systems (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on. Each application 110 may be accompanied by an application-specific data agent 142. A file system, e.g., Microsoft Windows Explorer, may be considered an application 110 and may be accompanied by its own data agent 142. Client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110. In some embodiments, a virtual machine that executes on a host client computing device 102 may be considered an application 110 and may be accompanied by a specific data agent 142 (e.g., virtual server data agent).

Client computing devices 102 and other components in system 100 can be connected to one another via one or more electronic communication pathways 114. For example, a first communication pathway 114 may communicatively couple client computing device 102 and secondary storage computing device 106; a second communication pathway 114 may communicatively couple storage manager 140 and client computing device 102; and a third communication pathway 114 may communicatively couple storage manager 140 and secondary storage computing device 106, etc. (see, e.g., FIG. 1A and FIG. 1C). A communication pathway 114 can include one or more networks or other connection types including one or more of the following, without limitation: the Internet, a wide area network (WAN), a local area network (LAN), a Storage Area Network (SAN), a Fibre Channel (FC) connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate computer or telecommunications networks, combinations of the same or the like. Communication pathways 114 in some cases may also include application programming interfaces (APIs) including, e.g., cloud service provider APIs, virtual machine management APIs, and hosted service provider APIs. The underlying infrastructure of communication pathways 114 may be wired and/or wireless, analog and/or digital, or any combination thereof; and the facilities used may be private, public, third-party provided, or any combination thereof, without limitation.

A "subclient" is a logical grouping of all or part of a client's primary data 112. In general a subclient may be defined according to how the subclient data is to be protected as a unit in system 100. For example, a subclient may be associated with a certain storage policy. A given client may thus comprise several subclients, each subclient associated with a different storage policy. For example, some files may form a first subclient that requires compression and deduplication and is associated with a first storage policy. Other files of the client may form a second subclient that requires a different retention schedule as well as encryption, and may be associated with a different, second storage policy. As a result, though the primary data may be generated by the same application 110, and may belong to one given client, portions of the data may be assigned to different subclients for distinct treatment by the information management system. More detail on subclients is given in regard to storage policies below.

Primary Data and Exemplary Primary Storage Devices

Primary data 112 is generally production data or other "live" data generated by the operating system and/or applications 110 executing on client computing device 102. Primary data 112 is generally stored on primary storage device(s) 104 and is organized via a file system operating on the client computing device 102. Thus, client computing device(s) 102 and corresponding applications 110 may create, access, modify, write, delete, and otherwise use primary data 112. Primary data 112 is generally in the native format of the source application 110. According to certain aspects, primary data 112 is an initial or first stored body of data generated by the source application 110. Primary data 112 in some cases is created substantially directly from data generated by the corresponding source application 110.

Primary storage devices 104 storing primary data 112 may be relatively fast and/or expensive technology (e.g., a disk drive, a hard-disk storage array, solid state memory, etc.), typically because they must support high-performance live production environments. Primary data 112 may be highly changeable and/or may be intended for relatively short term retention (e.g., hours, days, or weeks). According to some embodiments, client computing device 102 can access primary data 112 stored in primary storage device 104 by making conventional file system calls via the operating system. Primary data 112 may include structured data (e.g., database files), unstructured data (e.g., documents), and/or semi-structured data. See, e.g., FIG. 1B.

It can be useful in performing certain tasks to organize primary data 112 into units of different granularities. In general, primary data 112 can include files, directories, file system volumes, data blocks, extents, or any other hierarchies or organizations of data objects. As used herein, a "data object" can refer to (i) any file that is currently addressable by a file system or that was previously addressable by the file system (e.g., an archive file), and (ii) a subset of such a file (e.g., a data block, an extent, etc.).

It can also be useful in performing certain functions of system 100 to access and modify metadata within primary data 112. Metadata generally includes information about data objects and/or characteristics associated with the data objects. For simplicity herein, it is to be understood that, unless expressly stated otherwise, any reference to primary data 112 generally also includes its associated metadata, but references to metadata generally do not include the primary data. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications 110 and/or other components of system 100 maintain indices of metadata for data objects, e.g., metadata associated with individual email messages. The use of metadata to perform classification and other functions is described in greater detail below.

Each client computing device 102 is generally associated with and/or in communication with one or more primary storage devices 104 storing corresponding primary data 112. A client computing device 102 may be considered to be associated with or in communication with a primary storage device 104 if it is capable of one or more of: routing and/or storing data (e.g., primary data 112) to the particular primary storage device 104, coordinating the routing and/or storing of data to the particular primary storage device 104, retrieving data from the particular primary storage device 104, coordinating the retrieval of data from the particular primary storage device 104, and modifying and/or deleting data in the particular primary storage device 104. A client computing device 102 may be said to access data stored in an associated storage device 104.

Primary storage device 104 may be dedicated or shared. In some cases, each primary storage device 104 is dedicated to an associated client computing device 102, e.g., a local disk drive. In other cases, one or more primary storage devices 104 can be shared by multiple client computing devices 102, e.g., via a local network, in a cloud storage implementation, etc. As one example, primary storage device 104 can be a storage array shared by a group of client computing devices 102, such as EMC Clariion, EMC Symmetrix, EMC Celerra, Dell EqualLogic, IBM XIV, NetApp FAS, HP EVA, and HP 3PAR.

Information management system 100 may also include hosted services (not shown), which may be hosted in some cases by an entity other than the organization that employs the other components of system 100. For instance, the hosted services may be provided by online service providers. Such service providers can provide social networking services, hosted email services, or hosted productivity applications or other hosted applications such as software-as-a-service (SaaS), platform-as-a-service (PaaS), application service providers (ASPs), cloud services, or other mechanisms for delivering functionality via a network. As it services users, each hosted service may generate additional data and metadata, which may be managed by system 100, e.g., as primary data 112. In some cases, the hosted services may be accessed using one of the applications 110. As an example, a hosted mail service may be accessed via browser running on a client computing device 102. Secondary Copies and Exemplary Secondary Storage Devices Primary data 112 stored on primary storage devices 104 may be compromised in some cases, such as when an employee deliberately or accidentally deletes or overwrites primary data 112. Or primary storage devices 104 can be damaged, lost, or otherwise corrupted. For recovery and/or regulatory compliance purposes, it is therefore useful to generate and maintain copies of primary data 112. Accordingly, system 100 includes one or more secondary storage computing devices 106 and one or more secondary storage devices 108 configured to create and store one or more secondary copies 116 of primary data 112 including its associated metadata. The secondary storage computing devices 106 and the secondary storage devices 108 may be referred to as secondary storage subsystem 118.

Creation of secondary copies 116 can help in search and analysis efforts and meet other information management goals as well, such as: restoring data and/or metadata if an original version is lost (e.g., by deletion, corruption, or disaster); allowing point-in-time recovery; complying with regulatory data retention and electronic discovery (e-discovery) requirements; reducing utilized storage capacity in the production system and/or in secondary storage; facilitating organization and search of data; improving user access to data files across multiple computing devices and/or hosted services; and implementing data retention policies.

A secondary copy 116 can comprise a separate stored copy of data that is derived from one or more earlier-created stored copies (e.g., derived from primary data 112 or from another secondary copy 116). Secondary copies 116 can include point-in-time data, and may be intended for relatively long-term retention, before some or all of the data is moved to other storage or discarded. In some cases, a secondary copy 116 may be in a different storage device than other previously stored copies; and/or may be remote from other previously stored copies. Secondary copies 116 can be stored in the same storage device as primary data 112. For example, a disk array capable of performing hardware snapshots stores primary data 112 and creates and stores hardware snapshots of the primary data 112 as secondary copies 116. Secondary copies 116 may be stored in relatively slow and/or lower cost storage (e.g., magnetic tape). A secondary copy 116 may be stored in a backup or archive format, or in some other format different from the native source application format or other format of primary data 112.

Secondary storage computing devices 106 may index secondary copies 116 (e.g., using a media agent 144), so that users can browse and restore at a later time. After creation of a secondary copy 116 representative of certain primary data 112, a pointer or other location indicia (e.g., a stub) may be placed in primary data 112, or be otherwise associated with primary data 112, to indicate the current location on secondary storage device(s) 108 of a particular secondary copy 116.

Since an instance of a data object or metadata in primary data 112 may change over time as it is modified by application 110 (or hosted service or the operating system), system 100 may create and manage multiple secondary copies 116 of a particular data object or metadata, each copy representing the state of the data object in primary data 112 at a particular point in time. Moreover, since an instance of a data object in primary data 112 may eventually be deleted from primary storage device 104 and the file system, system 100 may continue to manage point-in-time representations of that data object, even though the instance in primary data 112 no longer exists.

For virtual machines, the operating system and other applications 110 of client computing device(s) 102 may execute within or under the management of virtualization software (e.g., a VMM), and the primary storage device(s) 104 may comprise a virtual disk created on a physical storage device. System 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112. First, secondary copies 116 can be stored in a different format (e.g., backup, archive, or other non-native format) than primary data 112. For this or other reasons, secondary copies 116 may not be directly useable by applications 110 or client computing device 102 (e.g., via standard system calls or otherwise) without modification, processing, or other intervention by system 100 which may be referred to as "restore" operations. Secondary copies 116 may have been processed by data agent 142 and/or media agent 144 in the course of being created (e.g., compression, deduplication, encryption, integrity markers, indexing, formatting, etc.), and thus secondary copy 116 may represent source primary data 112 without necessarily being exactly identical to the source.

Second, secondary copies 116 may be stored on a secondary storage device 108 that is inaccessible to application 110 running on client computing device 102 and/or hosted service. Some secondary copies 116 may be "offline copies," in that they are not readily available (e.g., not mounted to tape or disk). Offline copies can include copies of data that system 100 can access without human intervention (e.g., tapes within an automated tape library, but not yet mounted in a drive), and copies that the system 100 can access only with some human intervention (e.g., tapes located at an offsite storage site).

Using Intermediate Devices for Creating Secondary Copies—Secondary Storage Computing Devices Creating secondary copies can be challenging. For instance, hundreds or thousands of client computing devices 102 may be continually generating large volumes of primary data 112 to be protected. Also, there can be significant overhead involved in the creation of secondary copies 116. Moreover, secondary storage devices 108 may be special-purpose components, and devices that write to, read from, or otherwise interact with secondary storage devices 108, such as secondary storage computing devices 106 and corresponding media agents 144, may require specialized programmed intelligence and/or hardware capability. Client computing devices 102 may interact directly with a secondary storage device 108 to create secondary copies 116; however, in view of the factors described above, this approach can negatively impact the ability of client computing device 102 to serve/service application 110 and produce primary data 112. Further, any given client computing device 102 may not be optimized for interaction with certain secondary storage devices 108.

Thus, information management system 100 may include one or more software and/or hardware components which generally act as intermediaries between client computing devices 102 (that generate primary data 112) and secondary storage devices 108 (that store secondary copies 116). In addition to off-loading certain responsibilities from client computing devices 102, these intermediate components can provide other benefits. For instance, as discussed further below with respect to FIG. 1D, distributing some of the work involved in creating secondary copies 116 can enhance scalability and improve system performance. For instance, using specialized secondary storage computing devices 106 and media agents 144 for interfacing with secondary storage devices 108 and/or for performing certain data processing operations can greatly improve the speed with which system 100 performs information management operations and can also improve the capacity of the system to handle large numbers of such operations, while reducing the computational load on the production environment of client computing devices 102. The intermediate components can include one or more secondary storage computing devices 106 as shown in FIG. 1A and/or one or more media agents 144. Media agents are discussed further below (e.g., with respect to FIGS. 1C-1E).

Secondary storage computing device(s) 106 can comprise any of the computing devices described above, without limitation. In some cases, secondary storage computing device(s) 106 also include specialized hardware and/or software componentry for interacting with certain secondary storage device(s) 108 with which they may be specially associated.

To create a secondary copy 116 involving the copying of data from primary storage subsystem 117 to secondary storage subsystem 118, client computing device 102 may communicate the primary data 112 to be copied (or a processed version thereof) to the designated secondary storage computing device 106, via a communication pathway 114. Secondary storage computing device 106 in turn may perform further processing and may convey the data (or a processed version thereof) to secondary storage device 108. One or more secondary copies 116 may be created from existing secondary copies 116, such as in the case of an auxiliary copy operation, described further below.

Exemplary Primary Data and an Exemplary Secondary Copy

FIG. 1B is a detailed view showing some specific examples of primary data stored on primary storage device(s) 104 and secondary copy data stored on secondary storage device(s) 108, with other components of the system removed for the purposes of illustration. Stored on the primary storage device(s) 104 are primary data 112 objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables or other data structures 133A-133C). Some or all primary data 112 objects are associated with corresponding metadata (e.g., "Meta1-11"), which may include file system metadata and/or application-specific metadata. Stored on the secondary storage device(s) 108 are secondary copy 116 data objects 134A-C which may include copies of or may otherwise represent corresponding primary data 112.

Secondary copy data objects 134A-C can individually represent more than one primary data object. For example, secondary copy data object 134A represents three separate primary data objects 133C, 122, and 129C (represented as 133C', 122', and 129C', respectively, and accompanied by corresponding metadata Meta11, Meta3, and Meta8, respectively). Moreover, as indicated by the prime mark ('), secondary storage computing devices 106 or other components in secondary storage subsystem 118 may process the data received from primary storage subsystem 117 and store a secondary copy including a transformed and/or supplemented representation of a primary data object and/or metadata that is different from the original format, e.g., in a compressed, encrypted, deduplicated, or other modified format. For instance, secondary storage computing devices 106 can generate new metadata or other information based on said processing, and store the newly generated information along with the secondary copies. Secondary copy data object 1346 represents primary data objects 120, 1336, and 119A as 120', 1336', and 119A', respectively, accompanied by corresponding metadata Meta2, Meta10, and Meta1, respectively. Also, secondary copy data object 134C represents primary data objects 133A, 1196, and 129A as 133A', 1196', and 129A', respectively, accompanied by corresponding metadata Meta9, Meta5, and Meta6, respectively.

Exemplary Information Management System Architecture

Information management system 100 can incorporate a variety of different hardware and software components, which can in turn be organized with respect to one another in many different configurations, depending on the embodiment. There are critical design choices involved in specifying the functional responsibilities of the components and the role of each component in system 100. Such design choices can impact performance as well as the adaptability of system 100 to data growth and other changing circumstances.

FIG. 1C shows an information management system 100 designed according to these considerations and which includes: storage manager 140, one or more data agents 142 executing on client computing device(s) 102 and configured to process primary data 112, and one or more media agents 144 executing on the one or more secondary storage computing devices 106 for performing tasks involving the secondary storage devices 108.

Storage Manager

Storage manager 140 is a centralized storage and/or information manager that is configured to perform certain control functions and also to store certain critical information about system 100. As noted, the number of components in system 100 and the amount of data under management can be large. Managing the components and data is therefore a significant task, which can grow unpredictably as the number of components and data scale to meet the needs of the organization. For these and other reasons, according to certain embodiments, responsibility for controlling system 100, or at least a significant portion of that responsibility, is allocated to storage manager 140. Storage manager 140 can be adapted independently according to changing circumstances, without having to replace or re-design the remainder of the system. Moreover, a computing device for hosting and/or operating as storage manager 140 can be selected to best suit the functions and networking needs of storage manager 140. These and other advantages are described in further detail below and with respect to FIG. 1D.

Storage manager 140 may be a software module or other application, which, in some embodiments operates in conjunction with one or more associated data structures such as a dedicated database (e.g., management database 146). In some embodiments, storage manager 140 is itself a computing device that performs the functions described herein. The storage manager generally initiates, performs, coordinates and/or controls storage and other information management operations performed by the system 100, e.g., to protect and control primary data 112 and secondary copies 116. In general, storage manager 100 may be said to manage information management system 100, which includes managing constituent components such as data agents and media agents, etc.

As shown by the dashed arrowed lines 114 in FIG. 1C, storage manager 140 may communicate with and/or control some or all elements of the information management system 100, such as data agents 142 and media agents 144. In this manner, storage manager 140 may control the operation of various hardware and software components in system 100. In certain embodiments, control information originates from storage manager 140 and status as well as index reporting is transmitted to storage manager 140 by the managed components, whereas payload data and metadata are generally communicated between data agents 142 and media agents 144 (or otherwise between client computing device(s) 102 and secondary storage computing device(s) 106), e.g., at the direction of and under the management of storage manager 140. Control information can generally include parameters and instructions for carrying out information management operations, such as, without limitation, instructions to perform a task associated with an operation, timing information specifying when to initiate a task, data path information specifying what components to communicate with or access in carrying out an operation, and the like. In other embodiments, some information management operations are controlled or initiated by other components of system 100 (e.g., by media agents 144 or data agents 142), instead of or in combination with storage manager 140.

According to certain embodiments, storage manager 140 provides one or more of the following functions:

communicating with data agents 142 and media agents 144, including transmitting instructions, messages, and/or queries, as well as receiving status reports, index information, messages, and/or queries, and responding to same;

initiating execution of information management operations;

initiating restore and recovery operations;

managing secondary storage devices 108 and inventory/capacity of the same;

allocating secondary storage devices 108 for secondary copy operations;

reporting, searching, and/or classification of data in system 100;

monitoring completion of and status reporting related to information management operations and jobs;

tracking movement of data within system 100;

tracking age information relating to secondary copies 116, secondary storage devices 108, comparing the age information against retention guidelines, and initiating data pruning when appropriate;

tracking logical associations between components in system 100;

protecting metadata associated with system 100, e.g., in management database 146;

implementing job management, schedule management, event management, alert management, reporting, job history maintenance, user security management, disaster recovery management, and/or user interfacing for system administrators and/or end users of system 100;

sending, searching, and/or viewing of log files; and implementing operations management functionality.

Storage manager 140 may maintain an associated database 146 (or "storage manager database 146" or "management database 146") of management-related data and information management policies 148. Database 146 can be stored in computer memory accessible by storage manager 140. Database 146 may include a management index 150 (or "index 150") or other data structure(s) that may store: logical associations between components of the system; user preferences and/or profiles (e.g., preferences regarding encryption, compression, or deduplication of primary data or secondary copies; preferences regarding the scheduling, type, or other aspects of secondary copy or other operations; mappings of particular information management users or user accounts to certain computing devices or other components, etc.; management tasks; media containerization; or other useful data. For example, storage manager 140 may use index 150 to track logical associations between media agents 144 and secondary storage devices 108 and/or movement of data from primary storage devices 104 to secondary storage devices 108. For instance, index 150 may store data associating a client computing device 102 with a particular media agent 144 and/or secondary storage device 108, as specified in an information management policy 148.

Administrators and others may configure and initiate certain information management operations on an individual basis. But while this may be acceptable for some recovery operations or other infrequent tasks, it is often not workable for implementing ongoing organization-wide data protection and management. Thus, system 100 may utilize information management policies 148 for specifying and executing information management operations on an automated basis. Generally, an information management policy 148 can include a stored data structure or other information source that specifies parameters (e.g., criteria and rules) associated with storage management or other information management operations. Storage manager 140 can process an information management policy 148 and/or index 150 and, based on the results, identify an information management operation to perform, identify the appropriate components in system 100 to be involved in the operation (e.g., client computing devices 102 and corresponding data agents 142, secondary storage computing devices 106 and corresponding media agents 144, etc.), establish connections to those components and/or between those components, and/or instruct and control those components to carry out the operation. In this manner, system 100 can translate stored information into coordinated activity among the various computing devices in system 100.

Management database 146 may maintain information management policies 148 and associated data, although information management policies 148 can be stored in computer memory at any appropriate location outside management database 146. For instance, an information management policy 148 such as a storage policy may be stored as metadata in a media agent database 152 or in a secondary storage device 108 (e.g., as an archive copy) for use in restore or other information management operations, depending on the embodiment. Information management policies 148 are described further below. According to certain embodiments, management database 146 comprises a relational database (e.g., an SQL database) for tracking metadata, such as metadata associated with secondary copy operations (e.g., what client computing devices 102 and corresponding subclient data were protected and where the secondary copies are stored and which media agent 144 performed the secondary storage). This and other metadata may additionally be stored in other locations, such as at secondary storage computing device 106 or on the secondary storage device 108, allowing data recovery without the use of storage manager 140 in some cases. Thus, management database 146 may comprise data needed to kick off secondary copy operations (e.g., storage policies), status and reporting information about completed jobs (e.g., status on yesterday's backup jobs), and additional information sufficient to enable restore and disaster recovery operations (e.g., media agent associations, location indexing, content indexing, etc.)

Storage manager 140 may include a jobs agent 156, a user interface 158, and a management agent 154, all of which may be implemented as interconnected software modules or application programs. These are described further below.

Jobs agent 156 in some embodiments initiates, controls, and/or monitors the status of some or all information management operations previously performed, currently being performed, or scheduled to be performed by system 100. A job may be a logical grouping of information management operations such as generating backup copies of a primary data 112 subclient at a certain time every day. Thus, jobs agent 156 may access information management policies 148 (e.g., in management database 146) to determine when and how to initiate/control jobs in system 100.

Storage Manager User Interfaces

User interface 158 may include information processing and display software, such as a graphical user interface (GUI), an application program interface (API), and/or other interactive interface(s) through which users and system processes can retrieve information about the status of information management operations or issue instructions to system 100 and/or its constituent components. Via user interface 158, users may issue instructions to the components in system 100 regarding performance of secondary copy and recovery operations. For example, a user may modify a schedule concerning the number of pending secondary copy operations. As another example, a user may employ the GUI to view the status of pending secondary copy jobs or to monitor the status of certain components in system 100 (e.g., the amount of capacity left in a storage device). Storage manager 140 may track information that permits it to select, designate, or otherwise identify content indices, deduplication databases, or similar databases or resources or data sets within its information management cell (or another cell) to be searched in response to certain queries. Such queries may be entered by the user by interacting with user interface 158.

Various embodiments of information management system 100 may be configured and/or designed to generate user interface data useable for rendering the various interactive user interfaces described. The user interface data may be used by system 100 and/or by another system, device, and/or software program (for example, a browser program), to render the interactive user interfaces. The interactive user interfaces may be displayed on, for example, electronic displays (including, for example, touch-enabled displays), consoles, etc., whether direct-connected to storage manager 140 or communicatively coupled remotely, e.g., via an internet connection. The present disclosure describes various embodiments of interactive and dynamic user interfaces, some of which may be generated by user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like. User interface 158 may operate in a single integrated view or console (not shown). The console may support a reporting capability for generating a variety of reports, which may be tailored to a particular aspect of information management.

User interfaces are not exclusive to storage manager 140 and in some embodiments a user may access information locally from a computing device component of system 100. For example, some information pertaining to installed data agents 142 and associated data streams may be available from client computing device 102. Likewise, some information pertaining to media agents 144 and associated data streams may be available from secondary storage computing device 106.

Storage Manager Management Agent

Management agent 154 can provide storage manager 140 with the ability to communicate with other components within information management system 100 and/or with other information management cells via network protocols and application programming interfaces (APIs) including, e.g., HTTP, HTTPS, FTP, REST, virtualization software APIs, cloud service provider APIs, and hosted service provider APIs.

Management agent 154 also allows multiple information management cells to communicate with one another. For example, system 100 in some cases may be one information management cell in a network of multiple cells adjacent to one another or otherwise logically related, e.g., in a WAN or LAN. With this arrangement, the cells may communicate with one another through respective management agents 154. Inter-cell communication and hierarchy is described in greater detail in e.g., U.S. Pat. No. 7,343,453.

Information Management Cell

An "information management cell" (or "storage operation cell" or "cell") may generally include a logical and/or physical grouping of a combination of hardware and software components associated with performing information management operations on electronic data, typically one storage manager 140 and at least one data agent 142 (executing on a client computing device 102) and at least one media agent 144 (executing on a secondary storage computing device 106). For instance, the components shown in FIG. 1C may together form an information management cell. Thus, in some configurations, a system 100 may be referred to as an information management cell. A given cell may be identified by the identity of its storage manager 140, which is generally responsible for managing the cell.

Multiple cells may be organized hierarchically, so that cells may inherit properties from hierarchically superior cells or be controlled by other cells in the hierarchy (automatically or otherwise). Alternatively, in some embodiments, cells may inherit or otherwise be associated with information management policies, preferences, information management operational parameters, or other properties or characteristics according to their relative position in a hierarchy of cells. Cells may also be organized hierarchically according to function, geography, architectural considerations, or other factors useful or desirable in performing information management operations. For example, a first cell may represent a geographic segment of an enterprise, such as a Chicago office, and a second cell may represent a different geographic segment, such as a New York City office. Other cells may represent departments within a particular office, e.g., human resources, finance, engineering, etc. Where delineated by function, a first cell may perform one or more first types of information management operations (e.g., one or more first types of secondary copies at a certain frequency), and a second cell may perform one or more second types of information management operations (e.g., one or more second types of secondary copies at a different frequency and under different retention rules). In general, the hierarchical information is maintained by one or more storage managers 140 that manage the respective cells (e.g., in corresponding management database(s) 146).

Data Agents

A variety of different applications 110 can operate on a given client computing device 102, including operating systems, file systems, database applications, e-mail applications, and virtual machines, just to name a few. And, as part of the process of creating and restoring secondary copies 116, the client computing device 102 may be tasked with processing and preparing the primary data 112 generated by these various applications 110. Moreover, the nature of the processing/preparation can differ across application types, e.g., due to inherent structural, state, and formatting differences among applications 110 and/or the operating system of client computing device 102. Each data agent 142 is therefore advantageously configured in some embodiments to assist in the performance of information management operations based on the type of data that is being protected at a client-specific and/or application-specific level.

Data agent 142 is a component of information system 100 and is generally directed by storage manager 140 in creating or restoring secondary copies 116. Data agent 142 may be a software program (e.g., a set of executable binary files) that executes on the same client computing device 102 as the associated application 110 that data agent 142 is configured to protect. Data agent 142 is generally responsible for managing, initiating, or otherwise assisting in the performance of information management operations in reference to its associated application(s) 110 and corresponding primary data 112 which is generated/accessed by the particular application(s). For instance, data agent 142 may take part in copying, archiving, migrating, and/or replicating of primary data 112 stored in the primary storage device(s) 104. Data agent 142 may receive control information from storage manager 140, such as commands to transfer copies of data objects and/or metadata to one or more media agents 144. Data agent 142 also may compress, deduplicate, and encrypt primary data 112 before transmitting it to media agent 144. Data agent 142 also may receive instructions from storage manager 140 to restore (or assist in restoring) a secondary copy 116 from secondary storage device 108 to primary storage 104, such that the restored data may be accessed by application 110.

Each data agent 142 may be specialized for a particular application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data. A file system data agent, for example, may handle data files and/or other file system information. If a client computing device 102 has two or more types of data 112, a specialized data agent 142 may be used for each data type. For example, to backup, migrate, and/or restore all of the data on a Microsoft Exchange server, the client computing device 102 may use: a Microsoft Exchange Mailbox data agent 142 to back up the Exchange mailboxes; a Microsoft Exchange Database data agent 142 to back up the Exchange databases; a Microsoft Exchange Public Folder data agent 142 to back up the Exchange Public Folders; and a Microsoft Windows File System data agent 142 to back up the file system of client computing device 102. In such embodiments, these specialized data agents 142 may be treated as four separate data agents 142 even though they operate on the same client computing device 102. Other examples may include archive management data agents such as a migration archiver or a compliance archiver, Quick Recovery® agents, and continuous data replication agents. Application-specific data agents 142 can provide improved performance as compared to generic agents. For instance, because application-specific data agents 142 may only handle data for a single software application, the design of the data agent 142 can be streamlined. The data agent 142 may therefore execute faster and consume less persistent storage and/or operating memory than data agents designed to generically accommodate multiple different software applications 110.

Each data agent 142 may be configured to access data and/or metadata stored in the primary storage device(s) 104 associated with data agent 142 and its host client computing device 102, and process the data appropriately. For example, during a secondary copy operation, data agent 142 may arrange or assemble the data and metadata into one or more files having a certain format (e.g., a particular backup or archive format) before transferring the file(s) to a media agent 144 or other component. The file(s) may include a list of files or other metadata.

In some embodiments, a data agent 142 may be distributed between client computing device 102 and storage manager 140 (and any other intermediate components) or may be deployed from a remote location or its functions approximated by a remote process that performs some or all of the functions of data agent 142. In addition, a data agent 142 may perform some functions provided by media agent 144. Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data, while another generic data agent may handle Microsoft Exchange Public Folder data and Microsoft Windows File System data.

Media Agents

As noted, off-loading certain responsibilities from client computing devices 102 to intermediate components such as secondary storage computing device(s) 106 and corresponding media agent(s) 144 can provide a number of benefits including improved performance of client computing device 102, faster information management operations, and enhanced scalability. In one example which will be discussed further below, media agent 144 can act as a local cache of recently-copied data and/or metadata that it stored to secondary storage device(s) 108, thus improving restore capabilities and performance.

Media agent 144 is a component of information system 100 and is generally directed by storage manager 140 in creating or restoring secondary copies 116. Whereas storage manager 140 generally manages information management system 100, media agent 144 provides a portal to secondary storage devices 108. Media agent 144 may be a software program (e.g., a set of executable binary files) that executes on a secondary storage computing device 106. Media agent 144 generally manages, coordinates, and facilitates the transmission of data between a client computing device 102 (executing a data agent 142) and secondary storage device(s) 108. For instance, other components in the system may interact with media agent 144 to gain access to data stored on secondary storage device(s) 108, (e.g., to browse, read, write, modify, delete, or restore data). Moreover, media agents 144 can generate and store information relating to characteristics of the stored data and/or metadata, or can generate and store other types of information that generally provides insight into the contents of the secondary storage devices 108—generally referred to as indexing of the stored secondary copies 116.

Media agents 144 can comprise separate nodes of system 100 (e.g., nodes that are separate from client computing devices 102, storage manager 140, and/or secondary storage devices 108). In general, a node can be a logically and/or physically separate component, and in some cases is a component that is individually addressable or otherwise identifiable. In addition, each media agent 144 may operate on a dedicated secondary storage computing device 106, while in other embodiments a plurality of media agents 144 may operate on the same secondary storage computing device 106.

A media agent 144 may be associated with a particular secondary storage device 108 if that media agent 144 is capable of one or more of: routing and/or storing data to the particular secondary storage device 108; coordinating the routing and/or storing of data to the particular secondary storage device 108; retrieving data from the particular secondary storage device 108; coordinating the retrieval of data from the particular secondary storage device 108; and modifying and/or deleting data retrieved from the particular secondary storage device 108. Media agent 144 in certain embodiments is physically separate from the associated secondary storage device 108. For instance, a media agent 144 may operate on a secondary storage computing device 106 in a distinct housing, package, and/or location from the associated secondary storage device 108. In one example, a media agent 144 operates on a first server computer and is in communication with a secondary storage device(s) 108 operating in a separate rack-mounted RAID-based system.

A media agent 144 associated with a particular secondary storage device 108 may instruct secondary storage device 108 to perform an information management task. For instance, a media agent 144 may instruct a tape library to use a robotic arm or other retrieval means to load or eject a certain storage media, and to subsequently archive, migrate, or retrieve data to or from that media, e.g., for the purpose of restoring data to a client computing device 102. As another example, a secondary storage device 108 may include an array of hard disk drives or solid state drives organized in a RAID configuration, and media agent 144 may forward a logical unit number (LUN) and other appropriate information to the array, which uses the received information to execute the desired secondary copy operation. Media agent 144 may communicate with a secondary storage device 108 via a suitable communications link, such as a SCSI or Fiber Channel link.

Each media agent 144 may maintain an associated media agent database 152. Media agent database 152 may be stored to a disk or other storage device (not shown) that is local to the secondary storage computing device 106 on which media agent 144 operates. In other cases, media agent database 152 is stored separately from the host secondary storage computing device 106. Media agent database 152 can include, among other things, a media agent index 153 (see, e.g., FIG. 1C). In some cases, media agent index 153 does not form a part of and is instead separate from media agent database 152.

Media agent index 153 (or "index 153") may be a data structure associated with the particular media agent 144 that includes information about the stored data associated with the particular media agent and which may be generated in the course of performing a secondary copy operation or a restore. Index 153 provides a fast and efficient mechanism for locating/browsing secondary copies 116 or other data stored in secondary storage devices 108 without having to access secondary storage device 108 to retrieve the information from there. For instance, for each secondary copy 116, index 153 may include metadata such as a list of the data objects (e.g., files/subdirectories, database objects, mailbox objects, etc.), a logical path to the secondary copy 116 on the corresponding secondary storage device 108, location information (e.g., offsets) indicating where the data objects are stored in the secondary storage device 108, when the data objects were created or modified, etc. Thus, index 153 includes metadata associated with the secondary copies 116 that is readily available for use from media agent 144. In some embodiments, some or all of the information in index 153 may instead or additionally be stored along with secondary copies 116 in secondary storage device 108. In some embodiments, a secondary storage device 108 can include sufficient information to enable a "bare metal restore," where the operating system and/or software applications of a failed client computing device 102 or another target may be automatically restored without manually reinstalling individual software packages (including operating systems).

Because index 153 may operate as a cache, it can also be referred to as an "index cache." In such cases, information stored in index cache 153 typically comprises data that reflects certain particulars about relatively recent secondary copy operations. After some triggering event, such as after some time elapses or index cache 153 reaches a particular size, certain portions of index cache 153 may be copied or migrated to secondary storage device 108, e.g., on a least-recently-used basis. This information may be retrieved and uploaded back into index cache 153 or otherwise restored to media agent 144 to facilitate retrieval of data from the secondary storage device(s) 108. In some embodiments, the cached information may include format or containerization information related to archives or other files stored on storage device(s) 108.

In some alternative embodiments media agent 144 generally acts as a coordinator or facilitator of secondary copy operations between client computing devices 102 and secondary storage devices 108, but does not actually write the data to secondary storage device 108. For instance, storage manager 140 (or media agent 144) may instruct a client computing device 102 and secondary storage device 108 to communicate with one another directly. In such a case, client computing device 102 transmits data directly or via one or more intermediary components to secondary storage device 108 according to the received instructions, and vice versa. Media agent 144 may still receive, process, and/or maintain metadata related to the secondary copy operations, i.e., may continue to build and maintain index 153. In these embodiments, payload data can flow through media agent 144 for the purposes of populating index 153, but not for writing to secondary storage device 108.

Media agent 144 and/or other components such as storage manager 140 may in some cases incorporate additional functionality, such as data classification, content indexing, deduplication, encryption, compression, and the like. Further details regarding these and other functions are described below.

Distributed, Scalable Architecture

As described, certain functions of system 100 can be distributed amongst various physical and/or logical components. For instance, one or more of storage manager 140, data agents 142, and media agents 144 may operate on computing devices that are physically separate from one another. This architecture can provide a number of benefits. For instance, hardware and software design choices for each distributed component can be targeted to suit its particular function. The secondary computing devices 106 on which media agents 144 operate can be tailored for interaction with associated secondary storage devices 108 and provide fast index cache operation, among other specific tasks. Similarly, client computing device(s) 102 can be selected to effectively service applications 110 in order to efficiently produce and store primary data 112.

Moreover, in some cases, one or more of the individual components of information management system 100 can be distributed to multiple separate computing devices. As one example, for large file systems where the amount of data stored in management database 146 is relatively large, database 146 may be migrated to or may otherwise reside on a specialized database server (e.g., an SQL server) separate from a server that implements the other functions of storage manager 140. This distributed configuration can provide added protection because database 146 can be protected with standard database utilities (e.g., SQL log shipping or database replication) independent from other functions of storage manager 140. Database 146 can be efficiently replicated to a remote site for use in the event of a disaster or other data loss at the primary site. Or database 146 can be replicated to another computing device within the same site, such as to a higher performance machine in the event that a storage manager host computing device can no longer service the needs of a growing system 100.

Figure 1D:
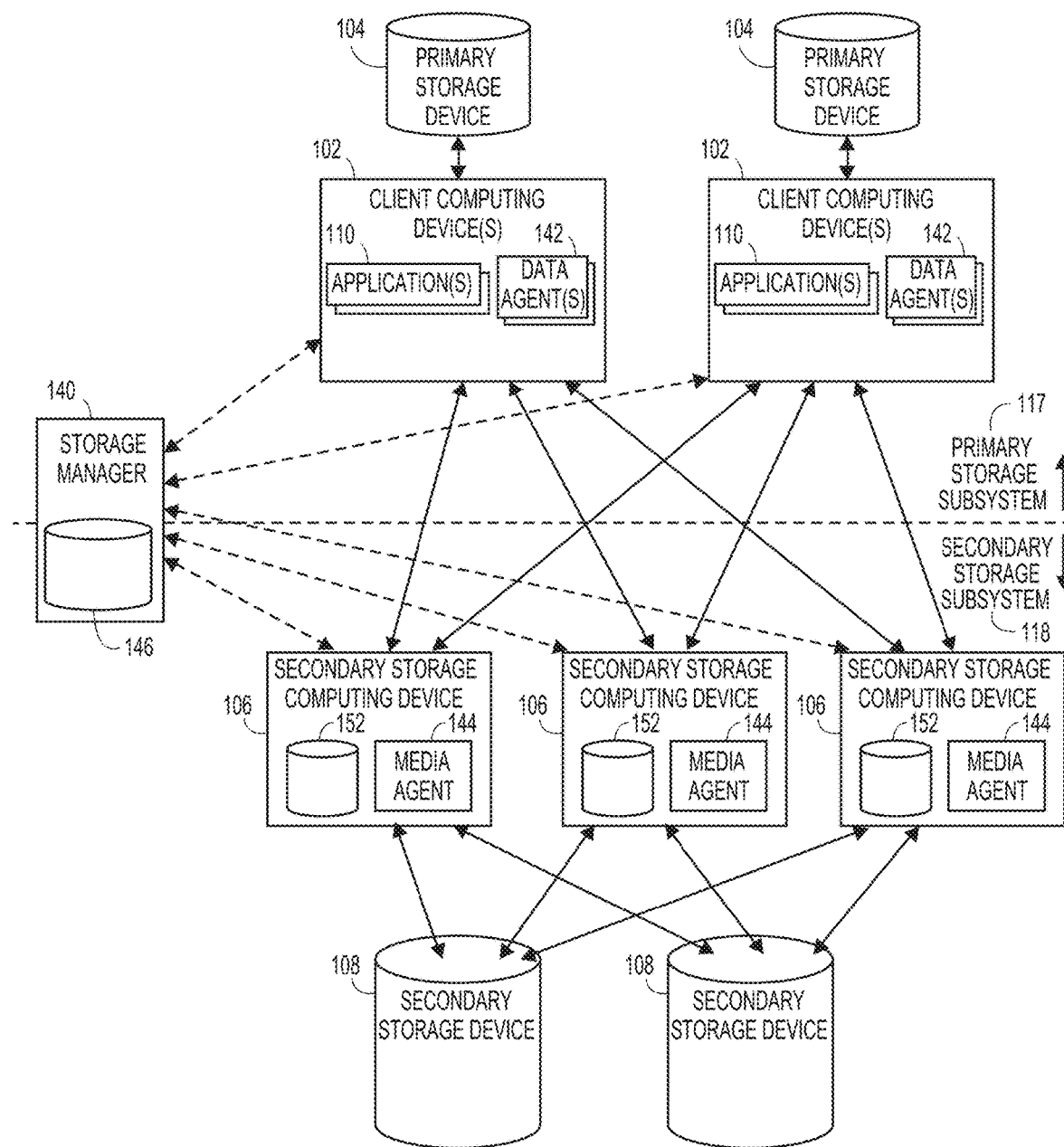
FIG. 1D is a block diagram illustrating a scalable information management system.

The distributed architecture also provides scalability and efficient component utilization. FIG. 1D shows an embodiment of information management system 100 including a plurality of client computing devices 102 and associated data agents 142 as well as a plurality of secondary storage computing devices 106 and associated media agents 144. Additional components can be added or subtracted based on the evolving needs of system 100. For instance, depending on where bottlenecks are identified, administrators can add additional client computing devices 102, secondary storage computing devices 106, and/or secondary storage devices 108. Moreover, where multiple fungible components are available, load balancing can be implemented to dynamically address identified bottlenecks. As an example, storage manager 140 may dynamically select which media agents 144 and/or secondary storage devices 108 to use for storage operations based on a processing load analysis of media agents 144 and/or secondary storage devices 108, respectively.

Where system 100 includes multiple media agents 144 (see, e.g., FIG. 1D), a first media agent 144 may provide failover functionality for a second failed media agent 144. In addition, media agents 144 can be dynamically selected to provide load balancing. Each client computing device 102 can communicate with, among other components, any of the media agents 144, e.g., as directed by storage manager 140. And each media agent 144 may communicate with, among other components, any of secondary storage devices 108, e.g., as directed by storage manager 140. Thus, operations can be routed to secondary storage devices 108 in a dynamic and highly flexible manner, to provide load balancing, failover, etc. Further examples of scalable systems capable of dynamic storage operations, load balancing, and failover are provided in U.S. Pat. No. 7,246,207.

While distributing functionality amongst multiple computing devices can have certain advantages, in other contexts it can be beneficial to consolidate functionality on the same computing device. In alternative configurations, certain components may reside and execute on the same computing device. As such, in other embodiments, one or more of the components shown in FIG. 1C may be implemented on the same computing device. In one configuration, a storage manager 140, one or more data agents 142, and/or one or more media agents 144 are all implemented on the same computing device. In other embodiments, one or more data agents 142 and one or more media agents 144 are implemented on the same computing device, while storage manager 140 is implemented on a separate computing device, etc. without limitation.

Exemplary Types of Information Management Operations

In order to protect and leverage stored data, system 100 can be configured to perform a variety of information management operations, which may also be referred to in some cases as storage management operations or storage operations. These operations can generally include (i) data movement operations, (ii) processing and data manipulation operations, and (iii) analysis, reporting, and management operations.

Data Movement Operations, Including Secondary Copy Operations

Data movement operations are generally operations that involve the copying or migration of data between different locations in system 100. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104, or in some cases within the same primary storage device 104 such as within a storage array.

Data movement operations can include by way of example, backup operations, archive operations, information lifecycle management operations such as hierarchical storage management operations, replication operations (e.g., continuous data replication), snapshot operations, deduplication or single-instancing operations, auxiliary copy operations, disaster-recovery copy operations, and the like. As will be discussed, some of these operations do not necessarily create distinct copies. Nonetheless, some or all of these operations are generally referred to as "secondary copy operations" for simplicity. Data movement also comprises restoring secondary copies.

Backup Operations

A backup operation creates a copy of a version of primary data 112 at a particular point in time (e.g., one or more files or other data units). Each subsequent backup copy 116 (which is a form of secondary copy 116) may be maintained independently of the first. A backup generally involves maintaining a version of the copied primary data 112 as well as backup copies 116. Further, a backup copy in some embodiments is generally stored in a form that is different from the native format, e.g., a backup format. This contrasts to the version in primary data 112 which may instead be stored in a native format of the source application(s) 110. In various cases, backup copies can be stored in a format in which the data is compressed, encrypted, deduplicated, and/or otherwise modified from the original native application format. For example, a backup copy may be stored in a compressed backup format that facilitates efficient long-term storage.

Backup copies 116 can have relatively long retention periods as compared to primary data 112, which is generally highly changeable. Backup copies 116 may be stored on media with slower retrieval times than primary storage device 104. Some backup copies may have shorter retention periods than some other types of secondary copies 116, such as archive copies (described below). Backups may be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy for subsequent backup copies.

A differential backup operation (or cumulative incremental backup operation) tracks and stores changes that occurred since the last full backup. Differential backups can grow quickly in size, but can restore relatively efficiently because a restore can be completed in some cases using only the full backup copy and the latest differential copy.

An incremental backup operation generally tracks and stores changes since the most recent backup copy of any type, which can greatly reduce storage utilization. In some cases, however, restoring can be lengthy compared to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, however, a synthetic full backup does not actually transfer data from primary storage to the backup media, because it operates as a backup consolidator. A synthetic full backup extracts the index data of each participating subclient. Using this index data and the previously backed up user data images, it builds new full backup images (e.g., bitmaps), one for each subclient. The new backup images consolidate the index and user data stored in the related incremental, differential, and previous full backups into a synthetic backup file that fully represents the subclient (e.g., via pointers) but does not comprise all its constituent data.

Any of the above types of backup operations can be at the volume level, file level, or block level. Volume level backup operations generally involve copying of a data volume (e.g., a logical disk or partition) as a whole. In a file-level backup, information management system 100 generally tracks changes to individual files and includes copies of files in the backup copy. For block-level backups, files are broken into constituent blocks, and changes are tracked at the block level. Upon restore, system 100 reassembles the blocks into files in a transparent fashion. Far less data may actually be transferred and copied to secondary storage devices 108 during a file-level copy than a volume-level copy. Likewise, a block-level copy may transfer less data than a file-level copy, resulting in faster execution. However, restoring a relatively higher-granularity copy can result in longer restore times. For instance, when restoring a block-level copy, the process of locating constituent blocks can sometimes take longer than restoring file-level backups.

A reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within system 100.

Archive Operations

Because backup operations generally involve maintaining a version of the copied primary data 112 and also maintaining backup copies in secondary storage device(s) 108, they can consume significant storage capacity. To reduce storage consumption, an archive operation according to certain embodiments creates an archive copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases are never deleted. Archive copies are generally retained for longer periods of time than backup copies. In certain embodiments, archive copies may be made and kept for extended periods in order to meet compliance regulations.

Archiving can also serve the purpose of freeing up space in primary storage device(s) 104 and easing the demand on computational resources on client computing device 102. Similarly, when a secondary copy 116 is archived, the archive copy can therefore serve the purpose of freeing up space in the source secondary storage device(s) 108. Examples of data archiving operations are provided in U.S. Pat. No. 7,107,298.

Snapshot Operations

Snapshot operations can provide a relatively lightweight, efficient mechanism for protecting data. From an end-user viewpoint, a snapshot may be thought of as an "instant" image of primary data 112 at a given point in time, and may include state and/or status information relative to an application 110 that creates/manages primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation can be a snapshot operation where a target storage device (e.g., a primary storage device 104 or a secondary storage device 108) performs the snapshot operation in a self-contained fashion, substantially independently, using hardware, firmware and/or software operating on the storage device itself. For instance, the storage device may perform snapshot operations generally without intervention or oversight from any of the other components of the system 100, e.g., a storage array may generate an "array-created" hardware snapshot and may also manage its storage, integrity, versioning, etc. In this manner, hardware snapshots can off-load other components of system 100 from processing involved in creating and managing snapshots.

A "software snapshot" (or "software-based snapshot") operation, on the other hand, can be a snapshot operation in which one or more other components in information management system 100 (e.g., client computing devices 102, data agents 142, etc.) implement a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product may be Microsoft Volume Snapshot Service (VSS), which is part of the Microsoft Windows operating system.

Some types of snapshots do not actually create another physical copy of all the data as it existed at the particular point in time, but may simply create pointers that are able to map files and directories to specific memory locations (e.g., to specific disk blocks) where the data resides, as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at the particular point in time when the snapshot copy was created.

An initial snapshot may use only a small amount of disk space needed to record a mapping or other data structure representing or otherwise tracking the blocks that correspond to the current state of the file system. Additional disk space is usually required only when files and directories change later on. Furthermore, when files change, typically only the pointers which map to blocks are copied, not the blocks themselves. For example for "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments secondary copy operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data were the "live" primary data 112. This can reduce access time, storage utilization, and impact on source applications 110, among other benefits. Based on known good state information, system 100 can replicate sections of application data that represent a recoverable state rather than rote copying of blocks of data. Examples of replication operations (e.g., continuous data replication) are provided in U.S. Pat. No. 7,617,262.

Deduplication/Single-Instancing Operations

Deduplication or single-instance storage is useful to reduce the amount of non-primary data. For instance, some or all of the above-described secondary copy operations can involve deduplication in some fashion. New data is read, broken down into data portions of a selected granularity (e.g., sub-file level blocks, files, etc.), compared with corresponding portions that are already in secondary storage, and only new portions are stored. Portions that already exist are represented as pointers to the already-stored data. Thus, a deduplicated secondary copy 116 may comprise actual data portions copied from primary data 112 and may further comprise pointers to already-stored data, which is generally more storage-efficient than a full copy.

In order to streamline the comparison process, information management system 100 may calculate and/or store signatures (e.g., hashes or cryptographically unique IDs) corresponding to the individual data portions in the source data and compare the signatures instead of comparing entire data portions. In some cases, only a single instance of each data portion is stored, and deduplication operations may therefore be referred to interchangeably as "single-instancing" operations. Depending on the implementation, however, deduplication operations can store more than one instance of certain data portions, but nonetheless significantly reduce stored-data redundancy. Depending on the embodiment, deduplication portions such as data blocks can be of fixed or variable length. Using variable length blocks can enhance deduplication by responding to changes in the data stream, but can involve complex processing. In some cases, system 100 utilizes a technique for dynamically aligning deduplication blocks based on changing content in the data stream, as described in U.S. Pat. No. 8,364,652.

Information management system 100 can perform deduplication in a variety of manners at a variety of locations. For instance, in some embodiments, system 100 implements "target-side" deduplication by deduplicating data at the media agent 144 after being received from data agent 142. In some such cases, the media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. Pub. No. 2012/0150826. Instead of or in combination with "target-side" deduplication, deduplication can also be performed on the "source-side" (or "client-side"), e.g., to reduce the amount of data to be transmitted by data agent 142 to media agent 144. Storage manager 140 may communicate with other components within system 100 via network protocols and cloud service provider APIs to facilitate cloud-based deduplication/single instancing, as exemplified in U.S. Pat. Pub. No. 2012/0150818. Some other deduplication/single instancing techniques are described in U.S. Pat. Pub. Nos. 2006/0224846 and 2009/0319534.

Information Lifecycle Management and Hierarchical Storage Management

In some embodiments, files and other data over their lifetime move from more expensive quick-access storage to less expensive slower-access storage. Operations associated with moving data through various tiers of storage are sometimes referred to as information lifecycle management (ILM) operations.

One type of ILM operation is a hierarchical storage management (HSM) operation, which generally automatically moves data between classes of storage devices, such as from high-cost to low-cost storage devices. For instance, an HSM operation may involve movement of data from primary storage devices 104 to secondary storage devices 108, or between tiers of secondary storage devices 108. With each tier, the storage devices may be progressively cheaper, have relatively slower access/restore times, etc. For example, movement of data between tiers may occur as data becomes less important over time. In some embodiments, an HSM operation is similar to archiving in that creating an HSM copy may (though not always) involve deleting some of the source data, e.g., according to one or more criteria related to the source data. For example, an HSM copy may include primary data 112 or a secondary copy 116 that is larger than a given size threshold or older than a given age threshold. Often, and unlike some types of archive copies, HSM data that is removed or aged from the source is replaced by a logical reference pointer or stub. The reference pointer or stub can be stored in the primary storage device 104 or other source storage device, such as a secondary storage device 108 to replace the deleted source data and to point to or otherwise indicate the new location in (another) secondary storage device 108.

According to one example, files are generally moved between higher and lower cost storage depending on how often the files are accessed. When a user requests access to HSM data that has been removed or migrated, system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may also include some metadata associated with the corresponding data, so that a file system and/or application can provide some information about the data object and/or a limited-functionality version (e.g., a preview) of the data object.

An HSM copy may be stored in a format other than the native application format (e.g., compressed, encrypted, deduplicated, and/or otherwise modified). In some cases, copies which involve the removal of data from source storage and the maintenance of stub or other logical reference information on source storage may be referred to generally as "online archive copies". On the other hand, copies which involve the removal of data from source storage without the maintenance of stub or other logical reference information on source storage may be referred to as "off-line archive copies". Examples of HSM and ILM techniques are provided in U.S. Pat. No. 7,343,453.

Auxiliary Copy Operations

An auxiliary copy is generally a copy of an existing secondary copy 116. For instance, an initial secondary copy 116 may be derived from primary data 112 or from data residing in secondary storage subsystem 118, whereas an auxiliary copy is generated from the initial secondary copy 116. Auxiliary copies provide additional standby copies of data and may reside on different secondary storage devices 108 than the initial secondary copies 116. Thus, auxiliary copies can be used for recovery purposes if initial secondary copies 116 become unavailable. Exemplary auxiliary copy techniques are described in further detail in U.S. Pat. No. 8,230,195.

Disaster-Recovery Copy Operations

Information management system 100 may also make and retain disaster recovery copies, often as secondary, high-availability disk copies. System 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Manipulation, Including Encryption and Compression

Data manipulation and processing may include encryption and compression as well as integrity marking and checking, formatting for transmission, formatting for storage, etc. Data may be manipulated "client-side" by data agent 142 as well as "target-side" by media agent 144 in the course of creating secondary copy 116.

Encryption Operations

Information management system 100 in some cases is configured to process data (e.g., files or other data objects, primary data 112, secondary copies 116, etc.), according to an appropriate encryption algorithm (e.g., Blowfish, Advanced Encryption Standard (AES), Triple Data Encryption Standard (3-DES), etc.) to limit access and provide data security. System 100 in some cases encrypts the data at the client level, such that client computing devices 102 (e.g., data agents 142) encrypt the data prior to transferring it to other components, e.g., before sending the data to media agents 144 during a secondary copy operation. In such cases, client computing device 102 may maintain or have access to an encryption key or passphrase for decrypting the data upon restore. Encryption can also occur when media agent 144 creates auxiliary copies or archive copies. Encryption may be applied in creating a secondary copy 116 of a previously unencrypted secondary copy 116, without limitation. In further embodiments, secondary storage devices 108 can implement built-in, high performance hardware-based encryption.

Compression Operations

Similar to encryption, system 100 may also or alternatively compress data in the course of generating a secondary copy 116. Compression encodes information such that fewer bits are needed to represent the information as compared to the original representation. Compression techniques are well known in the art. Compression operations may apply one or more data compression algorithms. Compression may be applied in creating a secondary copy 116 of a previously uncompressed secondary copy, e.g., when making archive copies or disaster recovery copies. The use of compression may result in metadata that specifies the nature of the compression, so that data may be uncompressed on restore if appropriate.

Data Analysis, Reporting, and Management Operations

Data analysis, reporting, and management operations can differ from data movement operations in that they do not necessarily involve copying, migration or other transfer of data between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging the data under management to provide enhanced search and other features. Other data analysis operations such as compression and encryption can provide data reduction and security benefits, respectively.

Classification Operations/Content Indexing

In some embodiments, information management system 100 analyzes and indexes characteristics, content, and metadata associated with primary data 112 ("online content indexing") and/or secondary copies 116 ("off-line content indexing"). Content indexing can identify files or other data objects based on content (e.g., user-defined keywords or phrases, other keywords/phrases that are not defined by a user, etc.), and/or metadata (e.g., email metadata such as "to", "from," "cc," "bcc," attachment name, received time, etc.). Content indexes may be searched and search results may be restored.

Information management system 100 generally organizes and catalogues the results into a content index, which may be stored within media agent database 152, for example. The content index can also include the storage locations of or pointer references to indexed data in primary data 112 or secondary copies 116, as appropriate. The results may also be stored elsewhere in system 100 (e.g., in primary storage device 104 or in secondary storage device 108). Such content index data provides storage manager 140 or other components with an efficient mechanism for locating primary data 112 and/or secondary copies 116 of data objects that match particular criteria, thus greatly increasing the search speed capability of system 100. For instance, search criteria can be specified by a user through user interface 158 of storage manager 140. Moreover, when system 100 analyzes data and/or metadata in secondary copies 116 to create an "off-line content index," this operation has no significant impact on the performance of client computing devices 102 and thus does not take a toll on the production environment. Examples of content indexing techniques are provided in U.S. Pat. No. 8,170,995.

One or more components, such as a content index engine, can be configured to scan data and/or associated metadata for classification purposes to populate a database (or other data structure) of information, which can be referred to as a "data classification database" or a "metabase." Depending on the embodiment, the data classification database(s) can be organized in a variety of different ways, including centralization, logical sub-divisions, and/or physical sub-divisions. For instance, one or more data classification databases may be associated with different subsystems or tiers within system 100. As an example, there may be a first metabase associated with primary storage subsystem 117 and a second metabase associated with secondary storage subsystem 118. In other cases, there may be one or more metabases associated with individual components, e.g., client computing devices 102 and/or media agents 144. In some embodiments, a data classification database may reside as one or more data structures within management database 146, or may be otherwise associated with storage manager 140 or may reside as a separate component.

In some cases, metabase(s) may be included in separate database(s) and/or on separate storage device(s) from primary data 112 and/or secondary copies 116, such that operations related to the metabase(s) do not significantly impact performance on other components of information management system 100. In other cases, metabase(s) may be stored along with primary data 112 and/or secondary copies 116. Files or other data objects can be associated with identifiers (e.g., tag entries, etc.) to facilitate searches of stored data objects. Among a number of other benefits, the metabase can also allow efficient, automatic identification of files or other data objects to associate with secondary copy or other information management operations. For instance, a metabase can dramatically improve the speed with which the information management system can search through and identify data as compared to other approaches which can involve scanning an entire file system. Examples of metabases and data classification operations are provided in U.S. Pat. Nos. 7,734,669 and 7,747,579.

Management and Reporting Operations

Certain embodiments leverage the integrated ubiquitous nature of information management system 100 to provide useful system-wide management and reporting functions. Operations management can generally include monitoring and managing the health and performance of system 100 by, without limitation, performing error tracking, generating granular storage/performance metrics (e.g., job success/failure information, deduplication efficiency, etc.), generating storage modeling and costing information, and the like. As an example, storage manager 140 or other component in system 100 may analyze traffic patterns and suggest and/or automatically route data to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453.

In some configurations having a hierarchy of storage operation cells, a master storage manager 140 may track the status of subordinate cells, such as the status of jobs, system components, system resources, and other items, by communicating with storage managers 140 (or other components) in the respective storage operation cells. Moreover, the master storage manager 140 may also track status by receiving periodic status updates from the storage managers 140 (or other components) in the respective cells regarding jobs, system components, system resources, and other items. In some embodiments, a master storage manager 140 may store status information and other information regarding its associated storage operation cells and other system information in its management database 146 and/or index 150 (or in another location). The master storage manager 140 or other component may also determine whether certain storage-related or other criteria are satisfied, and may perform an action or trigger event (e.g., data migration) in response to the criteria being satisfied, such as where a storage threshold is met for a particular volume, or where inadequate protection exists for certain data. For instance, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) a mitigation action to address the risk. For example, the system may indicate that data from a primary copy 112 should be migrated to a secondary storage device 108 to free space on primary storage device 104. Examples of the use of risk factors and other triggering criteria are described in U.S. Pat. No. 7,343,453.

In some embodiments, system 100 may also determine whether a metric or other indication satisfies particular storage criteria sufficient to perform an action. For example, a storage policy or other definition might indicate that a storage manager 140 should initiate a particular action if a storage metric or other indication drops below or otherwise fails to satisfy specified criteria such as a threshold of data protection. In some embodiments, risk factors may be quantified into certain measurable service or risk levels. For example, certain applications and associated data may be considered to be more important relative to other data and services. Financial compliance data, for example, may be of greater importance than marketing materials, etc. Network administrators may assign priority values or "weights" to certain data and/or applications corresponding to the relative importance. The level of compliance of secondary copy operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453, which is incorporated by reference herein.

System 100 may additionally calculate data costing and data availability associated with information management operation cells. For instance, data received from a cell may be used in conjunction with hardware-related information and other information about system elements to determine the cost of storage and/or the availability of particular data. Exemplary information generated could include how fast a particular department is using up available storage space, how long data would take to recover over a particular pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453.

Any of the above types of information (e.g., information related to trending, predictions, job, cell or component status, risk, service level, costing, etc.) can generally be provided to users via user interface 158 in a single integrated view or console (not shown). Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs. User interface 158 can include an option to show a "virtual view" of the system that graphically depicts the various components in the system using appropriate icons. As one example, user interface 158 may provide a graphical depiction of primary storage devices 104, secondary storage devices 108, data agents 142 and/or media agents 144, and their relationship to one another in system 100.

In general, the operations management functionality of system 100 can facilitate planning and decision-making. For example, in some embodiments, a user may view the status of some or all jobs as well as the status of each component of information management system 100. Users may then plan and make decisions based on this data. For instance, a user may view high-level information regarding secondary copy operations for system 100, such as job status, component status, resource status (e.g., communication pathways, etc.), and other information. The user may also drill down or use other means to obtain more detailed information regarding a particular component, job, or the like. Further examples are provided in U.S. Pat. No. 7,343,453.

Information management system 100 can also be configured to perform system-wide e-discovery operations in some embodiments. In general, e-discovery operations provide a unified collection and search capability for data in the system, such as data stored in secondary storage devices 108 (e.g., backups, archives, or other secondary copies 116). For example, system 100 may construct and maintain a virtual repository for data stored in system 100 that is integrated across source applications 110, different storage device types, etc. According to some embodiments, e-discovery utilizes other techniques described herein, such as data classification and/or content indexing.

Information Management Policies

An information management policy 148 can include a data structure or other information source that specifies a set of parameters (e.g., criteria and rules) associated with secondary copy and/or other information management operations. In some embodiments, an information management policy may be alternatively or interchangeably referred to as a "storage management policy" or a "data storage management policy." Likewise, in some embodiments, an information management operation may be alternatively or interchangeably referred to as a "storage management operation" or a "data storage management operation."

One type of information management policy 148 is a "storage policy." According to certain embodiments, a storage policy generally comprises a data structure or other information source that defines (or includes information sufficient to determine) a set of preferences or other criteria for performing information management operations. Storage policies can include one or more of the following: (1) what data will be associated with the storage policy, e.g., subclient; (2) a destination to which the data will be stored; (3) datapath information specifying how the data will be communicated to the destination; (4) the type of secondary copy operation to be performed; and (5) retention information specifying how long the data will be retained at the destination (see, e.g., FIG. 1E). Data associated with a storage policy can be logically organized into subclients, which may represent primary data 112 and/or secondary copies 116. A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one exemplary scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining a group of tape drives and a group of tapes, respectively, for use in storing the subclient data.

While information in the storage policy can be statically assigned in some cases, some or all of the information in the storage policy can also be dynamically determined based on criteria, which can be set forth in the storage policy. For instance, based on such criteria, a particular destination storage device(s) or other parameter of the storage policy may be determined based on characteristics associated with the data involved in a particular secondary copy operation, device availability (e.g., availability of a secondary storage device 108 or a media agent 144), network status and conditions (e.g., identified bottlenecks), user credentials, and the like.

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source and destination. A storage policy can also specify the type(s) of operations associated with the storage policy, such as a backup, archive, snapshot, auxiliary copy, or the like. Furthermore, retention parameters can specify how long the resulting secondary copies 116 will be kept (e.g., a number of days, months, years, etc.), perhaps depending on organizational needs and/or compliance criteria.

Another type of information management policy 148 is a "scheduling policy," which specifies when and how often to perform operations. Scheduling parameters may specify with what frequency (e.g., hourly, weekly, daily, event-based, etc.) or under what triggering conditions secondary copy or other information management operations are to take place. Scheduling policies in some cases are associated with particular components, such as a subclient, client computing device 102, and the like.

When adding a new client computing device 102, administrators can manually configure information management policies 148 and/or other settings, e.g., via user interface 158. However, this can be an involved process resulting in delays, and it may be desirable to begin data protection operations quickly, without awaiting human intervention. Thus, in some embodiments, system 100 automatically applies a default configuration to client computing device 102. As one example, when one or more data agent(s) 142 are installed on a client computing device 102, the installation script may register the client computing device 102 with storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Another type of information management policy 148 is an "audit policy" (or security policy), which comprises preferences, rules and/or criteria that protect sensitive data in information management system 100. For example, an audit policy may define "sensitive objects" which are files or data objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a "provisioning policy," which can include preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). Storage manager 140 or other components may enforce the provisioning policy. For instance, media agents 144 may enforce the policy when transferring data to secondary storage devices 108. If a client computing device 102 exceeds a quota, a budget for the client computing device 102 (or associated department) may be adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items that information management policies 148 may specify:

schedules or other timing information, e.g., specifying when and/or how often to perform information management operations;

the type of secondary copy 116 and/or copy format (e.g., snapshot, backup, archive, HSM, etc.);

a location or a class or quality of storage for storing secondary copies 116 (e.g., one or more particular secondary storage devices 108);

preferences regarding whether and how to encrypt, compress, deduplicate, or otherwise modify or transform secondary copies 116;

which system components and/or network pathways (e.g., preferred media agents 144) should be used to perform secondary storage operations;

resource allocation among different computing devices or other system components used in performing information management operations (e.g., bandwidth allocation, available storage capacity, etc.);

whether and how to synchronize or otherwise distribute files or other data objects across multiple computing devices or hosted services; and retention information specifying the length of time primary data 112 and/or secondary copies 116 should be retained, e.g., in a particular class or tier of storage devices, or within the system 100.

Information management policies 148 can additionally specify or depend on historical or current criteria that may be used to determine which rules to apply to a particular data object, system component, or information management operation, such as:

frequency with which primary data 112 or a secondary copy 116 of a data object or metadata has been or is predicted to be used, accessed, or modified;

time-related factors (e.g., aging information such as time since the creation or modification of a data object);

deduplication information (e.g., hashes, data blocks, deduplication block size, deduplication efficiency or other metrics);

an estimated or historic usage or cost associated with different components (e.g., with secondary storage devices 108);

the identity of users, applications 110, client computing devices 102 and/or other computing devices that created, accessed, modified, or otherwise utilized primary data 112 or secondary copies 116;

a relative sensitivity (e.g., confidentiality, importance) of a data object, e.g., as determined by its content and/or metadata;

the current or historical storage capacity of various storage devices;

the current or historical network capacity of network pathways connecting various components within the storage operation cell;

access control lists or other security information; and the content of a particular data object (e.g., its textual content) or of metadata associated with the data object.

Exemplary Storage Policy and Secondary Copy Operations

Figure 1E:
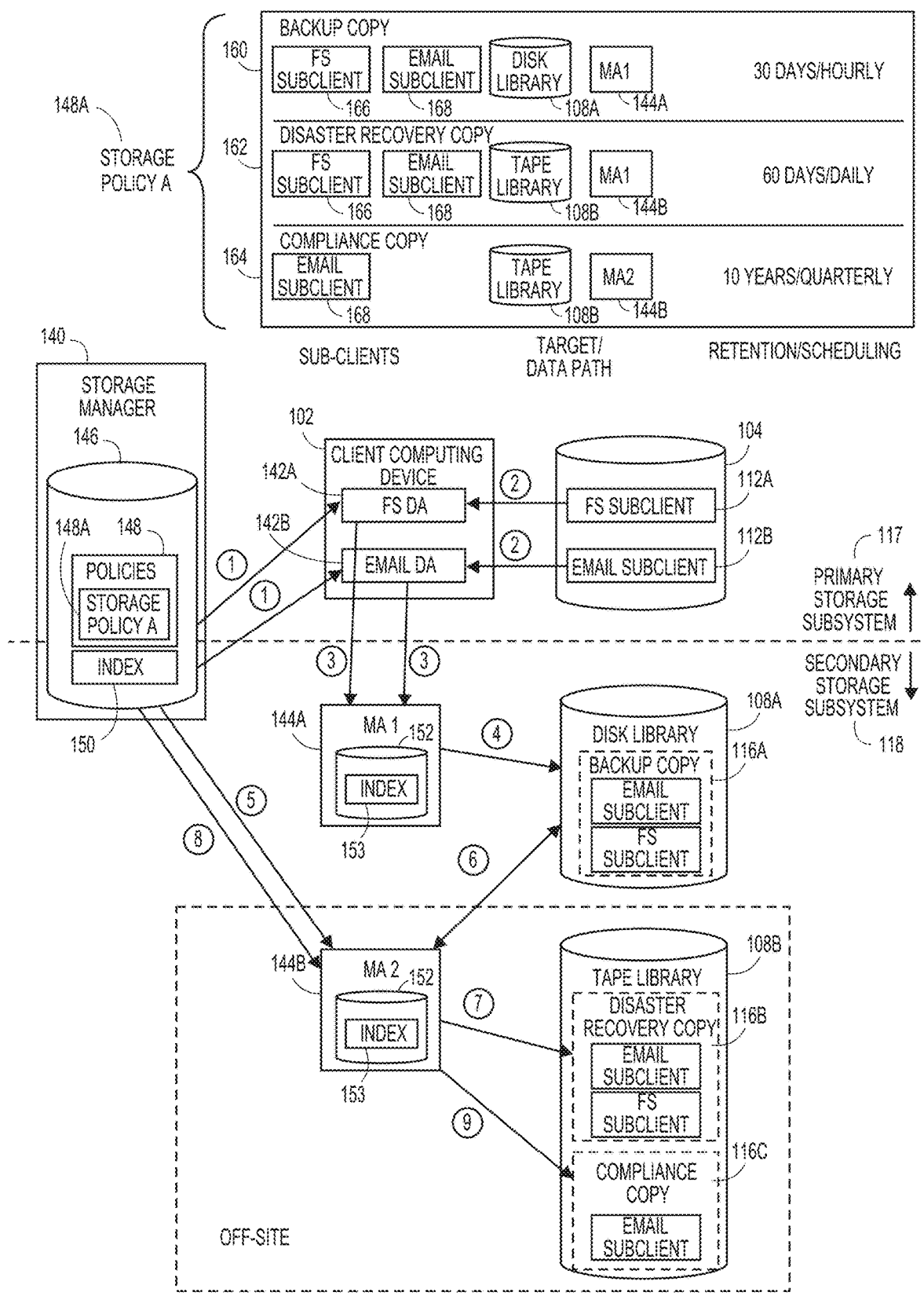
FIG. 1E illustrates certain secondary copy operations according to an exemplary storage policy.

FIG. 1E includes a data flow diagram depicting performance of secondary copy operations by an embodiment of information management system 100, according to an exemplary storage policy 148A. System 100 includes a storage manager 140, a client computing device 102 having a file system data agent 142A and an email data agent 142B operating thereon, a primary storage device 104, two media agents 144A, 144B, and two secondary storage devices 108: a disk library 108A and a tape library 108B. As shown, primary storage device 104 includes primary data 112A, which is associated with a logical grouping of data associated with a file system ("file system subclient"), and primary data 112B, which is a logical grouping of data associated with email ("email subclient"). The techniques described with respect to FIG. 1E can be utilized in conjunction with data that is otherwise organized as well.

As indicated by the dashed box, the second media agent 144B and tape library 108B are "off-site," and may be remotely located from the other components in system 100 (e.g., in a different city, office building, etc.). Indeed, "off-site" may refer to a magnetic tape located in remote storage, which must be manually retrieved and loaded into a tape drive to be read. In this manner, information stored on the tape library 108B may provide protection in the event of a disaster or other failure at the main site(s) where data is stored.

The file system subclient 112A in certain embodiments generally comprises information generated by the file system and/or operating system of client computing device 102, and can include, for example, file system data (e.g., regular files, file tables, mount points, etc.), operating system data (e.g., registries, event logs, etc.), and the like. The e-mail subclient 112B can include data generated by an e-mail application operating on client computing device 102, e.g., mailbox information, folder information, emails, attachments, associated database information, and the like. As described above, the subclients can be logical containers, and the data included in the corresponding primary data 112A and 1126 may or may not be stored contiguously.

The exemplary storage policy 148A includes backup copy preferences (or rule set) 160, disaster recovery copy preferences or rule set 162, and compliance copy preferences or rule set 164. Backup copy rule set 160 specifies that it is associated with file system subclient 166 and email subclient 168. Each of subclients 166 and 168 are associated with the particular client computing device 102. Backup copy rule set 160 further specifies that the backup operation will be written to disk library 108A and designates a particular media agent 144A to convey the data to disk library 108A. Finally, backup copy rule set 160 specifies that backup copies created according to rule set 160 are scheduled to be generated hourly and are to be retained for 30 days. In some other embodiments, scheduling information is not included in storage policy 148A and is instead specified by a separate scheduling policy.

Disaster recovery copy rule set 162 is associated with the same two subclients 166 and 168. However, disaster recovery copy rule set 162 is associated with tape library 108B, unlike backup copy rule set 160. Moreover, disaster recovery copy rule set 162 specifies that a different media agent, namely 144B, will convey data to tape library 108B. Disaster recovery copies created according to rule set 162 will be retained for 60 days and will be generated daily. Disaster recovery copies generated according to disaster recovery copy rule set 162 can provide protection in the event of a disaster or other catastrophic data loss that would affect the backup copy 116A maintained on disk library 108A.

Compliance copy rule set 164 is only associated with the email subclient 168, and not the file system subclient 166. Compliance copies generated according to compliance copy rule set 164 will therefore not include primary data 112A from the file system subclient 166. For instance, the organization may be under an obligation to store and maintain copies of email data for a particular period of time (e.g., 10 years) to comply with state or federal regulations, while similar regulations do not apply to file system data. Compliance copy rule set 164 is associated with the same tape library 108B and media agent 144B as disaster recovery copy rule set 162, although a different storage device or media agent could be used in other embodiments. Finally, compliance copy rule set 164 specifies that copies generated under compliance copy rule set 164 will be retained for 10 years and will be generated quarterly.

Secondary Copy Jobs

A logical grouping of secondary copy operations governed by a rule set and being initiated at a point in time may be referred to as a "secondary copy job" and sometimes may be called a "backup job," even though it is not necessarily limited to creating backup copies. Secondary copy jobs may be initiated on demand as well. Steps 1-9 below illustrate three secondary copy jobs based on storage policy 148A.

At step 1, storage manager 140 initiates a backup job according to the backup copy rule set 160, which logically comprises all the secondary copy operations necessary to effectuate rules 160 in storage policy 148A every hour, including steps 1-4 occurring hourly. For instance, a scheduling service running on storage manager 140 accesses backup copy rule set 160 or a separate scheduling policy associated with client computing device 102 and initiates a backup job on an hourly basis. Thus, at the scheduled time, storage manager 140 sends instructions to client computing device 102 (i.e., to both data agent 142A and data agent 142B) to begin the backup job.

At step 2, file system data agent 142A and email data agent 142B operating on client computing device 102 respond to the instructions received from storage manager

140 by accessing and processing the respective subclient primary data 112A and 112B involved in the backup copy operation, which can be found in primary storage device 104. Because the secondary copy operation is a backup copy operation, the data agent(s) 142A, 142B may format the data into a backup format or otherwise process the data suitable for a backup copy.

At step 3, client computing device 102 (e.g., using file system data agent 142A) communicates the processed data to the first media agent 144A according to backup copy rule set 160, as directed by storage manager 140. Storage manager 140 may further keep a record in management database 146 of the association between media agent 144A and one or more of: client computing device 102, file system data agent 142A, and/or backup copy 116A.

The target media agent 144A receives the data-agent-processed data from client computing device 102, and at step 4 generates and conveys backup copy 116A to disk library 108A to be stored as backup copy 116A, again at the direction of storage manager 140 and according to backup copy rule set 160. Media agent 144A can also update its index 153 to include data and/or metadata related to backup copy 116A, such as information indicating where the backup copy 116A resides on disk library 108A, data and metadata for cache retrieval, etc. Storage manager 140 may similarly update its index 150 to include information relating to the secondary copy operation, such as information relating to the type of operation, a physical location associated with one or more copies created by the operation, the time the operation was performed, status information relating to the operation, the components involved in the operation, and the like. In some cases, storage manager 140 may update its index 150 to include some or all of the information stored in index 153 of media agent 144A. At this point, the backup job may be considered complete. After the 30-day retention period expires, storage manager 140 instructs media agent 144A to delete backup copy 116A from disk library 108A and indexes 150 and/or 153 are updated accordingly.

At step 5, storage manager 140 initiates another backup job according to the disaster recovery rule set 162. Illustratively this includes steps 5-7 occurring daily for creating disaster recovery copy 116B. Disaster recovery copy 116B will be based on backup copy 116A and not on primary data 112A and 112B.

At step 6, illustratively based on instructions received from storage manager 140 at step 5, the specified media agent 1446 retrieves the most recent backup copy 116A from disk library 108A.

At step 7, again at the direction of storage manager 140 and as specified in disaster recovery copy rule set 162, media agent 144B uses the retrieved data to create a disaster recovery copy 1166 and store it to tape library 1086. In some cases, disaster recovery copy 116B is a direct, mirror copy of backup copy 116A, and remains in the backup format. In other embodiments, disaster recovery copy 116B may be generated in some other manner, such as by using primary data 112A, 112B from primary storage device 104 as source data. The disaster recovery copy operation is initiated once a day and disaster recovery copies 1166 are deleted after 60 days; indexes 153 and/or 150 are updated accordingly when/after each information management operation is executed and/or completed. The present backup job may be considered to be complete.

At step 8, storage manager 140 initiates another backup job according to compliance rule set 164, which includes steps 8-9 occurring quarterly for creating compliance copy 116C. For instance, storage manager 140 instructs media agent 144B to create compliance copy 116C on tape library 108B, as specified in the compliance copy rule set 164.

At step 9 in the example, compliance copy 116C is generated using disaster recovery copy 116B as the source. In other embodiments, compliance copy 116C is instead generated using primary data 112B corresponding to the email subclient or using backup copy 116A from disk library 108A as source data. As specified in the illustrated example, compliance copies 116C are created quarterly, and are deleted after ten years, and indexes 153 and/or 150 are kept up-to-date accordingly.

Exemplary Applications of Storage Policies—Information Governance Policies and Classification Storage manager 140 may permit a user to specify aspects of storage policy 148A. For example, the storage policy can be modified to include information governance policies to define how data should be managed in order to comply with a certain regulation or business objective. The various policies may be stored, for example, in management database 146. An information governance policy may align with one or more compliance tasks that are imposed by regulations or business requirements. Examples of information governance policies might include a Sarbanes-Oxley policy, a HIPAA policy, an electronic discovery (e-discovery) policy, and so on.

Information governance policies allow administrators to obtain different perspectives on an organization's online and offline data, without the need for a dedicated data silo created solely for each different viewpoint. As described previously, the data storage systems herein build an index that reflects the contents of a distributed data set that spans numerous clients and storage devices, including both primary data and secondary copies, and online and offline copies. An organization may apply multiple information governance policies in a top-down manner over that unified data set and indexing schema in order to view and manipulate the data set through different lenses, each of which is adapted to a particular compliance or business goal. Thus, for example, by applying an e-discovery policy and a Sarbanes-Oxley policy, two different groups of users in an organization can conduct two very different analyses of the same underlying physical set of data/copies, which may be distributed throughout the information management system.

An information governance policy may comprise a classification policy, which defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an e-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel", or other like terms. Accordingly, all these documents or data objects will be classified as "privileged."

One specific type of classification tag, which may be added to an index at the time of indexing, is an "entity tag." An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc. A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID code that is relevant in the organization. In some implementations, the classification policy can be implemented using cloud-based techniques. For example, the storage devices may be cloud storage devices, and the storage manager 140 may execute cloud service provider API over a network to classify data stored on cloud storage devices.

Restore Operations from Secondary Copies

While not shown in FIG. 1E, at some later point in time, a restore operation can be initiated involving one or more of secondary copies 116A, 116B, 116C. A restore operation logically takes a selected secondary copy 116, reverses the effects of the secondary copy operation that created it, and stores the restored data to primary storage where a client computing device 102 may properly access it as primary data. A media agent 144 and an appropriate data agent 142 (e.g., executing on the client computing device 102) perform the tasks needed to complete a restore operation. For example, data that was encrypted, compressed, and/or deduplicated in the creation of secondary copy 116 will be correspondingly rehydrated (reversing deduplication), uncompressed, and unencrypted into a format appropriate to primary data. In general, restored data should be indistinguishable from other primary data 112. Preferably, the restored data has fully regained the native format that may make it immediately usable by application 110.

As one example, a user may manually initiate a restore of backup copy 116A, e.g., by interacting with user interface 158 of storage manager 140 or with a web-based console with access to system 100. Storage manager 140 may accesses data in its index 150 and/or management database 146 (and/or the respective storage policy 148A) associated with the selected backup copy 116A to identify the appropriate media agent 144A and/or secondary storage device 108A where the secondary copy resides. The user may be presented with a representation (e.g., stub, thumbnail, listing, etc.) and metadata about the selected secondary copy, in order to determine whether this is the appropriate copy to be restored, e.g., date that the original primary data was created. Storage manager 140 will then instruct media agent 144A and an appropriate data agent 142 to restore secondary copy 116A to primary storage device 104. A media agent may be selected for use in the restore operation based on a load balancing algorithm, an availability based algorithm, or other criteria. The selected media agent, e.g., 144A, retrieves secondary copy 116A from disk library 108A. For instance, media agent 144A may access its index 153 to identify a location of backup copy 116A on disk library 108A, or may access location information residing on disk library 108A itself.

In some cases when backup copy 116A was recently created or accessed, caching may speed up the restore operation. In such a case, media agent 144A accesses a cached version of backup copy 116A residing in index 153, without having to access disk library 108A for some or all of the data. Once it has retrieved backup copy 116A, the media agent 144A communicates the data to the requesting client computing device 102. Upon receipt, file system data agent 142A and email data agent 142B may unpackage (e.g., restore from a backup format to the native application format) the data in backup copy 116A and restore the unpackaged data to primary storage device 104. In general, secondary copies 116 may be restored to the same volume or folder in primary storage device 104 from which the secondary copy was derived; to another storage location or client computing device 102; to shared storage. In some cases the data may be restored so that it may be used by an application 110 of a different version/vintage from the application that created the original primary data 112.

Exemplary Secondary Copy Formatting

The formatting and structure of secondary copies 116 can vary depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to one or more secondary storage devices 108. In some cases, users can select different chunk sizes, e.g., to improve throughput to tape storage devices. Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, media agent 144, storage manager 140, or other component may divide files into chunks and generate headers for each chunk by processing the files. The headers can include a variety of information such as file identifier(s), volume(s), offset(s), or other information associated with the payload data items, a chunk sequence number, etc. Importantly, in addition to being stored with secondary copy 116 on secondary storage device 108, the chunk headers can also be stored to index 153 of the associated media agent(s) 144 and/or to index 150 associated with storage manager 140. This can be useful in some cases for providing faster processing of secondary copies 116 during browsing, restores, or other operations. In some cases, once a chunk is successfully transferred to a secondary storage device 108, the secondary storage device 108 returns an indication of receipt, e.g., to media agent 144 and/or storage manager 140, which may update their respective indexes 153, 150 accordingly. During restore, chunks may be processed (e.g., by media agent 144) according to the information in the chunk header to reassemble the files.

Data can also be communicated within system 100 in data channels that connect client computing devices 102 to secondary storage devices 108. These data channels can be referred to as "data streams", and multiple data streams can be employed to parallelize an information management operation, improving data transfer rate, among other advantages. Example data formatting techniques including techniques involving data streaming, chunking, and the use of other data structures in creating secondary copies are described in U.S. Pat. Nos. 7,315,923, 8,156,086, and 8,578, 120.

FIGS. 1F and 1G are diagrams of example data streams 170 and 171, respectively, which may be employed for performing information management operations. Referring to FIG. 1F, data agent 142 forms data stream 170 from source data associated with a client computing device 102 (e.g., primary data 112). Data stream 170 is composed of multiple pairs of stream header 172 and stream data (or stream payload) 174. Data streams 170 and 171 shown in the illustrated example are for a single-instanced storage operation, and a stream payload 174 therefore may include both single-instance (SI) data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or non-SI data.

Figure 1H:
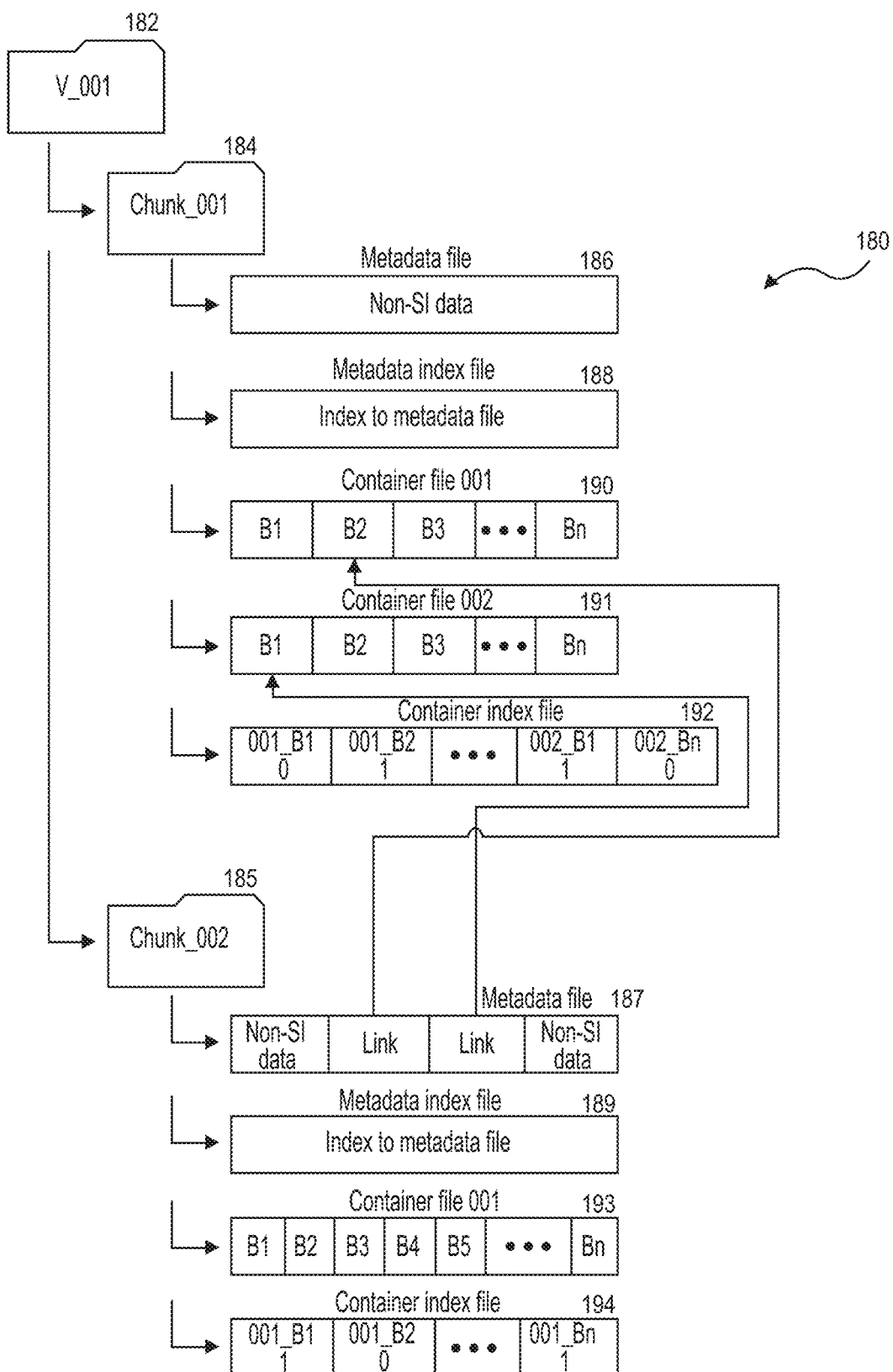

FIG. 1H is a diagram illustrating data structures 180 that may be used to store blocks of SI data and non-SI data on a storage device (e.g., secondary storage device 108). According to certain embodiments, data structures 180 do not form part of a native file system of the storage device. Data structures 180 include one or more volume folders 182, one or more chunk folders 184/185 within the volume folder 182, and multiple files within chunk folder 184. Each chunk folder 184/185 includes a metadata file 186/187, a metadata index file 188/189, one or more container files 190/191/193, and a container index file 192/194. Metadata file 186/187 stores non-SI data blocks as well as links to SI data blocks stored in container files. Metadata index file 188/189 stores an index to the data in the metadata file 186/187. Container files 190/191/193 store SI data blocks. Container index file 192/194 stores an index to container files 190/191/193. Among other things, container index file 192/194 stores an indication of whether a corresponding block in a container file 190/191/193 is referred to by a link in a metadata file 186/187. For example, data block B2 in the container file 190 is referred to by a link in metadata file 187 in chunk folder 185. Accordingly, the corresponding index entry in container index file 192 indicates that data block B2 in container file 190 is referred to. As another example, data block B1 in container file 191 is referred to by a link in metadata file 187, and so the corresponding index entry in container index file 192 indicates that this data block is referred to.

As an example, data structures 180 illustrated in FIG. 1H may have been created as a result of separate secondary copy operations involving two client computing devices 102. For example, a first secondary copy operation on a first client computing device 102 could result in the creation of the first chunk folder 184, and a second secondary copy operation on a second client computing device 102 could result in the creation of the second chunk folder 185. Container files 190/191 in the first chunk folder 184 would contain the blocks of SI data of the first client computing device 102. If the two client computing devices 102 have substantially similar data, the second secondary copy operation on the data of the second client computing device 102 would result in media agent 144 storing primarily links to the data blocks of the first client computing device 102 that are already stored in the container files 190/191. Accordingly, while a first secondary copy operation may result in storing nearly all of the data subject to the operation, subsequent secondary storage operations involving similar data may result in substantial data storage space savings, because links to already stored data blocks can be stored instead of additional instances of data blocks.

If the operating system of the secondary storage computing device 106 on which media agent 144 operates supports sparse files, then when media agent 144 creates container files 190/191/193, it can create them as sparse files. A sparse file is a type of file that may include empty space (e.g., a sparse file may have real data within it, such as at the beginning of the file and/or at the end of the file, but may also have empty space in it that is not storing actual data, such as a contiguous range of bytes all having a value of zero). Having container files 190/191/193 be sparse files allows media agent 144 to free up space in container files 190/191/193 when blocks of data in container files 190/191/193 no longer need to be stored on the storage devices. In some examples, media agent 144 creates a new container file 190/191/193 when a container file 190/191/193 either includes 100 blocks of data or when the size of the container file 190 exceeds 50 MB. In other examples, media agent 144 creates a new container file 190/191/193 when a container file 190/191/193 satisfies other criteria (e.g., it contains from approximately 100 to approximately 1000 blocks or when its size exceeds approximately 50 MB to 1 GB). In some cases, a file on which a secondary copy operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Data Storage Management Operations in a Secondary Storage Subsystem Using Image Recognition and Image-Based Criteria Data storage management operations in a secondary storage subsystem using image recognition and image-based criteria are described in detail below. Although the thumbnail generating and indexing operations described herein generally occur offline after the secondary copies from which the thumbnails are derived have been created, there may be circumstances when some image processing will be triggered in the course of active operations such as browse, restore, or search, and even in the course of performing other storage management operations. Likewise, in some embodiments, rather than using thumbnails as described herein, copies of the source secondary copies will be used instead. More details are provided below.

FIG. 2A is a block diagram illustrating some salient portions of a data storage management system 200 for performing data storage management operations in a secondary storage subsystem using image recognition and image-based criteria, according to an illustrative embodiment of the present invention. Data storage management system 200 may be an embodiment of an enhanced information management system that comprises: one or more client computing devices 102; primary storage subsystem 118 (not shown here); secondary storage subsystem 218, comprising secondary copies 216 stored on secondary storage devices 108; storage manager 240 comprising user interface 231, content-based management logic 241, and management database 246; and content index server 250 comprising content index 251, thumbnail database 252, and recognition analyzer 260, which may include any number of special-purpose image recognition plug-ins 261. The components may be logically interconnected as shown by the arrows. The physical communications infrastructure required for these and other interconnections is well known in the art and may be any suitable electronic communications infrastructure, such as that described in regard to communication pathways 114 above.

Client computing devices 102 are described in further detail elsewhere herein. As depicted here, client computing device 102 may be used by a user, who may be a system administrator having administrative privileges and/or an end-user who lacks administrative privileges. Client computing device 102 may present the user with user interface 231 for interacting with system 200.

Secondary storage devices 108 are described in further detail elsewhere herein. As depicted here, secondary storage devices 108 provide a storage platform for any number of secondary copies 216. Secondary storage devices 108 may be geographically dispersed from each other and/or from primary storage devices 104 and may occupy any number of different geographic locations. Secondary storage devices 108 may be of the same and/or mutually different make, model, and/or storage technology. Secondary storage devices 108 may be of the same and/or different make, model, and/or storage technology as primary storage devices 104.

Primary storage subsystem 118 (not shown here) is described in further detail elsewhere herein and comprises primary data 112, including primary data object such as files, folders, databases, etc., which are part of a "live" production environment and which are stored in primary data storage devices 104. According to the illustrative embodiment, the image recognition and image-based operations described herein generally do not operate on and therefore do not affect primary data 112; rather, they operate on "off-line" copies of the primary data objects, i.e., secondary copies 216, which are managed apart from the primary data and are stored and maintained in secondary storage subsystem 218 shown in the present figure.

Secondary copies 216 are analogous to secondary copies 116 described in more detail elsewhere herein. Each secondary copy 216 represents a copy of one or more other data objects, such as primary data objects 112 or other secondary copies 116/216. Examples of secondary copies 216 may include backup copies 216A, auxiliary copies 216B, disaster recovery copies 216C, archive copies, reference copies, snapshots, etc., without limitation.

Secondary storage subsystem 218 is analogous to secondary storage subsystem 118 described in more detail above. In addition to the depicted secondary storage devices 108 and secondary copies 216, secondary storage subsystem 218 also comprises media agents 144.

User interface for image-based storage management 231 (or "user interface 231") generally presents a user with access to system 200; in particular reference to the illustrative embodiment, user interface 231 enables a user to administer content policies 348; perform image-based searches in system 200; launch storage management operations on demand based on image criteria; and/or any combination thereof. User interface 231 is served by storage manager 240, but in some alternative embodiments it may be served by an associated web console server distinct from storage manager 240. Any number of users may be served concurrently with a respective user interface 231.

Storage manager 240 is analogous to storage manager 140 and further comprises additional functionality for operating in system 200, e.g., image-based storage management logic 241, action plug-ins 341, etc. Storage manager 240 is responsible for managing system 200, including initiating and managing data storage management operations according to image-based criteria.

Content-based management logic 241 (or "logic 241") is a functional component of storage manager 240, and may be implemented as executable software and/or firmware, which executes on the underlying computing device that hosts storage manager 240. When it executes according to the illustrative embodiment, logic 241 is largely responsible for initiating and managing storage management operations in secondary storage subsystem 218 using image recognition and classification and image-based criteria, as described in further detail herein. For example, logic 241 may perform one or more of the following functions, in any combination and without limitation:

- receive and process input from user interface 231 to generate new or changed content policies 348 that govern storage management operations based on recognized and classified images;
- cause content index server 250 to generate and index thumbnails from secondary copies 216 in the course of: system 200 performing a content indexing job and/or secondary copy job and/or a user invoking a restore and/or a browse operation;
- cause content index server 250 to perform ongoing recognition and classification of images detected in secondary copies 216;
- search secondary storage subsystem 218 based on image criteria and locate secondary copies 216 that satisfy the search criteria;
- cause content index server 250 to collect user-supplied recognition feedback for certain images, as needed;
- initiate operations on secondary copies 216 based on image criteria, e.g., from content policies 348 and/or on demand;
- interoperate with component(s) of secondary storage subsystem 218, such as media agents 144, etc.;
- initiate and/or manage importing of pre-identified and pre-tagged thumbnails and/or images and merging thereof into content index 251 and thumbnail database 252; and
- access management database 246.

Management database 246 is analogous to management database 146 and further comprises additional information for operating in system 200, e.g., content policies 348. Management database 246 is shown here as a logical component of storage manager 240. In some alternative embodiments, management database 246 is associated with and accessible by storage manager 240, but is not part of storage manager 240.

Content index server 250 is a computing device component of system 200 and hosts recognition analyzer 260, content index 251, and thumbnail database 252. In some alternative embodiments, content index server 250 may operate outside system 200 but may still host functional components of system 200, such as recognition analyzer 260, content index 251, and/or thumbnail database 252. As depicted here, content index 251 and thumbnail database 252 are stored locally in content index server 250 (e.g., in a local cache or other data storage device for mass storage of data, which may be part of server 250 or associated with it), so that the information therein may be rapidly accessed with minimal performance delay. In some alternative embodiments, content index server 250 may be associated with but not host content index 251 and/or thumbnail database 252. Local storage according to the illustrative embodiment is to be distinguished from secondary storage devices 108 and the secondary storage subsystem 218.

Content index 251 may be embodied as one or more databases comprising indexed information that relates to content identified in system 200. Any suitable schema or organizational structure may be implemented for content index 251 (e.g., relational, hierarchical, flat file, etc.). MongoDB may be used as an illustrative example. In regard to the illustrative embodiment, content index 251 generally comprises information about indexed secondary copies 216 such as secondary copy face maps 254 and indexed thumbnail information. Accordingly, content index 251 may comprise any number of secondary copy face maps 254 (see FIG. 2B) and thumbnail index(es) 255 (see FIG. 2C). Content index 251 may further comprise pointers to media agents 144 that processed and stored the respective content-indexed secondary copies 216 and/or pointers to the locations of the secondary copies 216 in secondary storage devices 108. Content index 251 may further comprise other content-related information about primary and/or secondary data in system 200.

Thumbnail database 252 may be embodied as one or more databases comprising thumbnails and associated metadata. Any suitable schema or organizational structure may be implemented for thumbnail database 252 (e.g., relational, hierarchical, flat file, etc.). A file system may be used as an illustrative example. According to the illustrative embodiment, thumbnail database 252 comprises thumbnail images generated by system 200 and/or imported from other systems. The thumbnail may be associated with metadata obtained from the source image and secondary copy 216 (e.g., file metadata, EXIF metadata, etc.). The thumbnail is indexed to thumbnail index 255. See also FIG. 2C. In contrast to some prior art systems, further image recognition and classification operations according to the illustrative embodiment will be based on the thumbnails rather than on the source secondary copies 216. The source secondary copies 216 need not be accessed further for image processing purposes. In some alternative embodiments, rather than using thumbnails as described herein, copies of the source secondary copies 216 will be generated, stored, and processed as described herein in reference to the thumbnail images. Accordingly, these copies of the source secondary copies 216 (not shown) may be referred to as "tertiary copies" or "image copies."

Content index 251 and thumbnail database 252 are shown here as two distinct components of system 200 to ease understanding of the disclosed embodiment. However, in other embodiments, one consolidated repository may store all the information in content index 251 and thumbnail database 252. In alternative embodiments, the information may be subdivided and/or allocated differently between content index 251 and thumbnail database 252 and/or may be subdivided and allocated among more than two data structures. In some embodiments, content index 251 and/or thumbnail database 252 may be part of, or may be copied in whole or in part to, management database 246.

Recognition analyzer 260 (or "analyzer 260") is a functional component of content index server 250 and may be implemented as executable software and/or firmware that executes thereon. When it executes according to the illustrative embodiment, analyzer 260 is largely responsible for initiating and managing image recognition and classification operations as described in further detail herein. For example, analyzer 260 may perform one or more of the following functions, in any combination and without limitation:

receive and process instructions from storage manager 240 to process secondary copies 216 for image recognition;

receive and process instructions from storage manager 240 to locate secondary copies 216 based on image criteria indexed in content index 251;

generate and index thumbnail images from secondary copies 216, resulting in thumbnail database 252 and content index 251—on demand and/or in the course of performing a content indexing job, a secondary copy job, a browse operation, and/or a restore operation;

perform ongoing image recognition and classification based on analysis of thumbnail images and associated metadata, e.g., using suitable recognition plug-in(s) 261;

collect user-supplied recognition feedback as needed;

provide indexed information for image-based searches and other image-based criteria, e.g., for user searching, for finding secondary copies 216 that satisfy image-based criteria in content policies 348, etc.

import pre-identified and pre-tagged thumbnails and/or images and merging thereof into content index 251 and thumbnail database 252.

Image recognition functionality 261 is illustratively embodied as special-purpose image recognition plug-ins 261 (e.g., 261-1, ..., 261-m) implemented as functional sub-components of recognition analyzer 260. Plug-ins 261 may be selected and configured depending on the needs of system 200. For example, some organizations may be concerned with biological organ recognition, while others may be interested in facial recognition. Suitable plug-ins 261 would be configured accordingly into recognition analyzer 260. Image recognition plug-ins 261 may be directed at different kinds of images: recognizing human faces (see, e.g., FIGS. 2B, 2C, and 3); recognizing animals; recognizing medical images of different kinds, such as XRAYs, MRIs, various kinds of ocular scans, etc.; fingerprint recognition; landmark recognition; etc., without limitation and/or in any combination. Any given special-purpose plug-in 261 may further comprise classification functionality. For example, a plug-in 261 may be able to classify a group of images as a set of similars. A plug-in 261 may be able to classify a group of images as belonging to an organization (e.g., legal dept., development dept., etc.). The classification capabilities may be based in whole or in part on recognizing an image. The classification capabilities may be further based on analyzing metadata, such as EXIF metadata associated with certain images and/or file metadata associated with a secondary copy 216 comprising one or more images. In some embodiments, classification is carried out by recognition analyzer 260 in addition to, in conjunction with, and/or instead of plug-in 261, and/or in any combination without limitation. Any given special-purpose plug-in 261 may comprise application programming interface(s) ("API") for accessing other systems, whether within or outside system 200, e.g., another system 200, a Microsoft Active Directory ("AD") service, a security system, a social networking platform, etc. More details are given in subsequent figures.

User interface 231, image-based storage management logic 241, recognition analyzer 260, and special-purpose image recognition plug-ins 261 are shown herein as distinct components to ease understanding of the present disclosure, however, alternative embodiments are also possible within the scope of the present invention. For example, the functionality of these components may be incorporated into or linked to an existing functional component, layered on existing code, or may be a logical construct whose functionality is distributed through one or more other functional modules. For example, user interface 231 may be an enhancement to user interface 158; image-based storage management logic 241 may be an enhancement to management agent 154 and/or jobs agent 156. For example, recognition analyzer 260 and special-purpose image recognition plug-ins 261 may be implemented in storage manager 240 without the need for a distinct content index server 250. In some embodiments, image recognition functionality is incorporated into recognition analyzer 260 and may be configurable, but not subdivided into distinct plug-in components 261

System 200 may comprise any number of content index servers 250. System 200 may comprise any number of client computing devices 102, as well as any number of other components described in the preceding figures, e.g., primary data storage devices 104, data agents 142, media agents 144, etc.

Figure 2B:
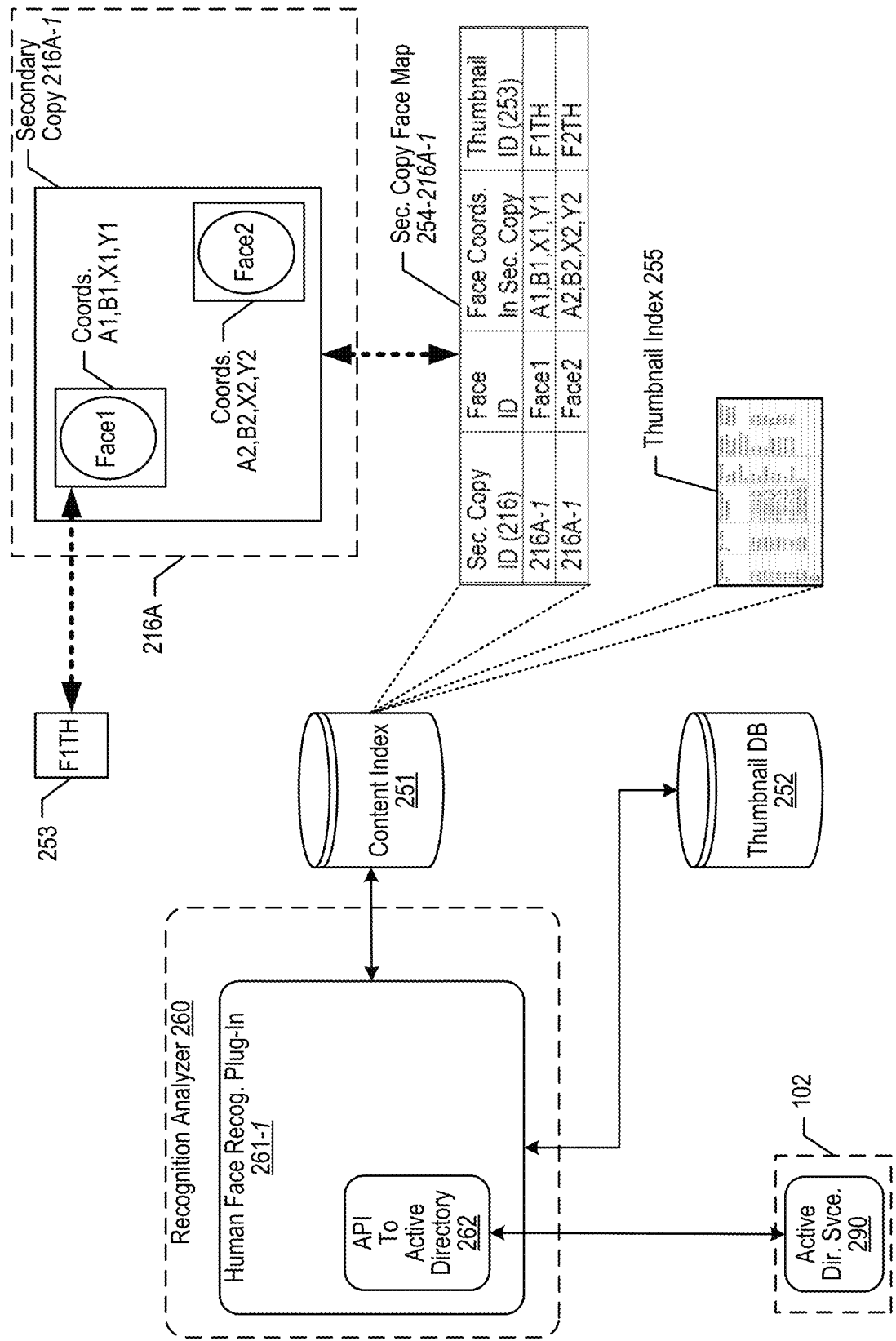
FIG. 2B is a block diagram illustrating certain salient details of system 200, including exemplary secondary copy 216A-1, content index 251, secondary copy face map 254, and human face recognition plug-in 261-1.

FIG. 2B is a block diagram illustrating certain salient details of system 200, including exemplary secondary copy 216A-1, content index 251, secondary copy face map 254, and human face recognition plug-in 261-1. FIG. 2B depicts: secondary copy 216A-1 comprising facial images Face1 and Face2 and their corresponding coordinates; content index 251 comprising secondary copy face map 254-216A-1 and thumbnail index 255; thumbnail database 252; thumbnail image 253; human face recognition plug-in 261-1 comprising an API to active directory service 262; and Microsoft Active Directory service 290 hosted by a client computing device 102.

Secondary copy 216A-1 is one of any number of secondary copies 216 in a set of secondary copies 216A. Secondary copy 216A-1 comprises facial images Face1 and Face2 as detected by system 200. Each facial image has a set of corresponding coordinates representing where in the larger secondary copy the facial image is located. For example, Face1 is located between coordinates A1,B1 and X1,Y1; likewise, Face2 is located between coordinates A2,B2 and X2,Y2. A secondary copy 216 may comprise any number of facial images such as Face1 and Face2, and may further or alternatively comprise any number of other kinds of images, such as images of animals, biological organs, landmarks, etc. Each kind of image may be separately detected by system 200, may be recognized by a suitable image recognition plug-in 261, and may be classified according to any number of classification criteria.

Content index 251 may comprise any number of secondary copy face maps 254, each map 254 associated with a corresponding secondary copy 216, and may further comprise a thumbnail index 255, which is described further in a subsequent figure.

Thumbnail database 252 is depicted in communication with plug-in 261-1 and is described in detail in a subsequent figure.

Thumbnail image 253 (or "thumbnail 253") is a reduced-size version derived from a corresponding image detected in a secondary copy 216 (e.g., by recognition analyzer 260). Thumbnail 253 depicted in the present figure is uniquely designated illustratively as "F1TH" and is logically coupled with the source facial image Face1 as indicated by the dotted bi-directional arrow. See also blocks 602-610 in FIG. 6A.

Generating a thumbnail image 253 from a source facial image such as Face1 is well known in the art and any number of techniques may be used to generate a suitable thumbnail image 253. Thumbnail 253 is generally smaller and of a lower resolution than the source image Face1. Consequently, storing thumbnails 253 occupies substantially less collective storage space in system 200 and processing thumbnails is generally faster than accessing and/or manipulating secondary copies 216. Thumbnails 253, rather than the source images in secondary copies 216, are used for collecting user recognition feedback. In some embodiments, rather than using thumbnails 253 as described herein, "image copies" of the source secondary copies will be used instead.

Secondary copy face map 254 (or "map 254") is an illustrative example of a data structure that associates face images detected in a secondary copy 216 with the particular secondary copy. As shown here, map 254-216A-1 is illustratively configured as a table that associates the facial images in secondary copy 216A-1, e.g., Face1 and Face2, with the source secondary copy 216A-1 and records the images' respective coordinates; and further associates the facial images with their corresponding thumbnails 253. Map 254 is logically coupled with the source secondary copy 216 as indicated by the dotted bi-directional arrow. Maps 254 may be generated by recognition analyzer 260. See also block 614 in FIG. 6A. In some embodiments where the detected images are other than facial images, a similar process may be implemented resulting in a corresponding map 254 associated with the source secondary copy 216. A given secondary copy 216 may be associated with one or more maps 254. A map 254 may record more than one kind of image, e.g., facial images and landmarks, etc. Illustratively, maps 254 are stored in content index 251.

Thumbnail index 255 is a data structure that logically tracks thumbnails 253 in system 200. In some embodiments, thumbnail index 255 may comprise sub-indexes, which may be distributed geographically, but is treated herein as a system-wide component to ease understanding of the present disclosure. More details are given in subsequent figures.

Human face recognition plug-in 261-1 is an illustrative functional component that is directed at recognizing images that represent human faces, such as Face1 and Face2. Numerous human face recognition algorithms are currently known in the art and one or more embodiments thereof may be incorporated into plug-in 261-1 by one having ordinary skill in the art after reading the present disclosure.

API 262 is an optional feature of plug-in 261-1 and provides access to/from a Microsoft Active Directory service 290 hosted by a client computing device 102. Microsoft AD service is well known in the art. Illustratively, an AD that comprises images of company workers associated with identifying metadata such as name, title, location, organization, etc. can be useful in system 200. In such a case, the images and associated metadata may be uploaded by plug-in 261-1 using API 262. The uploaded information may be used as training data for the image recognition algorithm in plug-in 261-1. Training an image recognition algorithm is well known in the art. Furthermore, the uploaded information may be processed by the plug-in and/or recognition analyzer 260 (e.g., generating thumbnails from uploaded images; uploading thumbnails from AD service 290; classifying; etc.), thus resulting in thumbnails that are "imported" from outside system 200. Plug-in 261-1 may store these imported thumbnails to thumbnail database 252 and may index them in thumbnail index 255 (see, e.g., thumbnail records for thumbnails designated J1TH, K1TH, and L1TH in FIG. 2C). See also block 656 in FIG. 6B.

Figure 2C:
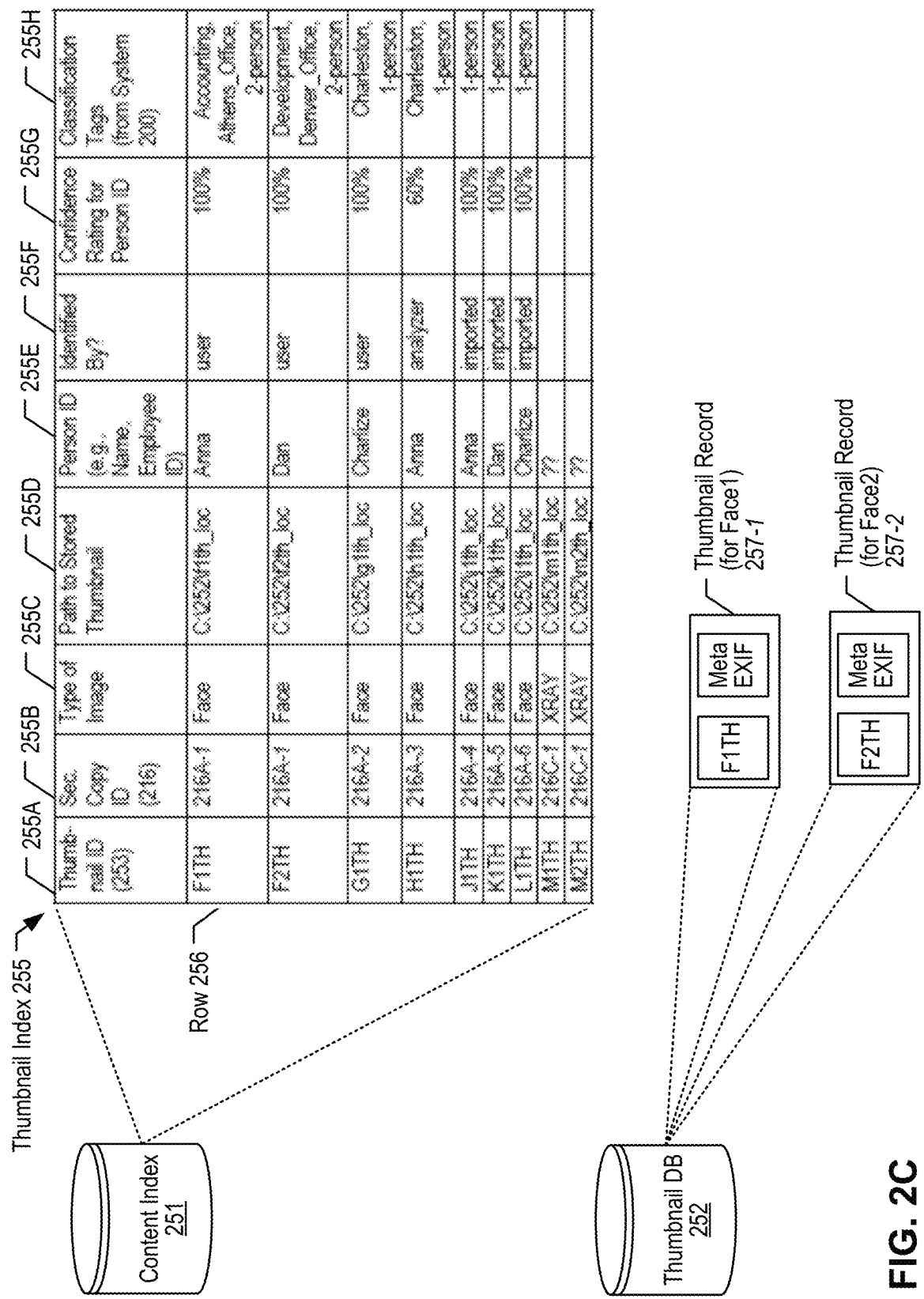
FIG. 2C is a block diagram illustrating further details of system 200, including exemplary thumbnail index 255 and thumbnail records 257.

FIG. 2C is a block diagram illustrating further details of system 200, including exemplary thumbnail index 255 and thumbnail records 257. Illustratively, thumbnail index 255 is stored in content index 251 and thumbnail records 257 are stored in thumbnail database 252.

Thumbnail index 255 is an illustrative logical data structure that tracks thumbnails 253 in system 200. Illustratively, thumbnail index 255 may take the form of a table as shown here, e.g., comprising a row 256 for each unique thumbnail in system 200 and a number of columns, such as 255A, 255B, . . . , 255H. Thumbnail index 255 may take any other suitable form in system 200, and/or may use any number of constituent columns, which will be understood by one having ordinary skill in the art after reading the present disclosure. MongoDB may be used as an example to implement thumbnail index 255.

Illustratively, a row 256 (or "thumbnail entry 256") in thumbnail index 255 may comprise the following information in reference to a given unique thumbnail image 253 in any combination and without limitation:
  unique thumbnail ID (e.g., col. 255A); this ID may be defined at the time that thumbnail 253 is created;
  secondary copy ID from which the thumbnail image originates (e.g., col. 255B); alternatively, this ID may be obtained from maps 254;
  type of source image captured in the thumbnail such as face, animal, kind of medical object, landmark, etc. (e.g., col. 255C);
  path to the stored thumbnail image 253 such as a location in thumbnail database 252 (e.g., col. 255D);
  individual or personal identifier such as an employee name or employee ID or name of landmark, etc. (e.g., col. 255E);
  an indication of how the identification in the preceding column was made such as by a user, by system 200 (e.g., using recognition analyzer 260 and/or recognition plug-in 261), by importation from another system that provides identification such as AD service, etc. (e.g., col. 255F); this source indication may be used in determining a confidence rating for the identification in the preceding column;
  confidence rating for the identifier in a preceding column such as a "grade" or percentage value, etc. (e.g., col. 255G); for example, identifications provided by a user or by importation may be considered highly reliable and may receive a high confidence rating, e.g., 100%; on the other hand, recognition by system 200 may be less reliable if based on just a few baseline images (e.g., thumbnails) but may be considered more reliable if based on a larger number of images, depending on the image recognition algorithm in plug-in 261; and
  classification tags provided by system 200 (e.g., using recognition analyzer 260) (e.g., col. 255H); classification tags may define any number and/or types of categories such as an organizational identifier, a location of the person's office, a location where the recognized image was taken, a location of a recognized landmark, a count of how many faces are recognized in a secondary copy 261, a similarity flag to another image and/or secondary copy, etc., without limitation and in any combination. Classification categories may be programmed by default into recognition analyzer 260 and/or may be entered by a system administrator.

Thumbnail records 257 are illustrative data structures comprising thumbnails 253 and associated metadata such as exchangeable image file format ("EXIF") information. The metadata may be extracted from the source image and/or secondary copy 216 from which the respective thumbnail was generated. See also block 612 in FIG. 6A. Each thumbnail is uniquely identified, e.g., "F1TH." In some embodiments, the metadata associated with a respective thumbnail image 253 is stored in thumbnail index 255 or in another table or data structure stored in content index 251. Thumbnail records 257 may take any form suitable to system 200, which will become clear to a person having ordinary skill in the art after reading the present disclosure.

Notably, when identified images are imported such as from an Active Directory service 290 (in FIG. 2B) or from another system such as security system 380 (in FIG. 3) or medical imaging systems 470 and 480 (in FIG. 4), system 200 (e.g., using recognition analyzer 260) generates thumbnail images 253 from the imported images in a manner analogous to processing of detected images in secondary copies 216 and updates thumbnail database 252 accordingly. See also block 656 in FIG. 6B. Thus, a thumbnail 253 may be based on pre-identified sources and therefore the identification information imported along with the source image will be included in thumbnail index 255, e.g., in column 255E. In some embodiments, the imported images are in the form of thumbnails 253 suitable to system 200; accordingly, the identification information imported along with imported thumbnail 253 will be included in thumbnail index 255, e.g., in column 255E, 255H. In some embodiments, system 200 may import a thumbnail index 255 in whole or in part from another like system (e.g., from a storage management system operating at a different office of the same enterprise that owns/operates system 200); the imported and local thumbnail indexes 255 may be logically and/or physically combined within system 200 (e.g., using recognition analyzer 260).

Figure 3:
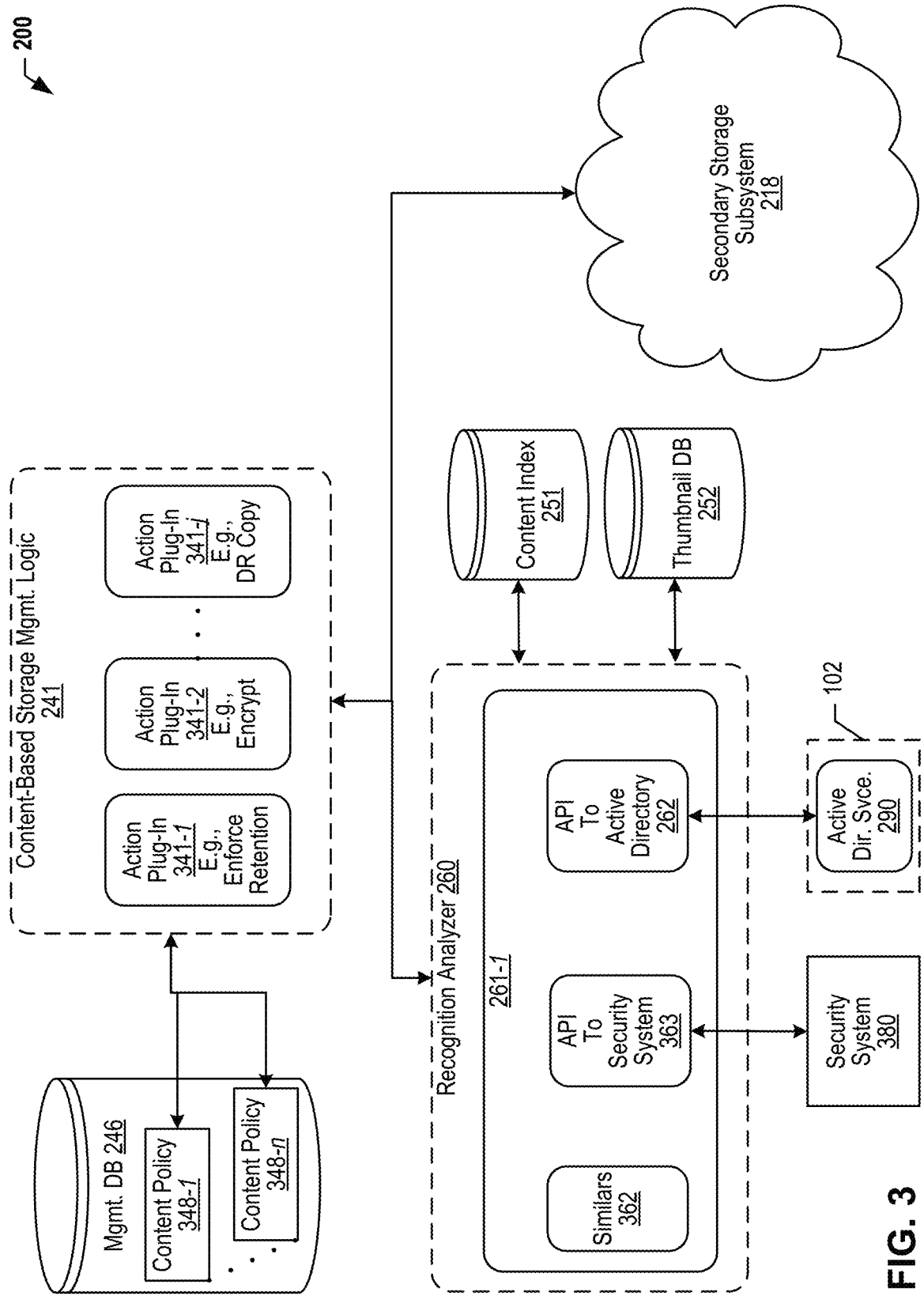
FIG. 3 is a block diagram illustrating certain salient details of system 200, including exemplary action plug-ins 341 for content-based storage management logic, content policies 348, and human image recognition plug-in 261-1.

FIG. 3 is a block diagram illustrating certain salient details of system 200, including exemplary action plug-ins 341, content policies 348, and human image recognition plug-in 261-1. In addition to previously-depicted components, system 200 further comprises: any number of action plug-ins 341 in content-based storage management logic 241; any number of content policies 348 in management database 246; recognition plug-in 261-1 further comprising similarity analyzer 362, and API 363 to/from security system 380. Security system 380 may operate outside system 200.

The "action" functionality 341 is illustratively embodied as plug-ins 341 (e.g., 341-1, 341-2, . . . , 341-j), operating as functional sub-components of content-based storage management logic 241 in storage manager 240. Plug-ins 341 may be selectively configured as needed. Some of the depicted action plug-ins 341 are directed at storage management operations such as retention enforcement, encryption, disaster recovery copy generation, etc. Other plug-ins 341 may be directed at other operations, such as exporting certain secondary copies 216 outside system 200, etc. See block 808 in FIG. 8 for more illustrative examples. The use of action plug-ins 341 according to the illustrative embodiment provides a flexible and scalable architecture that enables storage manager 240 to grow functionally as new operations are devised going forward. In some embodiments actions defined by plug-ins 341 may be incorporated into storage manager 240 and may be configurable, but not subdivided into distinct plug-in components 341.

Content policies 348 are analogous to information management policies 148 and further comprise image criteria and operational rules for governing storage management operations. A content policy 348 may be analogous to a storage policy, a scheduling policy, and/or an audit policy in any combination or may be implemented as a distinct kind of information management policy in management database 246. For example, a content policy 348 may comprise an image criterion such as an individual personal identifier (e.g., employee name), and an operational rule that specifies applicable storage management operation(s) and/or time parameters for secondary copies in secondary storage subsystem 218 that comprise an image of the person with that name. An example policy may be that secondary copies comprising an image of a company's CEO are to be retained indefinitely. Another example policy may be that secondary copies comprising an image of company headquarters are to be retained as disaster recovery copies. Another example policy may be that secondary copies comprising image(s) related to a certain event are to be placed under legal-hold. In another example policy secondary copies comprising circuit diagrams (whether in raw format or as images) are to be retained as disaster recovery copies.

Figure 6A:
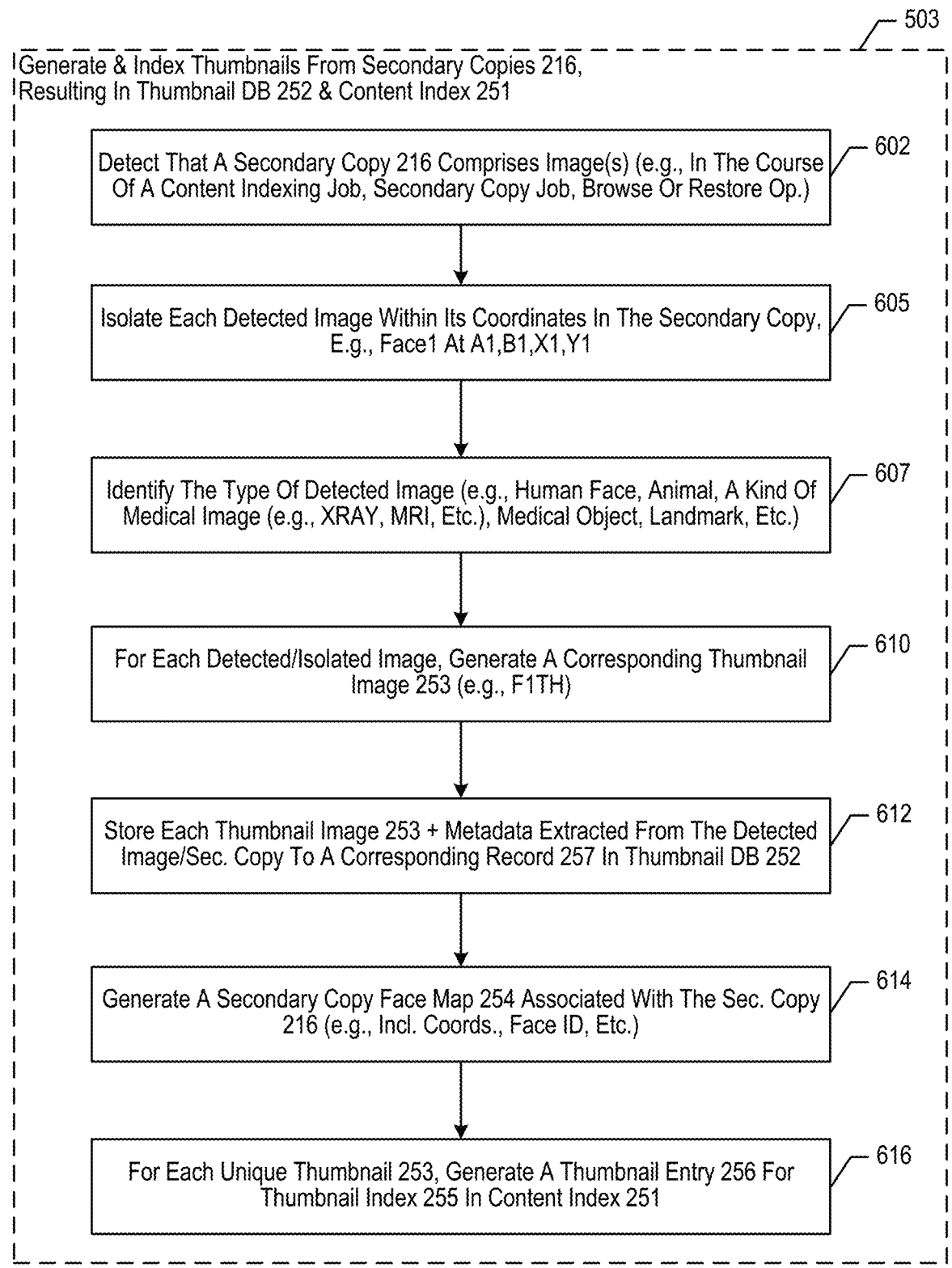
FIG. 6A depicts some salient operations of block 503 in method 500.
Figure 6B:
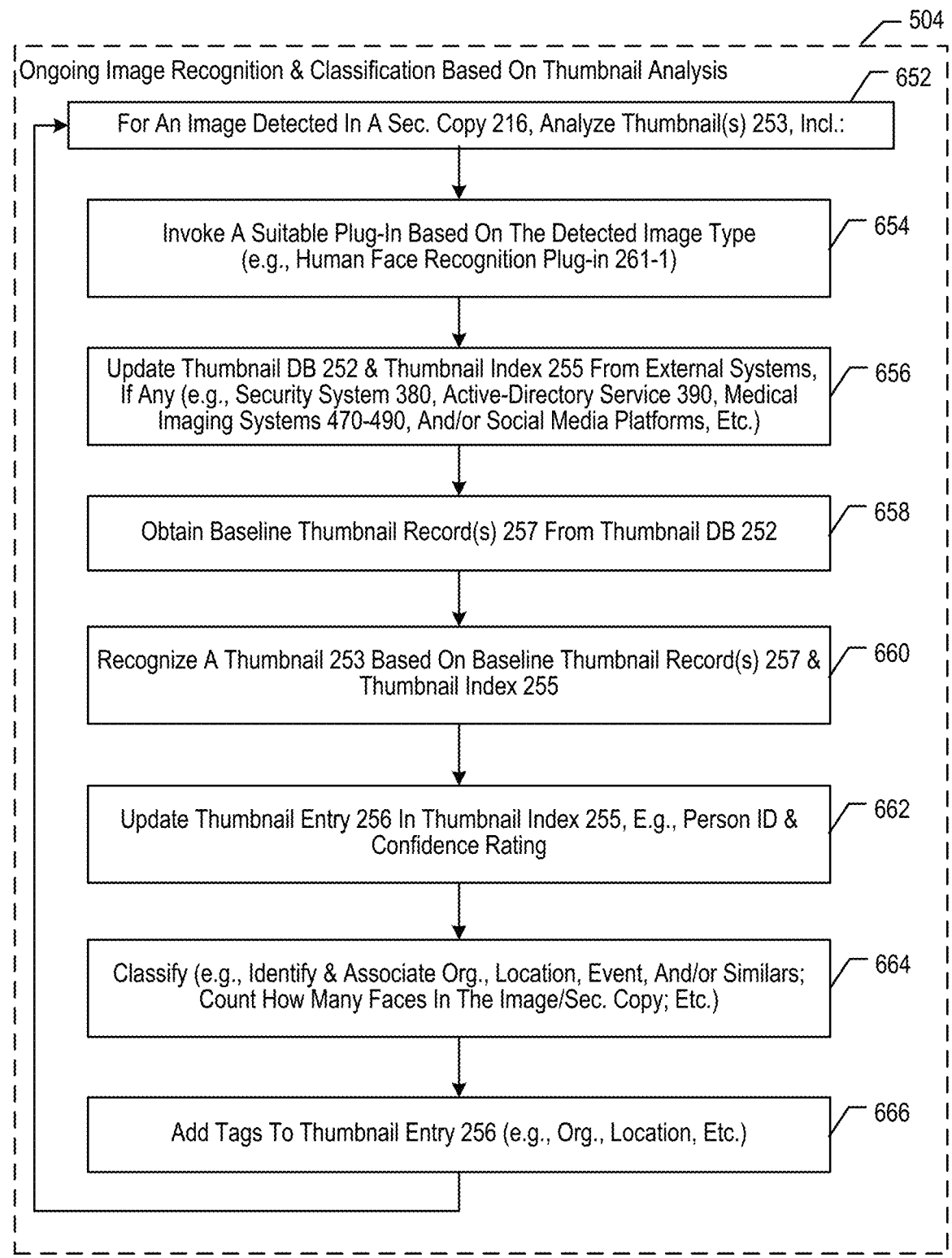
FIG. 6B depicts some salient operations of block 504 in method 500.

Examples of image-based content criteria may include:
a specific image identifier, e.g., person's name, employee ID, name of landmark such as company headquarters, a location such as a city or a street address, etc.;
a class of image, which may have resulted from classification operations, e.g., an organizational code, a kind of medical image (e.g., XRAY, MRI, etc.), a kind of biological organ (e.g., lung, kidney, eye, etc.), a count of how many faces appear in an image (e.g., 1, 2, 5 or more, etc.), etc. without limitation; see also block 664 in FIG. 6B. A class of image may be based on metadata analysis, e.g., geo-location obtained from EXIF metadata.

Any number, combination, and permutation of image-based content criteria and operational rules may be devised and supported by system 200 and content policies 348.

Recognition plug-in 261-1 illustratively comprises API 262, which was described in more detail in a preceding figure, and further comprises other functionality such as similarity analyzer 362 and API 363 to/from security system 380.

Similarity analyzer 362 is a functional component that identifies similar images showing a particular subject. Examples may include a burst of snapshots of a certain person or group of persons taken within a short period of time. Similar images may be identified based on EXIF metadata and other aspects according to one or more techniques well known in the art. Similar images may be so classified in thumbnail database 255, e.g., using appropriate tags in column 255H. Like API 262, similarity analyzer 362 is optional.

API 363 is an optional feature of recognition plug-in 261-1 and provides access to/from security system 380, which illustratively comprises a security database of images of company workers and identifying metadata such as name, title, location, organization, etc. In such a case, the images and associated metadata may be uploaded by plug-in 261-1 using API 363. The uploaded information may be used as training data for the image recognition algorithm in plug-in 261-1 and may be further processed for inclusion in thumbnail database 252 and thumbnail index 255 as described in more detail above. See also block 656 in FIG. 6B. Security system 380 may operate outside system 200.

Similarity analyzer 362, API 262, and API 363 are shown herein as distinct components to ease understanding of the present disclosure, however, alternative embodiments are also possible within the scope of the present invention. For example, the functionality of these components may be incorporated into or linked to an existing functional component (e.g., plug-in 261-1 or recognition analyzer 260), layered on existing code, or may a logical construct whose functionality is distributed through one or more functional components. Systems 290 and 380 may operate outside system 200. Each system may communicate to any number of systems 200.

Figure 4:
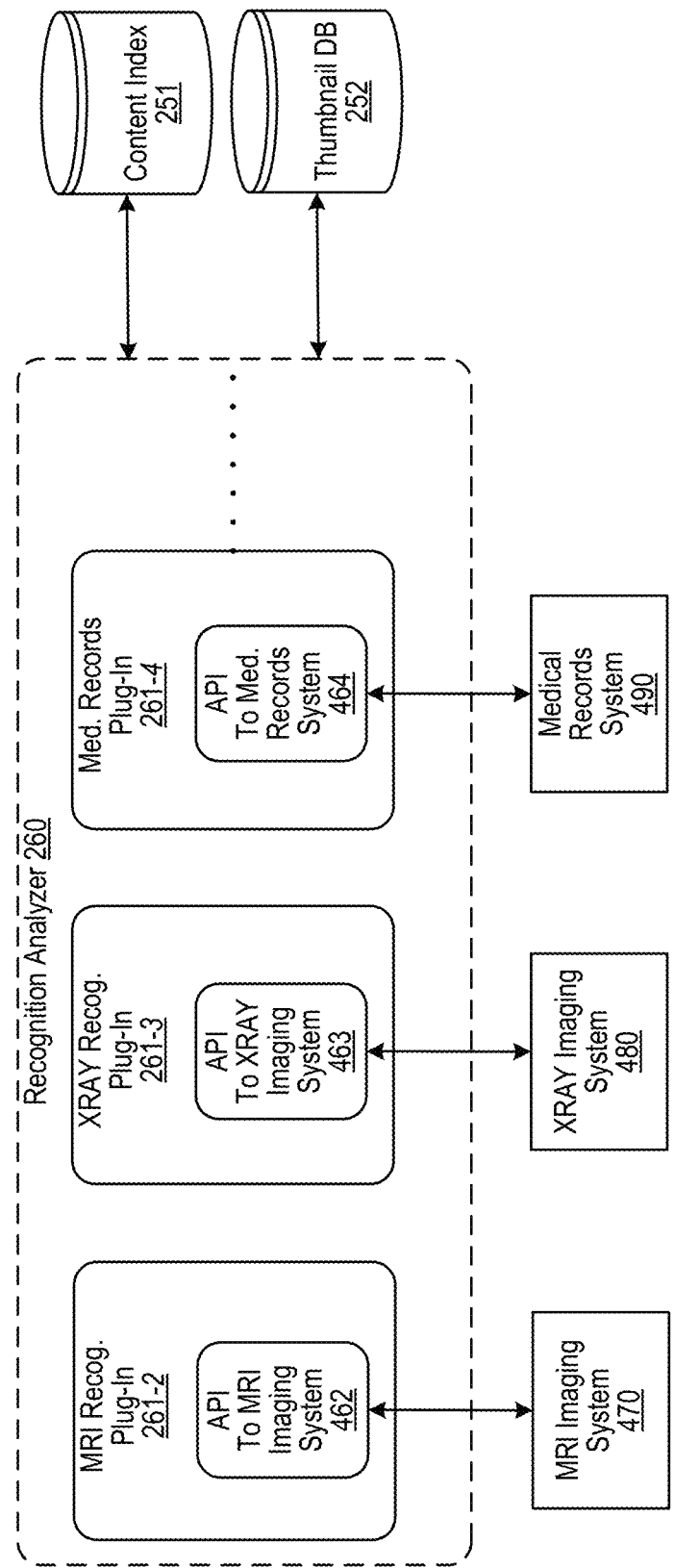
FIG. 4 is a block diagram illustrating certain salient details of system 200, including exemplary image recognition plug-ins 261-2, 261-3, and 261-4, which relate to medical services and medical imaging.

FIG. 4 is a block diagram illustrating certain salient details of system 200, including exemplary image recognition plug-ins 261-2, 261-3, and 261-4, which relate to medical services and medical imaging. FIG. 4 is analogous to FIG. 3, and is generally directed at processing medical-related images and interfacing with medical imaging and service systems (e.g., 470, 480, and 490).

MRI (magnetic resonance imaging) recognition plug-in 261-2 is an illustrative functional component of recognition analyzer 260. It is directed at recognizing MRI radiology images that typically represent human organs, such as heart, kidney, etc. and/or portions thereof. At least one organ recognition algorithm is currently known in the art and one or more embodiments thereof may be incorporated into plug-in 261-2 by one having ordinary skill in the art after reading the present disclosure.

XRAY recognition plug-in 261-3 is an illustrative functional component of recognition analyzer 260. It is directed at recognizing XRAY images that typically represent human organs, such as heart, kidney, etc. and/or portions thereof. At least one organ recognition algorithm is currently known in the art and one or more embodiments thereof may be incorporated into plug-in 261-3 by one having ordinary skill in the art after reading the present disclosure.

Medical records plug-in 261-4 is an illustrative functional component of recognition analyzer 260. It is directed at recognizing medical images that may be found in patient records, such as ocular scans, EKG readings, etc. At least one suitable recognition algorithm is currently known in the art for recognizing such medical images and one or more embodiments thereof may be incorporated into plug-in 261-4 by one having ordinary skill in the art after reading the present disclosure.

APIs 462, 463, and 464 illustratively operate in plug-ins 261-2, 261-3, and 261-4, respectively, for providing access to/from systems 470, 480, and 490, respectively, playing a role similar to API 262. Plug-ins 261-2, 261-3, and 261-4 may use APIs 462, 463, and 464, respectively, to extract images and/or thumbnails from systems 470, 480, and 490, respectively, for purposes of training the recognition algorithm in the respective plug-in; the plug-ins may also store thumbnails to thumbnail database 252 and may index them in thumbnail index 255 as described in more detail elsewhere herein.

Systems 470, 480, and 490 may operate outside system 200. Each system may communicate to any number of systems 200.

Figure 5:
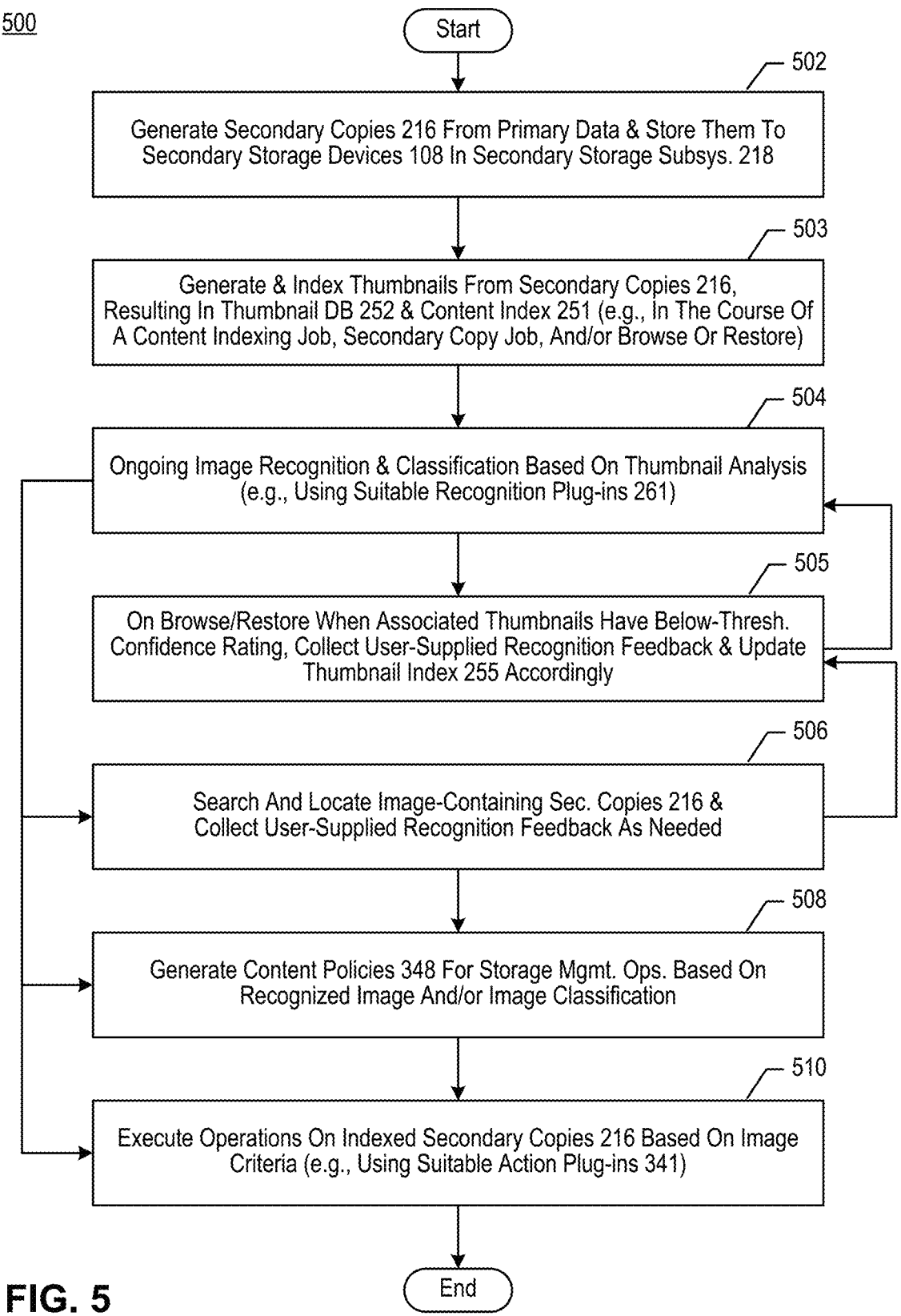
FIG. 5 depicts some salient operations of a method 500 that operates in system 200 according to an illustrative embodiment of the present invention.

FIG. 5 depicts some salient operations of a method 500 that operates in system 200 according to an illustrative embodiment of the present invention. Method 500 is performed by components of system 200, as described in further detail herein.

At block 502, system 200 may generate secondary copies 216 from primary data and may store them to secondary storage devices 108 in secondary storage subsystem 218. As described in more detail elsewhere herein, several components are involved in generating and storing secondary copies 216, including storage manager 240, data agents 142, primary data storage devices 104, media agents 144, and secondary storage devices 108. Secondary copies 216 may include backup copies (e.g., full, incremental, differential, etc.); auxiliary copies; archive copies; reference copies; disaster recovery copies; snapshots; etc.

At block 503, system 200 may generate and index thumbnails from secondary copies 216, resulting in thumbnail database 252 and content index 251. This may occur in the course of a content indexing job, secondary copy job, and/or browse or restore operations. More details are provided in a subsequent figure.

At block 504, system 200 performs image recognition & classification on an ongoing basis based on thumbnail analysis (e.g., using recognition analyzer 260 and suitable recognition plug-ins 261). More details are provided in a subsequent figure. Control may pass to a subsequent block such as 505, 506, 508, or 510.

At block 505, which may be triggered by a browse or restore operation invoked by a user, system 200 (e.g., using logic 241 and/or recognition analyzer 260) may determine that thumbnail(s) associated with the browsed/restored secondary copies 216 have confidence ratings that fall below an acceptability threshold. The acceptability threshold may be administratively set, e.g., 60%. System 200 may then ask the user who invoked the browse/restore command to provide recognition feedback on those below-threshold thumbnail images 253. Accordingly, user interface 231 may present the user with thumbnail images and their respective metadata (e.g., information in records from thumbnail database 252 and/or thumbnail index 255) and may ask the user to provide recognition feedback, such as an identification of the thumbnail image, e.g., a person's name, a landmark's name, an organ designation, etc. Via user interface 231, system 200 may then collect the user-supplied recognition feedback and may update thumbnail entry 256 accordingly in thumbnail index 255 (e.g., cols. 255E, 255F, 255H). Recognition analyzer 260 may further update the confidence rating for the particular thumbnail image in thumbnail index 255 (e.g., col. 255G). For example, imported and user-rated thumbnails may receive a 100% rating; thumbnails recognized by one of the recognition plug-ins 261 may receive ratings provided by the respective recognition algorithm in the plug-in such as based on a level of training.

Notably, the user feedback process here involves the thumbnail images 253 previously derived from secondary copies 216. The actual secondary copies 216 are not accessed or used in the course of obtaining recognition feedback from users, even if the user-invoked operation is a restore operation. The approach of handling image recognition via thumbnail images 253 rather than by accessing secondary copies 216 provides significant performance advantages in system 200. Because the thumbnail images 253 are smaller and locally stored by content index server 250, they are more speedily retrieved and presented than secondary copies 216; likewise, key metadata also is available locally from thumbnail database 252 and/or thumbnail index 255. This approach avoids placing a load on media agents 144 to access and retrieve secondary copies. Instead, the feedback process may be handled entirely by storage manager 240 and content index server 250 from local resources, e.g., thumbnail database 252 and thumbnail index 255. After feedback is obtained in the present block, control may pass back to block 504. Thus, blocks 504 and 505 form an ongoing feedback loop that continually seeks to improve the confidence ratings of thumbnails recognized in system 200.

At block 506, system 200 may search and locate image-containing secondary copies 216. A user may search using certain image-based criteria, e.g., via user interface 231. More details are provided in a subsequent figure. In the process of performing the search and locate, system 200 (e.g., using logic 241 and/or recognition analyzer 260) may determine that thumbnail(s) associated with some sought-after secondary copies 216 have confidence ratings that fall below an acceptability threshold; in such a case, control will pass back to block 505 to collect user recognition feedback.

At block 508, system 200 may generate content policies 348 that govern storage management operations based on recognized image and/or image classification. Content policies 348 typically are entered by a system administrator using user interface 231. Content policies 348 may be stored in management database 246. As described above (see FIG. 3), content policies 348 may have criteria that comprise individual image identifiers (e.g., a name) and/or classifications (e.g., group of persons, medical image, etc.). The storage management operations that are to be executed based on the image-based criteria in the content policy are discussed in further detail in regard to block 510.

At block 510, system 200 may execute certain operations upon indexed secondary copies 216 that satisfy image-based criteria. The image-based criteria may be user-supplied on demand or may be provided by a content policy 348. More details are provided in a subsequent figure. Method 500 may end.

FIG. 6A depicts some salient operations of block 503 in method 500. Block 503 is generally directed at generating and indexing thumbnail images 253 from secondary copies 216. Block 503 may be executed by recognition analyzer 260, which may be invoked on instructions from storage manager 240.

At block 602, in the course of a content indexing job, secondary copy job, browse or restore operations, recognition analyzer 260 may detect that a secondary copy 216 comprises one or more images.

At block 605, recognition analyzer 260 may isolate each detected image within its coordinates in the secondary copy, e.g., Face1 at A1,B1, X1,Y1; Face2 at A2, B2, X1, Y1. This step is preliminary to generating corresponding thumbnails 253 of Face1 and Face2.

At block 607, recognition analyzer 260 may identify the type of detected image (e.g., human face, animal, a kind of medical image (e.g., XRAY, MRI, etc.), landmark, etc.). This operation may be performed by a suitable plug-in 261 invoked by recognition analyzer 260. Some additional details may be found in FIGS. 2B and 2C.

At block 610, recognition analyzer 260 may generate a corresponding thumbnail image 253 for each isolated image such as Face1. The thumbnail image 253 will receive a unique identifier, e.g., "F1TH," which will be used by system 200 in further indexing and searching operations. The thumbnail may be generated by a suitable plug-in 261 invoked by recognition analyzer 260.

At block 612, recognition analyzer 260 may store each thumbnail image 253 to a corresponding record 257 in thumbnail database 252. Recognition analyzer 260 may further extract metadata (e.g., EXIF) from the detected image and/or secondary copy 216, and may add this extracted metadata to the record 257. Alternatively, the extracted metadata will be stored in whole or in part in thumbnail index 255.

At block 614, recognition analyzer 260 may generate a secondary copy face map 254 associated with the secondary copy 216. The map 254 may comprise the coordinates of the facial image, an ID given to the facial image, as well as the unique thumbnail ID.

At block 616, recognition analyzer 260 may generate a thumbnail entry 256 for each unique thumbnail 253. The thumbnail entry 256 is entered in thumbnail index 255 in content index 251. Using thumbnail index 255, system 200 may locate the thumbnail images in thumbnail database 252 and may further identify the source secondary copy 261 from which the thumbnails were generated.

FIG. 6B depicts some salient operations of block 504 in method 500. Block 504 is generally directed at ongoing image recognition and classification based on thumbnail analysis performed by recognition analyzer 260 and suitable plug-ins 261. Some additional details may be found in FIGS. 2B, 2C, 3, and 4. By way of example, thumbnail index 255 as depicted in FIG. 2C will be used to illustrate the operation of the depicted blocks within system 200. Illustratively, the subject thumbnail to be recognized is "H1TH," which represents a face.

Block 652 represents the start of thumbnail analysis for an image detected in a secondary copy 216, e.g., Face1.

At block 654, recognition analyzer 260 may invoke a suitable plug-in 261 based on the detected image type (e.g., human face recognition plug-in 261-1, MRI recognition plug-in 261-2, etc.). Illustratively, plug-in 261-1 is invoked for face recognition.

At block 656, plug-in 261 may use an API (e.g., 262, 363, 462, etc.) to access an external system (e.g., active-directory service 290, security system 380, medical imaging systems 470-490, and/or social media platforms, etc.) and import identified images. As described above in more detail, identified images may be uploaded from the external system(s), thumbnails 253 created therefrom, and updates to thumbnail database 252 and thumbnail index 255 may be entered. The recognition plug-in 261 may further use the imported images/thumbnails to train itself for facial recognition. Illustratively, APIs 262 and 363 are invoked here to import images into system 200; thumbnails J1TH, K1TH, and L1TH are generated and corresponding records 257 and thumbnail entries 256 are created. Training for image recognition may require user recognition feedback and training processes are well known in the art. The amount of training required may vary among algorithms that are known in the art.

At block 658, plug-in 261 may obtain a suitable number of baseline thumbnail record(s) 257 from thumbnail database 252 for purposes of recognizing the subject thumbnail 253 (H1TH). Any and all records 257 may be considered relevant by the plug-in 261 performing the recognition analysis, according to techniques that are well known in the art. Illustratively, thumbnails F1TH, F2TH, G1TH, J1TH, K1TH, and L1TH may be used as baseline images. The number of baseline images used for performing an image recognition task may vary among algorithms that are known in the art.

At block 660, plug-in 261 may recognize the subject thumbnail 253 based on baseline thumbnail record(s) 257 according to techniques that are well known in the art. Some information needed for recognizing thumbnail image 253 may be obtained by plug-in 261 from thumbnail index 255, as needed. Illustratively, plug-in 261-1 recognizes thumbnail H1TH as an image of Anna.

At block 662, plug-in 261 and/or recognition analyzer 260 may update thumbnail entry 256 in thumbnail index 255, e.g., providing a personal identifier (e.g., name, etc.). Plug-in 261 may further provide a confidence rating for the identifier, for example, as provided by the respective recognition algorithm in plug-in 261 such as based on a level of training or based on the number of reliable baseline images used in the recognition task. The confidence rating may also be a value assigned by recognition analyzer 260, for example based on the number of thumbnail images 253 in thumbnail database 252. Illustratively, "Anna" is added to column 255E for thumbnail H1TH, "analyzer" is added to column 255F, and "60%" is added to column 255G as a confidence rating in Anna's identity here.

At block 664, recognition analyzer 260 (e.g., using plug-in 261) may further analyze thumbnail image 253 for classification purposes. For example, the image comprising the thumbnail may be classified as a group shot; an organization ID may be identified based on the recognized personal ID; similar thumbnails and/or images may be flagged (e.g., using similarity analyzer 362); an event or geo-location may be identified based on EXIF date/location, etc. Illustratively, the image containing Anna's face is classified as "1-person" shot, and the image is classified as being taken in Charleston.

At block 666, recognition analyzer 260 may further populate thumbnail index 255 with classification tags generated in the preceding block. These may be added to column 255H, for example. Illustratively, "1-person" and "Charleston" tags are added to thumbnail entry 256 for thumbnail H1TH. Control may pass back to block 652 to continue processing other thumbnails 253 for the present image. Counting how many persons appear in an image may occur after all thumbnails in an image have been processed, i.e., at the end of the loop initiated by block 652.

Figure 7:
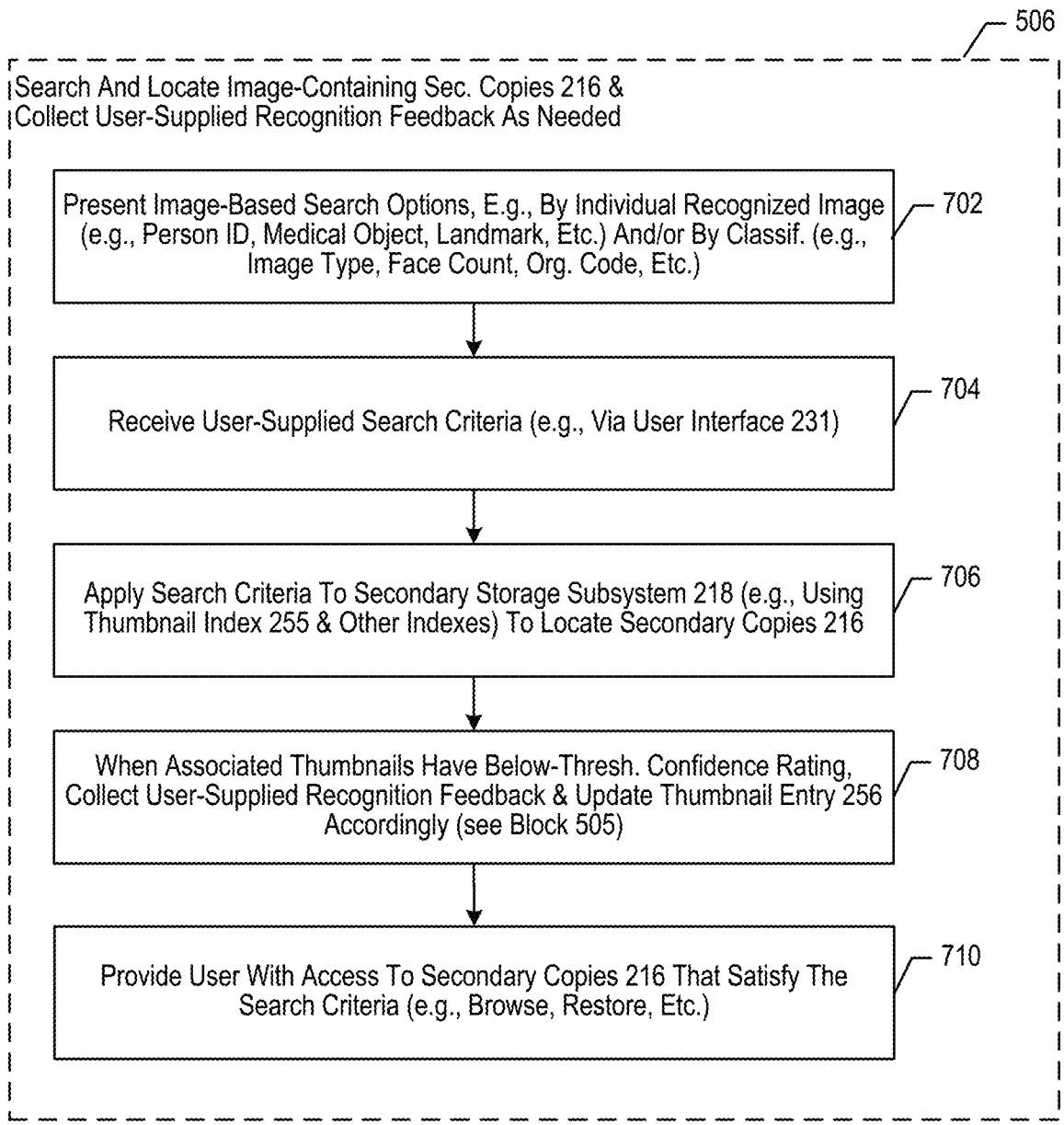
FIG. 7 depicts some salient operations of block 506 in method 500.

FIG. 7 depicts some salient operations of block 506 in method 500. Block 506 is generally directed at searching for and locating image-containing secondary copies 216. By way of example, thumbnail index 255 as depicted in FIG. 2C and map 254-216-1 in FIG. 2B will be used to illustrate the operation of the depicted blocks.

At block 702, storage manager 240 (e.g., using image-based storage management logic 241 and user interface 231) may present image-based search options, e.g., by individual recognized image (e.g., person id, biological organ, landmark, etc.) and/or by classification (e.g., image type, face count, organizational code, etc.).

At block 704, storage manager 240 may receive user-supplied search criteria (e.g., via user interface 231). Illustratively the user will supply "Anna" as a search criterion.

At block 706, storage manager 240 may instruct content index server 250 to apply the search criteria to secondary storage subsystem 218. In response, content index server 250 may use thumbnail index server 255 to identify the secondary copy(ies) 216 that satisfy the search criteria (illustratively, 216A-1, 216A-3, and 216A-4). Once identified, the secondary copies 216 need to be located to a specific secondary storage device 108. This may be accomplished via maps 254, which may provide a storage path to the respective secondary copy 216; via information in management database 246 and/or media agent index 153; and/or any combination thereof without limitation. Depending on the search criteria, the search may be satisfied by analyzing metadata, e.g., geo-location information in EXIF metadata stored in thumbnail records 257. Searching may be implemented using SOLR from the Apache Software Foundation, or using any other technique well known in the art.

At block 708, content index server 250 may determine, in the course of working with thumbnail index 255, that certain thumbnails 253 that satisfy the search criteria have a below-threshold confidence rating; in such a case control passes to block 505 to collect user-supplied recognition feedback and update the thumbnail entry 256 in thumbnail index 255.

At block 710, system 200 (e.g., storage manager 240 and/or media agent 144 may provide the user with access to secondary copies 216 that satisfy the search criteria (e.g., browse, restore, etc.). Browse and restore operations are well known in the art and will not be reiterated here. At this point, the user-invoked search is complete and the requested operation is fully executed based on image-based search criteria provided by the user (e.g., using user interface 231).

Figure 8:
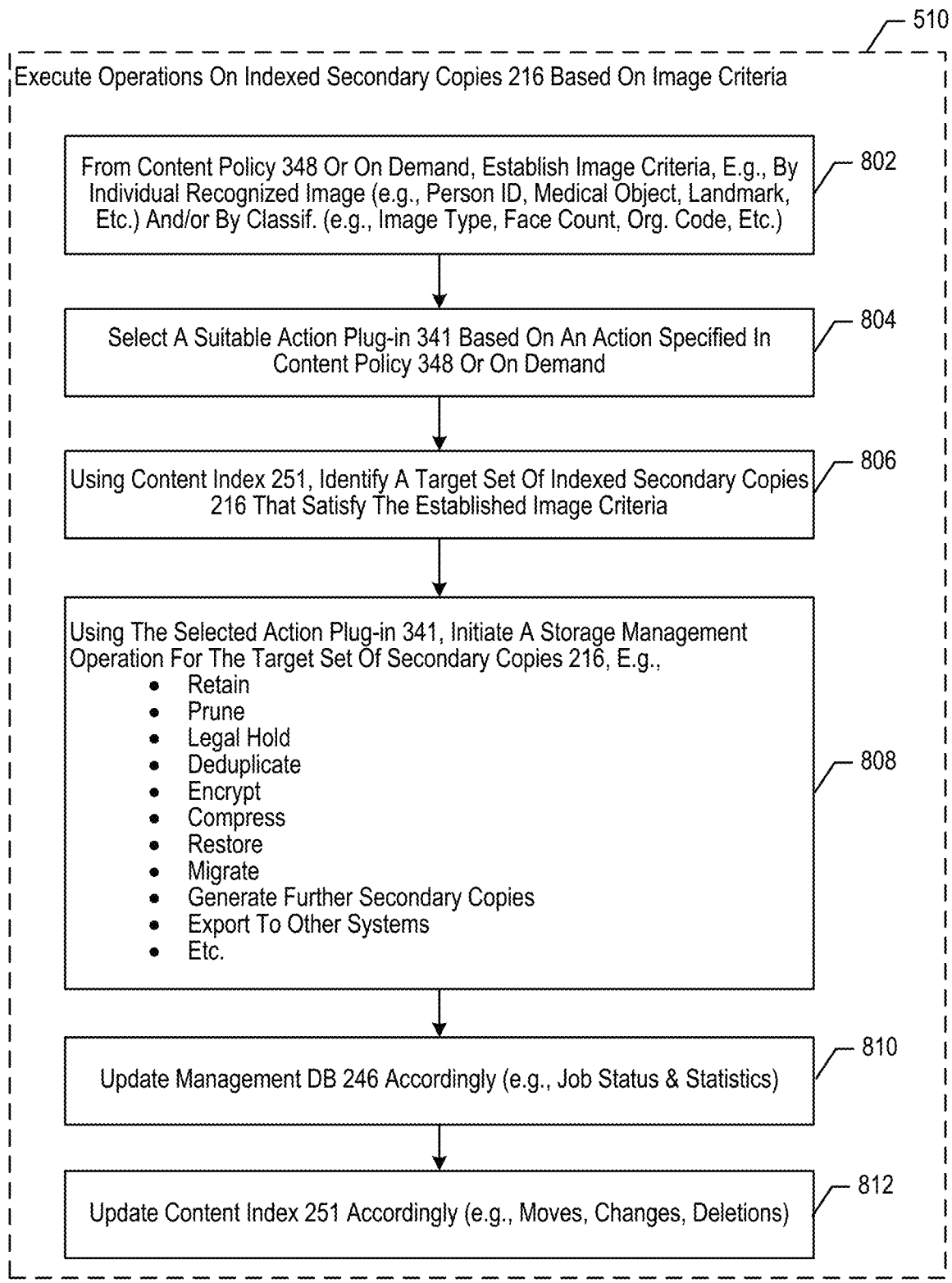
FIG. 8 depicts some salient operations of block 510 in method 500.

FIG. 8 depicts some salient operations of block 510 in method 500. Block 510 is generally directed at executing operations on indexed secondary copies 216 based on image criteria.

At block 802, which may be invoked by a content policy 348 or on demand, image criteria may be established for the operation, e.g., by individual recognized image (e.g., person ID, landmark, etc.) and/or by classification (e.g., image type, face count, org. code, etc.). On demand, the image criteria may be established consistent with the description of block 702. In content policy 348, image criteria may be administered by a system administrator, e.g., via user interface 231.

At block 804, storage manager 240 (e.g., using image-based storage management logic 241) may select a suitable action plug-in 341 based on an action specified in content policy 348 or on demand. For example, encryption plug-in 341-2 may be selected if encryption is specified by the one-demand user or in the content policy 348. More than one action plug-in 341 may be selected as appropriate.

At block 806, a target set of indexed secondary copies 216 that satisfy the established image criteria may be identified. For example, storage manager 240 (e.g., using image-based storage management logic 241) may instruct content index server 250 to identify the target set of secondary copies in a manner consistent with block 706.

At block 808, storage manager 240 (e.g., using image-based storage management logic 241) may use the selected action plug-in(s) 341 to initiate a storage management operation for the target set of secondary copies 216. Example operations include in any combination and without limitation:
retain
prune
legal hold
deduplicate
encrypt
compress
restore
migrate
generate further secondary copies (e.g., auxiliary copies, reference copies, disaster recovery copies, etc.)
export to other systems, e.g., to another system 200, to active directory service 290, to security system, 380, etc.

Some of these operations do not effectuate changes upon the secondary copies 216 themselves, but instead result in management changes that are tracked in management database 246, e.g., establishing a retention period or legal hold. Some operations may affect the target secondary copies, e.g., target secondary copies 216 may be replaced with corresponding versions that have been encrypted.

At block 810, storage manager 240 may update management database 246 accordingly (e.g., operation/job status and statistics). Likewise, new retention and legal hold parameters may be entered in management database 246.

At block 812, storage manager 240 may report and/or instruct content index server 250 to update content index 251 accordingly (e.g., reflecting moves, changes, deletions) that may have occurred in the above operations. For example, if a secondary copy 216 is pruned, the corresponding face map 254 likewise should be deleted and any thumbnail entries 256 also should be updated accordingly (e.g., column 255B).

In regard to the figures described herein, other embodiments are possible within the scope of the present invention, such that the above-recited components, steps, blocks, operations, and/or messages/requests/queries/instructions are differently arranged, sequenced, sub-divided, organized, and/or combined. In some embodiments, a different component may initiate or execute a given operation.

Example Embodiments

Some example enumerated embodiments of the present invention are recited in this section in the form of methods, systems, and tangible non-transitory computer-readable media without limitation. The numbers enumerated in the present Example Embodiment section are used here for illustrative purposes and do not represent the claims presented for examination, which appear elsewhere herein.

An example system may comprise:
a secondary storage subsystem comprising secondary copies of primary data and secondary storage devices storing the secondary copies;
a computing device comprising one or more processors and associated computer memory for storing computer-executable instructions, and further comprising mass storage for storing data;
wherein the computing device is programmed to:
store a thumbnail index in the mass storage,
wherein the thumbnail index comprises associations between thumbnail images representing persons and respective personal identifiers of the represented persons, and
wherein the thumbnail index further comprises associations between thumbnail images and secondary copies comprising one or more images of the respective person represented by the respective thumbnail image,
receive a criterion that comprises a first personal identifier of a first person,
use the thumbnail index to identify one or more secondary copies in the secondary storage subsystem that comprise an image of the first person having the first personal identifier,
wherein the identify operation is performed by the computing device without accessing the identified one or more secondary copies, and
initiate a first storage-management operation upon the identified one or more secondary copies that comprise an image of the first person having the first personal identifier.

The above-recited system wherein the criterion is a search term supplied in a search, and wherein the first storage-management operation is to locate, in response to the search term, the identified one or more secondary copies in their respective storage locations in the secondary storage subsystem. The above-recited system wherein the first storage-management operation is to enforce upon the identified one or more secondary copies at least one of: a retention policy, a pruning policy, and a legal-hold policy. The above-recited system wherein the first storage-management operation is to export the identified one or more secondary copies to another system. The above-recited system wherein the first storage-management operation is to replace at least one of the identified one or more secondary copies with corresponding new secondary copies that have been at least one of: encrypted, deduplicated, and compressed. The above-recited system wherein the first storage-management operation is to generate further secondary copies from the identified one or more secondary copies wherein the further secondary copies have been at least one of: encrypted, deduplicated, and compressed. The above-recited system wherein the first storage-management operation is to generate further secondary copies from the identified one or more secondary copies. The above-recited system wherein the first storage-management operation is to live browse one or more of the identified one or more secondary copies from a viewing application that executes on the computing device. The above-recited system wherein the first storage-management operation is to restore one or more of the identified one or more secondary copies to the mass storage of the computing device, wherein the restored version of a secondary copy is accessible to a viewing application that executes on the computing device. The above-recited system wherein at least some of the entries in the thumbnail index are based on images stored outside the system and accessible to the computing device, wherein the outside images are associated with respective personal identifiers for the person or persons represented in the respective imported image. The above-recited system wherein at least some of the entries in the thumbnail index are based on images imported into the system, wherein the imported images are associated with respective personal identifiers for the person or persons represented in the respective imported image. The above-recited system wherein at least some of the entries in the thumbnail index are imported into the system including respective personal identifiers.

An example method for performing storage-management operations based on image criteria, the method comprising:
  detecting, by a storage management system that comprises secondary copies stored in a secondary storage subsystem, a first type of image in a first set of secondary copies in the secondary storage subsystem;
  generating, by the storage management system, a respective thumbnail image derived from each image of the first type detected in the first set of secondary copies, resulting in a first set of thumbnail images derived from the first set of secondary copies;
  recognizing each thumbnail image in the first set of thumbnail images, by a first module executing on a computing device component of the storage management system,
    wherein each thumbnail image is recognized as representing a respective person having a respective personal identifier;
  indexing, by the storage management system, the first set of thumbnail images into a thumbnail index,
    wherein the thumbnail index comprises the respective personal identifier of the person recognized by the first in the corresponding thumbnail image, and
    wherein the thumbnail index further comprises pointers to at least one of:
      (i) the first set of secondary copies from which the first set of thumbnail images is derived, and
      (ii) other data structures stored in the storage management system that point to the first set of secondary copies from which the first set of thumbnail images is derived, and
  storing, by the storage management system, the thumbnail index to local computer memory that is located in or associated with the computing device component, wherein the local computer memory is distinct from the secondary storage subsystem; and
  wherein the generating, recognizing, indexing, and storing are performed without accessing the secondary copies stored in the secondary storage subsystem.

The above-recited method further comprising:
  evaluating, by the storage management system, an image-based criterion for performing one or more storage-management operations upon secondary copies in the secondary storage subsystem,
    wherein the image-based criterion is a second personal identifier for a second person;
  determining by the storage management system, whether any thumbnail images indexed in the thumbnail index are associated with the second personal identifier;
  for each thumbnail image associated with the second personal identifier, identifying, based on the thumbnail index, any secondary copies stored in the secondary storage subsystem that comprise an image of the second person having the second personal identifier,
    wherein the identifying operation is performed without accessing the identified secondary copies or any other secondary copies in the secondary storage subsystem; and
  initiating the one or more storage-management operations to be executed upon the identified secondary copies that comprise the image of the second person having the second personal identifier.

The above-recited method wherein the initiated storage-management operation is a locate operation in response to a search submitted by a user using the second personal identifier as the image-based criterion for the search. The above-recited method wherein the initiated storage-management operation comprises enforcing, for the identified secondary copies that comprise the image of the second person having the second personal identifier, at least one of: a retention period, a pruning policy, and a legal hold policy. The above-recited method wherein the initiated storage-management operation comprises generating further secondary copies from the identified set of secondary copies and storing the further secondary copies in the secondary storage subsystem. The above-recited method further comprising: importing a set of data comprising the first type of image and storing the imported set of data as secondary copies in the secondary storage subsystem; and wherein the imported set of data is part of the first set of secondary copies. The above-recited method wherein the first type of image is one of a plurality of types of images classified by the storage management system, and further comprising: based on the first type of image, initiating a first storage-management operation for secondary copies comprising the first type of image, wherein the first storage-management operation is different from other storage-management operations initiated based on other types of images found in the secondary storage subsystem.

An example computer-readable medium, excluding transitory propagating signals, storing instructions that, when executed by at least one storage manager comprising one or more processors and associated computer memory, cause the storage manager to perform operations comprising:

evaluating an image-based criterion for performing one or more storage-management operations upon secondary copies stored in a secondary storage subsystem of a storage management system managed by the storage manager,
wherein the image-based criterion is a personal identifier for a person;
determining whether any thumbnail images indexed in a thumbnail index are associated with the personal identifier,
wherein the thumbnail index is stored in local computer memory of the storage manager, which is distinct from the secondary storage subsystem;
for each thumbnail image associated with the personal identifier,
identifying, based on the thumbnail index,
any secondary copies stored in the secondary storage subsystem that comprise an image of the person having the personal identifier,
wherein the identifying operation is performed without accessing the identified secondary copies or any other secondary copies in the secondary storage subsystem; and
initiating the one or more storage-management operations to be executed upon the identified secondary copies that comprise the image of the second person having the second personal identifier.

Another illustrative system comprises:
a secondary storage subsystem comprising secondary copies of primary data and secondary storage devices storing the secondary copies;
a storage manager for managing storage-management operations in the secondary storage subsystem;
a content index server in communication with the storage manager;
wherein the content index server is programmed to:
detect a first type of image in a first set of secondary copies in the secondary storage subsystem,
generate a respective thumbnail image derived from each image of the first type detected in the first set of secondary copies,
resulting in a first set of thumbnail images derived from the first set of secondary copies,
store the first set of thumbnail images to local computer memory, which is located in or associated with the content index server,
recognize each thumbnail image in the first set of thumbnail images,
wherein each thumbnail image is recognized as representing a respective person having a respective personal identifier,
index the first set of thumbnail images into a thumbnail index,
wherein the thumbnail index comprises the respective personal identifier of the person recognized in the corresponding thumbnail image, and
wherein the thumbnail index further comprises pointers to the stored first set of thumbnail images, and
wherein the thumbnail index further comprises pointers to at least one of:
the first set of secondary copies from which the first set of thumbnail images is derived, and
other data structures that point to the first set of secondary copies from which the first set of thumbnail images is derived, and
store the thumbnail index to local computer memory, which is located in or associated with the content index server; and
wherein the content index server is programmed to perform the detect, generate, store, recognize, and index operations without changing the secondary copies stored in the secondary storage subsystem.

The above-recited system wherein the content index server recognizes each thumbnail image in the first set of thumbnail images by executing a first plug-in module suitable to recognize the first type of image. The above-recited system wherein the content index server is programmed to perform the generate, store, recognize, and index operations without accessing the secondary copies stored in the secondary storage subsystem. The above-recited system wherein the content index server is further programmed to, based on a first personal identifier associated with one or more thumbnails in the thumbnail index,
use the thumbnail index to identify secondary copies in the secondary storage subsystem that comprise an image of a first person having the first personal identifier,
wherein the identify operation is performed by the content index server without accessing the identified secondary copies.

The above-recited system wherein a storage-management operation comprises locating a second set of secondary copies in the secondary storage subsystem based on a search criterion comprising a first personal identifier of a first person, wherein the locating is based on using the thumbnail index to identify the second set of secondary copies according to the first personal identifier. The above-recited system wherein the storage manager is programmed to:
evaluate a first content policy that comprises an image-based criterion for performing one or more of the storage-management operations,
wherein the image-based criterion is a second personal identifier for a second person, and
direct the content index server to identify any secondary copies stored in the secondary storage subsystem that satisfy the second personal identifier criterion in the first content policy; and
wherein the content index server is further programmed to:
determine, based on the thumbnail index stored in local computer memory, whether any thumbnail images indexed in the thumbnail index are associated with the second personal identifier, and
for each thumbnail image associated with the second personal identifier, identify, based on the thumbnail index, any secondary copies stored in the secondary storage subsystem that comprise an image of the second person having the second personal identifier,
wherein the identify operation is performed by the content index server without accessing the identified secondary copies that comprise an image of the second person having the second personal identifier; and
wherein the storage manager is further programmed to:
initiate the one or more of the storage-management operations, based on the first content policy, to be executed relative to the identified secondary copies that comprise an image of the second person having the second personal identifier.

The above-recited system wherein one of the one or more initiated storage-management operations comprises enforcing one of: a retention period for the identified secondary copies, a pruning policy for the identified secondary copies, and a legal hold policy for the identified secondary copies. The above-recited system wherein one of the one or more initiated storage-management operations comprises generating further secondary copies from the identified set of secondary copies and storing the further secondary copies in the secondary storage subsystem. The above-recited system wherein the first plug-in is one of a plurality of plug-in modules that are installed on the content index server; and wherein each plug-in module in the plurality of plug-in modules is programmed to recognize a respective type of image in one or more secondary copies stored in the secondary storage subsystem.

The above-recited system wherein the first plug-in is one of a plurality of plug-in modules that are installed on the content index server; and wherein each plug-in module in the plurality of plug-in modules is programmed to recognize a respective type of image in one or more secondary copies stored in the secondary storage subsystem; and wherein the content index server is further programmed to:
classify the secondary copies in the secondary storage subsystem according to respective one or more types of image recognized by one or more plug-in modules in the plurality of plug-in modules, and
add a corresponding tag to the thumbnail index.

The above-recited system wherein the first plug-in is one of a plurality of plug-in modules that are installed on the content index server; and wherein each plug-in module in the plurality of plug-in modules is programmed to recognize a respective type of image in one or more secondary copies stored in the secondary storage subsystem; and wherein the content index server is further programmed to:
index the secondary copies in the secondary storage subsystem according to respective one or more types of image recognized by one or more plug-in modules in the plurality of plug-in modules, and
add a corresponding tag to the thumbnail index.

The above-recited system wherein the storage manager comprises a plurality of plug-in modules for performing storage-management operations upon secondary copies in the secondary storage subsystem; and wherein the storage manager is programmed to:
select from the plurality of plug-in modules a first plug-in module that is suitable to perform a first storage-management operation specified in a first information management policy, and
initiate the first storage-management operation for secondary copies in the first set of secondary copies that comprise an image of the first person having the first personal identifier; and wherein the secondary copies that comprise an image of the first person having the first personal identifier are identified based on data in the thumbnail index.

The above-recited system wherein the storage manager comprises a plurality of plug-in modules for performing storage-management operations upon secondary copies in the secondary storage subsystem; and wherein the storage manager is programmed to:
select from the plurality of plug-in modules a first plug-in module that is suitable to perform a first storage-management operation based on the first type of image, and
initiate the first storage-management operation for secondary copies in the first set of secondary copies that comprise the first type of image; and wherein the secondary copies that comprise the first type of image are identified based on data in the thumbnail index.

The above-recited system wherein the content index server is further programmed to index each of the secondary copies in the first set of secondary copies according to how many images of the first type are recognized in each respective secondary copy.

Another illustrative system comprises: a secondary storage subsystem comprising secondary copies of primary data and secondary storage devices storing the secondary copies;

a computing device comprising one or more processors and associated computer memory for storing computer-executable instructions, and further comprising mass storage for storing data;
wherein the computing device is programmed to:
store a thumbnail index in the mass storage,
wherein the thumbnail index comprises associations between thumbnail images representing persons and respective personal identifiers of the represented persons, and
wherein the thumbnail index further comprises associations between thumbnail images and secondary copies comprising one or more images of the respective person represented by the thumbnail image,
receive a criterion that comprises a first personal identifier of a first person,
use the thumbnail index to identify secondary copies in the secondary storage subsystem that comprise an image of the first person having the first personal identifier,
wherein the identify operation is performed by the computing device without accessing the identified secondary copies, and
initiate a first storage-management operation upon the identified secondary copies in the secondary storage subsystem that comprise an image of the first person having the first personal identifier.

The above-recited system wherein the criterion is a search term supplied in a search, and wherein the first storage-management operation is to locate, in response to the search, the identified secondary copies in their respective storage locations in the secondary storage subsystem. The above-recited system wherein the first storage-management operation is to enforce upon the identified secondary copies at least one of: a retention policy, a pruning policy, and a legal-hold policy. The above-recited system wherein the first storage-management operation is to export the identified secondary copies to another system. The above-recited system wherein the first storage-management operation is to replace the identified secondary copies with new secondary copies that have been at least one of: encrypted, deduplicated, and compressed. The above-recited system wherein the first storage-management operation is to generate further secondary copies from the identified secondary copies wherein the further secondary copies have been at least one of: encrypted, deduplicated, and compressed. The above-recited system wherein the first storage-management operation is to generate further secondary copies from the identified secondary copies. The above-recited system wherein at least some of the entries in the thumbnail index are based on images imported into the system, wherein the imported images are associated with respective personal identifiers for the person or persons represented in the respective imported image. The above-recited system wherein at least some of the entries in the thumbnail index are imported into the system including respective personal identifiers.

An illustrative method for performing storage-management operations based on image criteria, the method comprising:
  detecting, by a storage management system that comprises secondary copies stored in a secondary storage subsystem, a first type of image in a first set of secondary copies in the secondary storage subsystem;
  generating, by the storage management system, a respective thumbnail image derived from each image of the first type detected in the first set of secondary copies, resulting in a first set of thumbnail images derived from the first set of secondary copies;
  recognizing each thumbnail image in the first set of thumbnail images, by a first module executing on a computing device component of the storage management system,
    wherein each thumbnail image is recognized as representing a respective person having a respective personal identifier;
  indexing, by the storage management system, the first set of thumbnail images into a thumbnail index,
    wherein the thumbnail index comprises the respective personal identifier of the person recognized by the first in the corresponding thumbnail image, and
    wherein the thumbnail index further comprises pointers to at least one of:
      the first set of secondary copies from which the first set of thumbnail images is derived, and
      other data structures stored in the storage management system that point to the first set of secondary copies from which the first set of thumbnail images is derived, and
  storing, by the storage management system, the thumbnail index to local computer memory that is located in or associated with in the computing device component, and wherein the local computer memory is distinct from the secondary storage subsystem; and
  wherein the generating, recognizing, indexing, and storing are performed without accessing the secondary copies stored in the secondary storage subsystem.

The above-recited method further comprising:
  evaluating, by the storage management system, an image-based criterion for performing one or more storage-management operations upon secondary copies in the secondary storage subsystem,
    wherein the image-based criterion is a second personal identifier for a second person;
  determining by the storage management system, whether any thumbnail images indexed in the thumbnail index are associated with the second personal identifier;
  for each thumbnail image associated with the second personal identifier, identifying, based on the thumbnail index, any secondary copies stored in the secondary storage subsystem that comprise an image of the second person having the second personal identifier,
    wherein the identifying operation is performed without accessing the identified secondary copies or any other secondary copies in the secondary storage subsystem; and initiating the one or more storage-management operations to be executed upon the identified secondary copies that comprise the image of the second person having the second personal identifier.

The above-recited method wherein the initiated storage-management operation is a locate operation in response to a search submitted by a user using the second personal identifier as the image-based criterion. The above-recited method wherein initiated storage-management operation comprises enforcing, for the identified secondary copies that comprise the image of the second person having the second personal identifier, at least one of: a retention period, a pruning policy, and a legal hold policy. The above-recited method wherein initiated storage-management operation comprises generating further secondary copies from the identified set of secondary copies and storing the further secondary copies in the secondary storage subsystem.

An illustrative computer-readable medium, excluding transitory propagating signals, storing instructions that, when executed by at least one index server comprising one or more processors and associated computer memory, cause the index server to perform operations comprising:
  detecting a first type of image in a first set of secondary copies stored in a secondary storage subsystem of a storage management system that comprises the index server;
  generating a respective thumbnail image derived from each image of the first type detected in the first set of secondary copies,
  resulting in a first set of thumbnail images derived from the first set of secondary copies;
  recognizing each thumbnail image in the first set of thumbnail images,
    wherein each thumbnail image is recognized as representing a respective person having a respective personal identifier;
  indexing the first set of thumbnail images into a thumbnail index,
    wherein the thumbnail index comprises the respective personal identifier of the person recognized by the first plug-in in the corresponding thumbnail image, and
    wherein the thumbnail index further comprises pointers to at least one of:
      the first set of secondary copies from which the first set of thumbnail images is derived, and
      other data structures stored in the storage management system that point to the first set of secondary copies from which the first set of thumbnail images is derived; and
  storing the thumbnail index to local computer memory that is located in or associated with the index server, and wherein the local computer memory is distinct from the secondary storage subsystem; and
  wherein the generating, recognizing, indexing, and storing are performed by the index server without accessing the secondary copies stored in the secondary storage subsystem.

The above-recited medium wherein the instructions cause the index server to perform operations further comprising:
  determining whether any thumbnail images indexed in the thumbnail index are associated with a second personal identifier of a second person, wherein the second personal identifier is a criterion for performing one or more storage-management operations upon secondary copies in the secondary storage subsystem; and
  for each thumbnail image associated with the second personal identifier, identifying, based on the thumbnail index, any secondary copies stored in the secondary storage subsystem that comprise an image of the second person having the second personal identifier,
    wherein the identifying operation is performed by the index server without accessing the identified secondary copies or any other secondary copies in the secondary storage subsystem.

Another illustrative computer-readable medium, excluding transitory propagating signals, storing instructions that, when executed by at least one storage manager comprising one or more processors and associated computer memory, cause the storage manager to perform operations comprising:
    evaluating an image-based criterion for performing one or more storage-management operations upon secondary copies stored in a secondary storage subsystem of a storage management system managed by the storage manager,
        wherein the image-based criterion is a personal identifier for a person;
    determining whether any thumbnail images indexed in a thumbnail index are associated with the personal identifier,
        wherein the thumbnail index is stored in local computer memory of the storage manager, which is distinct from the secondary storage subsystem;
    for each thumbnail image associated with the personal identifier,
        identifying, based on the thumbnail index,
        any secondary copies stored in the secondary storage subsystem that comprise an image of the person having the personal identifier,
        wherein the identifying operation is performed without accessing the identified secondary copies or any other secondary copies in the secondary storage subsystem; and
    initiating the one or more storage-management operations to be executed upon the identified secondary copies that comprise the image of the second person having the second personal identifier.

Another illustrative system comprises:
    a secondary storage subsystem comprising secondary copies of primary data and secondary storage devices storing the secondary copies;
    a computing device comprising one or more processors and associated computer memory for storing computer-executable instructions, and further comprising mass storage for storing data;
    wherein the computing device is programmed to:
    detect a first type of image in a first set of secondary copies in the secondary storage subsystem,
    generate a respective thumbnail image derived from each image of the first type detected in the first set of secondary copies,
        resulting in a first set of thumbnail images derived from the first set of secondary copies,
    recognize each thumbnail image in the first set of thumbnail images,
        wherein each thumbnail image is recognized as representing a respective person having a respective personal identifier,
    index the first set of thumbnail images into a thumbnail index,
        wherein the thumbnail index comprises an association between the respective personal identifier of the recognized person and the corresponding thumbnail image, and
        wherein the thumbnail index further comprises pointers to at least one of:
            the first set of secondary copies from which the first set of thumbnail images is derived, and
            other data structures that point to the first set of secondary copies from which the first set of thumbnail images is derived, and
    store the thumbnail index to the mass storage of the computing device; and
    wherein the computing device is programmed to perform the generate, recognize, index, and store operations without accessing the secondary copies stored in the secondary storage subsystem.

The above-recited system wherein the computing device is further programmed to, based on a first personal identifier associated with one or more thumbnails in the thumbnail index:
    use the thumbnail index to identify secondary copies in the secondary storage subsystem that comprise an image of a first person having the first personal identifier,
    wherein the identify operation is performed by the computing device without accessing the identified secondary copies.

The above-recited system wherein the computing device is further programmed to:
    receive a criterion for a search, wherein the criterion comprises a first personal identifier of a first person,
    use the thumbnail index to identify secondary copies in the secondary storage subsystem that comprise an image of the first person having the first personal identifier,
        wherein the identify operation is performed by the computing device without accessing the identified secondary copies, and
    provide access to the identified secondary copies in response to the search.

Another illustrative system comprises: a secondary storage subsystem comprising secondary copies of primary data and secondary storage devices storing the secondary copies;
    a computing device comprising one or more processors and associated computer memory for storing computer-executable instructions, and further comprising mass storage for storing data;
    wherein the computing device is programmed to:
        store an image-copy index in the mass storage, wherein the image-copy index comprises associations between image-copy images representing persons and respective personal identifiers of the represented persons, and wherein the image-copy index further comprises associations between image-copy images and secondary copies, stored in the secondary storage subsystem, comprising one or more images of the respective person represented by the image-copy image,
    receive a criterion that comprises a first personal identifier of a first person,
    use the image-copy index to identify secondary copies in the secondary storage subsystem that comprise an image of the first person having the first personal identifier,
        wherein the identify operation is performed by the computing device without accessing the identified secondary copies in the secondary storage subsystem, and
    initiate a first storage-management operation upon the identified secondary copies in the secondary storage subsystem that comprise an image of the first person having the first personal identifier.

Another illustrative method for performing storage-management operations based on image criteria, the method comprising:

detecting, by a storage management system that comprises secondary copies stored in a secondary storage subsystem, a first type of image in a first set of secondary copies in the secondary storage subsystem;
generating, by the storage management system, a respective copy, designated an image-copy, of each image of the first type detected in the first set of secondary copies,
resulting in a first set of image-copies derived from the first set of secondary copies;
recognizing each image-copy in the first set of image-copies, by a first computing device component of the storage management system,
wherein each image-copy is recognized as representing a respective person having a respective personal identifier;
indexing, by the storage management system, the first set of image-copies into an image-copy index,
wherein the image-copy index comprises the respective personal identifier of the person recognized by the first plug-in in the corresponding image-copy, and
wherein the image-copy index further comprises pointers to at least one of:
the first set of secondary copies from which the first set of image-copies is derived, and
other data structures stored in the storage management system that point to the first set of secondary copies from which the first set of image-copies is derived, and
storing, by the storage management system, the image-copy index to local computer memory that is located in or associated with in the computing device component, and wherein the local computer memory is distinct from the secondary storage subsystem; and
wherein the generating, recognizing, indexing, and storing are performed without accessing the secondary copies stored in the secondary storage subsystem.

Another illustrative system comprises:
a secondary storage subsystem comprising secondary copies of primary data and secondary storage devices storing the secondary copies;
a storage manager for managing storage-management operations in the secondary storage subsystem;
a content index server in communication with the storage manager;
wherein the content index server is programmed to:
detect a first type of image in a first set of secondary copies in the secondary storage subsystem,
generate a respective copy, designated an image-copy, derived from each image of the first type detected in the first set of secondary copies,
resulting in a first set of image-copies derived from the first set of secondary copies,
store the first set of image-copies to local computer memory, which is located in or associated with the content index server,
recognize each image-copy image in the first set of image-copies by executing a first module suitable to recognize the first type of image,
wherein each image-copy is recognized as representing a respective person having a respective personal identifier,
index the first set of image-copies into an image-copy index,
wherein the image-copy index comprises the respective personal identifier of the person recognized in the corresponding image-copy, and
wherein the image-copy index further comprises pointers to the stored first set of image-copies, and
wherein the image-copy index further comprises pointers to at least one of:
the first set of secondary copies from which the first set of image-copies is derived, and
other data structures that point to the first set of secondary copies from which the first set of image-copies is derived, and
store the image-copy index to local computer memory, which is located in or associated with the content index server; and
wherein the content index server is programmed to perform the detect, generate, store, recognize, and index operations without changing the secondary copies stored in the secondary storage subsystem.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A data storage management system for managing data stored on a computer network based on image criteria, the system comprising:
    a secondary storage subsystem comprising secondary storage computing devices that are configured to create, and to store in secondary storage devices, secondary copies of primary data, wherein the secondary copies are stored in a different format than the primary data, and wherein each secondary copy comprises one or more source images that are visually perceivable by a human viewer;
    a management database storing a content policy specifying storage management operations to be performed on the secondary copies;
    a first computing device comprising one or more processors and associated computer memory for storing computer-executable instructions, wherein the first computing device is programmed to:
provide a thumbnail database comprising thumbnail images derived from the secondary copies stored in the secondary storage devices,
generate a thumbnail index that comprises associations between thumbnail images representing persons and respective personal identifiers of the represented persons and associations between thumbnail images and corresponding secondary copies comprising the one or more source images of the persons represented by the thumbnail images, and wherein in the thumbnail index each thumbnail image representing one or more persons is classified into one of a plurality of types of images,
receive search criteria that comprise a first personal identifier of a first person and a first type of image,
apply the search criteria to the thumbnail index to identify, among the secondary copies in the secondary storage devices, one or more secondary copies that comprise a source image of the first type and of the first person; and
a second computing device comprising one or more processors and associated computer memory for storing computer-executable instructions, wherein the second computing device is configured as a storage manager that controls the secondary copies in the secondary storage devices, and wherein the storage manager comprises one or more action plug-ins and is programmed to:
based on the content policy, select an action plug-in, from the one or more action plug-ins, to cause one of the secondary storage computing devices to perform a first storage management operation upon the identified one or more secondary copies in the secondary storage devices that comprise the source image of the first type and of the first person, and
for secondary copies associated with thumbnail images of a second type of image of the first person, select a second action plug-in, from the one or more action plug-ins, to cause one of the secondary storage computing devices to perform a second storage management operation, which differs from the first storage management operation.

2. The system of claim 1, wherein the first computing device is programmed to identify the one or more secondary copies without accessing the secondary storage devices.

3. The system of claim 1, wherein the storage manager is programmed to enforce for the identified one or more secondary copies stored in the secondary storage devices, based on the content policy, at least one of: a retention period, a pruning policy, and a legal hold policy.

4. The system of claim 1, wherein the first storage management operation causes the identified one or more secondary copies to migrate from one secondary storage device to another secondary storage device of the system.

5. The system of claim 1, wherein the first storage management operation causes at least one of the identified one or more secondary copies to be replaced with corresponding one or more new secondary copies that have been at least one of: encrypted, deduplicated, and compressed.

6. The system of claim 1, wherein the first storage management operation causes at least one of the identified one or more secondary copies to be restored to a primary data format that is visually perceivable by a human viewer at a computing device in communication with one or more of: the first computing device and the storage manager.

7. The system of claim 1, wherein at least some entries in the thumbnail index are based on outside images, which are stored outside the system and are accessible to the first computing device, and wherein the outside images are associated with respective personal identifiers of one or more persons represented in the outside images.

8. The system of claim 7, wherein the first computing device comprises one or more application programming interfaces for accessing one or more external systems comprising the outside images.

9. The system of claim 1, wherein at least some entries in the thumbnail index are based on imported images, which were imported into the system, and wherein the imported images are associated with respective personal identifiers of one or more persons represented in the imported images.

10. The system of claim 1, wherein the first computing device further comprises mass storage for storing the thumbnail index.

11. A method for managing data stored on a computer network based on image criteria, the method comprising:
by secondary storage computing devices in a data storage management system: creating, and storing in secondary storage devices, secondary copies of primary data, wherein the secondary copies are stored in a different format than the primary data, and wherein each secondary copy comprises one or more source images that are visually perceivable by a human viewer;
by a first computing device comprising one or more processors and associated computer memory for storing computer-executable instructions:
generating a thumbnail database comprising thumbnail images derived from the secondary copies stored in the secondary storage devices,
indexing the thumbnail database into a thumbnail index that comprises associations between thumbnail images representing persons and respective personal identifiers of the represented persons and associations between thumbnail images and corresponding secondary copies comprising the one or more source images of the persons represented by the thumbnail images, and wherein in the thumbnail index, each thumbnail image representing one or more persons is classified into one of a plurality of types of images,
receiving search criteria that comprise a first personal identifier of a first person and a first type of image, and
applying the search criteria to the thumbnail index to identify, among the secondary copies stored in the secondary storage devices, one or more secondary copies that comprise a source image of the first type and of the first person; and
by a second computing device comprising one or more processors and associated computer memory for storing computer-executable instructions, wherein the second computing device is configured as a storage manager that controls the secondary copies, and wherein the storage manager comprises one or more action plug-ins:
based on a content policy in a management database associated with the storage manager, selecting an action plug-in, from the one or more action plug-ins, to cause one of the secondary storage computing devices to perform a first storage management operation upon the identified one or more secondary copies that comprise the source image of the first type and of the first person, and for secondary copies associated with thumbnail images of a second type of image of the first person, selecting a second action plug-in, from the one or more action plug-ins, to cause one of the secondary storage computing devices to perform a second storage management operation, which differs from the first storage management operation.

12. The method of claim 11, wherein the first computing device identifies the one or more secondary copies without accessing the secondary storage devices.

13. The method of claim 11, wherein in the first storage management operation the storage manager enforces for the identified one or more secondary copies stored in the secondary storage devices, based on the content policy, at least one of: a retention period, a pruning policy, and a legal hold policy.

14. The method of claim 11, wherein the first storage management operation causes the identified one or more secondary copies to migrate from one secondary storage device to another secondary storage device of the data storage management system.

15. The method of claim 11, wherein the first storage management operation causes at least one of the identified one or more secondary copies to be replaced with corresponding one or more new secondary copies that have been at least one of: encrypted, deduplicated, and compressed.

16. The method of claim 11, wherein the first storage management operation causes at least one of the identified one or more secondary copies to be restored to a primary data format that is visually perceivable by a human viewer at a computing device in communication with one or more of: the first computing device and the storage manager.

17. The method of claim 11, wherein at least some entries in the thumbnail index are based on outside images, which are stored outside the data storage management system and are accessible to the first computing device, and wherein the outside images are associated with respective personal identifiers of one or more persons represented in the outside images.

18. The method of claim 17, wherein the first computing device uses one or more application programming interfaces for accessing one or more external systems comprising the outside images.

19. The method of claim 11, wherein at least some entries in the thumbnail index are based on imported images, which were imported into the data storage management system, and wherein the imported images are associated with respective personal identifiers of one or more persons represented in the imported images.

20. The method of claim 11, wherein the thumbnail index is stored at and maintained by the first computing device.

* * * * *